(12) United States Patent
Lamb et al.

(10) Patent No.: US 6,747,970 B1
(45) Date of Patent: Jun. 8, 2004

(54) METHODS AND APPARATUS FOR PROVIDING COMMUNICATIONS SERVICES BETWEEN CONNECTIONLESS AND CONNECTION-ORIENTED NETWORKS

(76) Inventors: Christopher H. Lamb, 227 Merriam St., Weston, MA (US) 02493-1350; Scott B. Petrack, 137 Gardner Rd., Brookline, MA (US) 02445; Frank G. Slaughter, III, 17 S. Great Rd., Lincoln, MA (US) 01773; James E. Toga, 7 Old Farm Cir., Wayland, MA (US) 01778

( * ) Notice: Subject to any disclaimer, the term of this patent is extended or adjusted under 35 U.S.C. 154(b) by 0 days.

(21) Appl. No.: 09/531,713

(22) Filed: Mar. 21, 2000

Related U.S. Application Data

(60) Provisional application No. 60/131,822, filed on Apr. 29, 1999.

(51) Int. Cl.[7] .................. H04L 12/66; H04L 12/28; H04J 3/22
(52) U.S. Cl. .................. 370/352; 370/401; 370/466
(58) Field of Search .................. 370/352, 353, 370/466, 467, 401, 389; 379/142.15, 265.01, 265.09

(56) References Cited

U.S. PATENT DOCUMENTS

| | | |
|---|---|---|
| 4,653,090 A | 3/1987 | Hayden |
| 4,723,238 A | 2/1988 | Isreal et al. |
| 4,809,272 A | 2/1989 | Torgrim et al. |
| 4,837,798 A | 6/1989 | Cohen et al. |
| 4,866,758 A | 9/1989 | Heinzelmann |
| 5,029,200 A | 7/1991 | Haas et al. |
| 5,062,103 A | 10/1991 | Davidson et al. |
| 5,097,528 A | 3/1992 | Gursahaney et al. |
| 5,181,236 A | 1/1993 | LaVallee et al. |
| 5,185,782 A | 2/1993 | Srinivasan |
| 5,206,903 A | 4/1993 | Kohler et al. |
| 5,317,627 A | 5/1994 | Richardson, Jr. et al. |
| 5,333,266 A | 7/1994 | Boaz et al. |
| 5,448,626 A | 9/1995 | Kajiya et al. |
| 5,884,032 A * | 3/1999 | Bateman et al. ............ 709/204 |
| 5,991,382 A | 11/1999 | Bayless et al. |
| 5,991,394 A | 11/1999 | Dezonno et al. |
| 6,144,667 A * | 11/2000 | Doshi et al. ................. 370/401 |
| 6,366,575 B1 * | 4/2002 | Barkan et al. .............. 370/352 |
| 6,366,576 B1 * | 4/2002 | Haga .......................... 370/352 |
| 6,445,694 B1 * | 9/2002 | Swartz ........................ 370/352 |
| 6,498,797 B1 * | 12/2002 | Anerousis et al. .......... 370/522 |

\* cited by examiner

*Primary Examiner*—Hassan Kizou
*Assistant Examiner*—Timothy Lee
(74) *Attorney, Agent, or Firm*—Chapin & Huang, L.L.C.; David E. Huang, Esq.; Barry W. Chapin, Esq.

(57) ABSTRACT

A telecommunications system uses software applications called user agents, that are preferably Internet-based and that operate on behalf of users in a telecommunications hosting server to control call connections under control of a telecommunications network server that interfaces with the telecommunications hosting server as well as a connection-based public-telephone network. The telecommunications hosting server operates on a computer network on behalf of the user agents to provide call signaling in support of many advanced calling and telecommunications services. The functionality and, performance (e.g., execution) of the user agent(s) preferably takes place primarily within the telecommunications hosting server, though user client computers can provide some and possibly all of the user agent functionality, depending upon the particular implementation chosen.

30 Claims, 11 Drawing Sheets

CONVENTIONAL CIRCUIT SWITCHED TELEPHONE NETWORK

CONVENTIONAL INTERNET PROTOCOL (IP) NETWORK (E.G. INTERNET)
EMPLOYING VOICE OVER IP (VOIP) TECHNOLOGY

USER AGENT CALL APPLICATION MESSAGE PROCESSING

USER AGENT CALL SIGNALING MESSAGE PROCESSING

USER AGENT INTER-AGENT MESSAGE PROCESSING

| | 250 | |
|---|---|---|
| | 671<br>LOGIN STATUS: LOGGED IN | 672<br>ACTIVE CALLS: 1 (CONFERENCE) |
| | 673<br>CURRENT USER CALL IDENTIFICATION:<br>(617) 555-9600 | 674<br>CURRENT LOCATION: BOSTON, MA |

690 ➤

| | | 675 | 679-1 |
|---|---|---|---|
| YES | NO | RECENT INSTANT MESSAGES: | CONFERENCE: |
| YES | NO | 1: PLEASE CALL HOME ASAP | AVAILABLE PEOPLE: |
| YES | NO | 2: CALL OFFICE RE: CLOSING DEAL | MARY BOB JIM MIKE |
| | | 3: DON'T FORGET CONFERENCE CALL, MON. 3PM. | FRANK |

CURRENT
PARTICPANTS:
JOE SUE SETH BILL

676
COLLEAGUE LIST STATUS:

| COLLEAGUE: | LOCATION: | CALL ID: | STATUS: |
|---|---|---|---|
| FRED | WASHINGTON | 202-555-1212 | LOGGED IN |
| SUE | BOSTON | 617-555-1234 | IN CONFERENCE |
| MARY | MOBILE | MARY@CELL.COM | OUT TO LUNCH |
| JOE | SAN. FRAN. | JOE@HOME.COM | IN CONFERENCE |

679-2 CONF. NOW 679-3 FUTURE CONF.

679-4 WHISPER ROOM

677
ENTER CALL IDENTIFIER TO PLACE CALL:

678
ENTER INSTANT MESSAGE:

USER CLIENT INTERFACE

FIG. 12

METHODS AND APPARATUS FOR PROVIDING COMMUNICATIONS SERVICES BETWEEN CONNECTIONLESS AND CONNECTION-ORIENTED NETWORKS

This application claims the benefit of Provisional application Ser. No. 60/131,822, filed Apr. 29, 1999.

FIELD OF THE INVENTION

The present invention relates generally to communications technologies. More specifically, the invention relates to a system and techniques providing advanced telecommunications services using connectionless network host(s) for service implementation while using connection-based network equipment for transport of at least a portion of a telecommunications session.

BACKGROUND OF THE INVENTION

Generally, telecommunications systems provide the ability for two or more people or machines (e.g., computerized or other electronic devices) to communicate with each other. Many types of telecommunications systems exist in the prior art. Examples include telephone systems and networks, data communications systems, computer networking systems such as the Internet, wireless and satellite communications systems, and so forth. Each of these systems is inherently enabled or can be retrofitted via software and/or electronic hardware to provide telecommunications services between persons or devices coupled to such systems. Telecommunications systems and services in a general sense are sometimes limited to simple voice or audio communications, although such systems may support communications of other types of data such as signaling and protocol data, video data, and computer or device application data.

FIG. 1 illustrates an example of a prior art telephone network 101 that is a common example of a telecommunications system in widespread use throughout the world. As illustrated, the telephone network 101 includes a number user telephony devices 105 through 108 (e.g., telephones) that inter-connect to various tandem or central offices 110 through 113. Communications media (e.g., telephone lines, wireless links, and/or the like) interconnect the offices 110 through 113 to one another to form a public switched telephone network (PSTN) 101-A. The central or tandem offices 110 through 113 may be replaced, for example, private branch exchanges, PSTN control hardware or other telephone switching equipment. Such equipment is typically owned by a telephone service provider. Users of the telephone network 101 typically subscribe to a telecommunications service (e.g., telephone service) which the telephone service provider offers.

The telephone network 101 also includes a PSTN signaling network 101-B that operates over the same medium as the PSTN 101-A . The PSTN signaling network 101-B generally supports a standard signaling technique such as Signaling System Seven (SS7) or User-to-Network interfaces between the offices 110 through 113 and the user telephony devices 105 through 108 to support call connections (e.g., telephone calls, not specifically shown) between the user telephony devices 105 through 108. The user telephony devices 105 through 108 may be telephone handsets, telephone answering machines, fax machines, modems or other such devices.

The telephone network 101 is an example of a connection-based network. To communicate in a connection-based network, the network components (telephony devices and switching equipment in this example) establish a dedicated connection or path between two or more end points of communication. The dedicated connection, also called a circuit or switched circuit generally remains active or established during the duration of a telecommunications session between parties using the connection.

By way of example, in FIG. 1, suppose a user (not shown) of the user telephony device 105 desires to communicate with a user (not shown) of the user telephony device 108. To do so, the user of user telephony device 105 picks up a handset of the user telephony device 105. This action causes the central office 113 to establish a dedicated connection (a completed circuit) to the central office 113 for use by the user telephony device 105. Thereafter, when the user of telephony device 105 enters connection establishment information in the form of a phone number corresponding to the user telephony device 108, the central office 113 extends the dedicated connection through the PSTN 101-A to the central office 112 using signaling provided by the PSTN signaling network 101-B. When the central office 112 receives this signaling, the central office 112 completes the connection to the user telephony device 108 causing it to ring. When a user or machine answers the user telephony device 108 by lifting the handset for example, this action fully establishes an end-to-end connection between the user telephony device 105 and the user telephony device 108. The dedicated connection remains established for the duration of the communications session between the users using the user telephony devices 105 and 108, even if they are not speaking or otherwise communicating at all times.

Typically in a connection-based network such as telephone network 101, the network components (e.g., switching offices) can identify various active dedicated communications sessions by the circuit or wire identifiers of the physical wires with which the network 101 uses to transport communications for those sessions. A central office, for example, can identify one particular segment of a connection circuit used for communications with a user telephony device by the telephone number associated with the segment that leads to the device. Most central office switching equipment can be programmed to identify a particular call identifier such as a telephone number with a particular circuit associated with a telephony device located at the end of the circuit. When the central office equipment receives a request to establish a call connection to a telephony device on a particular circuit, the central office can activate the circuit to form a completed circuit or call connection to the telephony equipment on the opposing end of the circuit.

Prior art telephone switching offices and equipment are able to combine certain signaling techniques such as those supported by the PSTN signaling network 101-B with the ability to identify connection segments or individual circuits in order to support various prior art extended telecommunication services. Such services provide features within the telephone network beyond the ability of the network to support simple end to end telephone calls. For example, many prior art telephone networks support calling features such as call waiting, call forwarding, missed call call-back (also known as "star-69"), toll-free "800" numbers, scheduled wake-up calls, conference calling, and so forth. A prior art connection-based telephone network provides each of these types of services based on connection-based network signaling which may occur before, during, and/or after the actual establishment or activation of one or more individual circuits or call connections to one ore more telephony devices (e.g., before, during or after placement of a telephone call). For example, a prior art toll-free "800" number service uses signaling before placing a call connection to perform a "lookup" operation of the toll-free phone number in order to reverse call charges to the receiver of the call (identified by the receiving call circuit) instead of charging the sender or calling party. A prior art call waiting service uses signaling during a call connection to notify a user in the active call connection of another incoming call connection for the same circuit. A scheduled wake up call service provides call signaling after one call connection is made (the call to schedule the wake up call) but before another future call connection is placed (the actual wake up call).

In each of these examples, a signaling system within the telephone network (e.g., 101) provides signaling to support, track, or otherwise manipulate one or more basic dedicated circuits or call connections between one or more telephony devices in the network. In FIG. 1 then, while the PSTN signaling network 101-B may be quite robust to support the aforementioned enhanced calling features, the underlying results from the signaling are essentially to establish one or more call connections across the telephone network 101 to support communications sessions which are typically voice grade.

Generally, large telecommunication service companies (e.g., telephone companies such as AT&T, MCIWorldCom, Bell Atlantic, GTE and the like) own and operate the equipment (e.g., public telephone switching equipment) and media (e.g., telephone lines, satellite links, etc.) that support communications on a telephone network. Such equipment and media is presently widespread in either physical or wireless form throughout much of the United States and the world. As a result, telephone service of some sort, be it physical land-based lines or wireless service (e.g. cellular or satellite) is generally available in most locations. Since service providers have spent significant amounts of time and money to install the existing telephone network infrastructure, much of the equipment from twenty, thirty or more years ago is still in use today to support call connections. Due to such a large investment in the existing systems, public telephone service providers that want to offer advanced calling services in addition to the placement of regular point-to-point public telephone call connections must develop and deploy such services using the existing public telephone infrastructure as a base. That is, if a public telephone service provider desires to support one or more advanced calling services such as those mentioned above, such new services must be fully compatible with the existing public telephone infrastructure or development costs become prohibitive and/or the advanced services might not work properly due to limitations of the existing equipment.

To this end, only highly skilled technicians under the employ of the telephone companies are generally allowed to modify and further develop the existing public telephone software, hardware, and signaling systems such as SS7 that inter-operate and control prior art telephone network switching equipment. Moreover, once a new service such as call waiting has been perfected to work with the existing public telephone infrastructure, deployment of the service to individual consumer telephones requires that the consumer (i.e., public telephone subscriber) notify the public telephone service provider of the desire for the service and also requires the service provider to separately instruct a technician to activate the service for a call connection (e.g., the phone number) associated with that particular individual public telephone subscriber.

In contrast to connection-based networks such as the telephone network 101 in FIG. 1 which operates using a dedicated connection, a connection-less network such as a computer network can support telecommunications services without a single dedicated path to support the communications through the network.

FIG. 2 illustrates an example of a prior art connectionless computer network 140 configured to support telecommunications. The connectionless network 140 includes a plurality of network devices 151 through 155 interconnected via data links (e.g., 150), as well as computer hosts 144 and 145 which in this example each include a respective attached computer telephony device 141, 142. This example shows the connectionless network as an Internet Protocol (IP) network 102 which is a computer network such as the Internet. The network devices 151 through 155 might be routers, for example, which can quickly route data in the form of packets, cells frames or the like between computer hosts 144 and 145 (only two hosts are shown in this example). The computer hosts 144 and 145 can be any type of computer such as personal computers, workstations or the like.

To operate as a telecommunications system, the connectionless computer network 140 can use a technology such as Voice Over IP (VOIP). VOIP is generally provided by a software application (not specifically shown) that executes on the computer hosts 144 and 145. Using a VOIP application, a user (not shown) of computer host 144 can speak into a handset or microphone provided as part of the computer telephony equipment 141. The computer host 144 receives, digitizes and packetizes the voice and transmits the voice data in packets, cells, frames or some other unit (not specifically shown) onto the IP network 102. The routers 151 through 155 can receive and route the various voice data packets through the IP network 102, one by one, until they reach their intended destination computer host 145. Upon receipt of the voice data packets, the destination computer host 145 de-packetizes the voice data and converts it back into an analog signal which is provided to a speaker provided as part of the computer telephony equipment 142 for listening by a recipient user (not shown). Such a system can send voice data in either direction between users thus providing a two-way telecommunications session. In this manner, users are able to speak to each other using computer network communications.

Since the IP network 102 is a connectionless network, each voice data packet sent from the computer host 144 is individually routed through the network 102. Depending upon network congestion (e.g., heavy data packet loads resulting in network devices buffering packets for processing) within the various network devices 151 through 155, each packet may take a different route through the network 102. When a user is not speaking into his or her computer telephony equipment, the computer hosts 144 and 145 and network devices 151 through 155 generally do not transmit packets to one another, hence the name "connectionless" network.

A VOIP software application uses the same packet communications that carry the voice data to perform any required call signaling. This is called "in-band" signaling. For example, if the VOIP application executing on computer host 144 wants to notify the user telephony device 142 of an incoming call, a "new call" packet is sent from the VOIP applications executing on the computer host 144 to host 145. The network 140 routes the new call signaling packet just like another other data packet. A VOIP application can transmit one or more signaling packets during the transmission of voice data packets. In this manner, with respect to the computer network infrastructure (e.g., data links 150 and the individual network devices 151 through 155), call signaling is treated the same as any other type of communications and is generally handled at the software application level.

Prior art protocols have been developed in an attempt to have a general purpose computer system control telephone switching equipment. One such protocol is called PINT, which stands for the PSTN to InterNeT protocol. PINT is a protocol under development by the Internet Engineering Task Force (IETF), which is a standards based organization. PINT defines a protocol to allow certain basic telephone switching services to be controlled via a computer on a connectionless network. The basic service provided by PINT allows a computer system such as a workstation to use PINT commands that are understandable by telephone switching equipment to have that telephone switching equipment establish a single call connection to a telephony device (i.e., a telephone) on a telephone network. PINT thus provides a tool in the form of basic protocol commands for a system developer to interface a computer to PSTN equipment. The PINT protocol specification suggests the ability to use PINT in the creation certain calling services such as click to dial and click to fax, but the implementation of such services is up to system and software designers. The PINT protocol thus provides a framework for interfacing computers to telephone equipment and provides a fundamental building block or function that allows a computer system to cause telephone switching equipment to create one or more call connections on the telephone network.

In the area of prior art private telecommunications systems, developers have created systems that provide calling services that extend beyond the services available in a public switched telephone network. Such private telecommunications systems operate using privately owned and typically more advanced telephone switching equipment commonly known as a "Private Branch Exchange (PBX)" or an "Automatic Call Distributor (ACD)". A typical PBX or ACD system interconnects a number of advanced PBX telephony devices designed to take advantage of the capabilities that the PBX has to offer. Essentially, the PBX and its associated PBX telephony devices provide a private telephone network. Since such private telecommunications equipment has been more recently developed as compared to conventional public telephone switching equipment that has been in place for sometimes fifty years or more, and since such equipment is intended for private use and control, PBX systems provide more advanced calling services such as call transfer from one PBX telephony device to another, auto-attendant voice messaging systems, and conference calling.

A typical PBX system (PBX and associated PBX telephony devices) is designed for use in a business environment and is quite expensive as compared to telephone equipment that consumers can use on a public switched telephone network. The PBX itself is typically a computer controlled device that may include software and hardware (e.g., electronics) as well as a number of ports for interconnecting the various PBX telephony devices. The PBX typically also provides one or more interfaces to allow the PBX network to be coupled to a PSTN network. Telephone calls that PBX users place between PBX telephony devices are handled completely by the PBX within the PBX network, without the need to complete call connections to public telephone switching equipment (e.g., a tandem or central office).

Some prior art PBX systems provide an interface to a computer system or a computer network. Such an interface can be used to direct the PBX system to place telephone calls between users of the PBX network, and in some cases, between a PBX network user and a person on a telephone that is external to the PBX network.

An example of such a prior art PBX system is disclosed in U.S. Pat. No. 5,991,394 (Dezonno et al.). The system disclosed in Dezonno allows a telephone computer to control an ACD or a PBX under the direction of connections made to the telephone computer from a computer network such as the Internet. In the Dezonno system, for example, a computer user on the Internet can send a call request message via his or her computer to a telephone computer that is interfaced to control the PBX. The call request message instructs the telephone computer to direct the PBX to create a telephone call from a PBX user telephone (e.g., from an agent in a business owning the PBX using an agent telephone coupled to the PBX system) through the PBX and out to a computer user telephone located on a telephone network. Essentially, this allows the computer user to have the business call-back the computer user. The computer user can specify the time at which the call-back is to be made. This allows, for example, the computer user to complete his or her use (e.g., web surfing, reading email, etc.) of the Internet via a dial-up telephone connection to an Internet Service Provider (ISP) over that computer user's telephone line. Since the call-back can be specified to take place in the future, the telephone computer can thereafter detect the time at which to place the call-back and can then instruct the ACD (or PBX) to place the call between the agent's PBX telephone and the computer user's telephone (that was formerly in use to connect to the Internet).

SUMMARY OF THE INVENTION

Prior art telecommunications systems, both public and private, suffer in various degrees from a number of deficiencies. Collectively, these deficiencies significantly reduce the capabilities and services that are offered in such systems. In the case of prior art public telephone network systems discussed above, such public systems alone lack the ability to develop and deploy advanced calling services. This is primarily due to the fact that public telephone switching equipment is difficult to program and modify for new advanced calling services. Since a public telephone network is largely hardware based, adding new services requires the public telephone service provider to make significant modifications to public telephone switching hardware, firmware and/or software. This process can be quite difficult and expensive, especially when some of the public telephone switching hardware is out-of-date with current programming and switching technologies. Since a public telephone system must properly operate end-to-end in a compatible manner, older public telephone switching equipment must be upgraded to support newer advanced signaling techniques if a public telephone service provider is to provide such new services in a calling area.

And while private telephone switching equipment such as that provided in a PBX network offers enhanced calling services beyond those found in public telephone networks, development of new services is also difficult due to the proprietary nature of the PBX systems. To circumvent this, developers of systems such as that disclosed in Dezonno have attempted to provide software or Internet based calling services that include a dedicated telephone computer that interfaces to a PBX network to control calls within the PBX network. While the time-based call-back service in the Dezonno may provide some value to a business, the business is still required to provide a PBX network which can be controlled as explained therein. In other words, in the Dezonno system design, the telephone computer relies on special "intelligent" features of a private ACD or PBX. The telephone computer and the PBX or ACD together contain all of the logic required to provide the enhanced call-back calling service and requires that a business purchase both the telephone computer and a PBX system. The purchase of a PBX is quite expensive. Further still, placing call service logic within a single computer system that control the PBX makes the PBX prone to security threats such as hackers who gain unauthorized control of the telephone computer coupled to the Internet and thereafter have complete control of the ACD and PBX system. Numerous articles have been written about such security problems.

For further information on examples of such security attacks that can be made on PBX system designs such as that is Dezonno which provides full direct computer control of a PBX network, the reader is referred to an electronic magazine published online on the Internet called "Phrack Magazine". Issues of Phrack Magazine are available for review on the Internet at "http://www.infowar.com/iwftp/phrack." Specifically, Phrack Magazine, Volume Four, Issue Forty-Four, File 19 of 27, which can is archived on the Internet at the following location "http://www.infowar.com/iwftp/phrack/P44-19.txt," discloses details of various attacks that can be made to PBX systems that are operated under control of a telephone computer system such as that disclosed in Dezonno.

The system in Dezonno is also limited to the placement of telephone calls in which one party must converse using an agent PBX-based telephone. In other words, at least one agent telephone must be involved in the conversation because the telephone computer can only control the PBX and its associated PBX agent telephones. Due to the proprietary nature of the interface between the PBX/ACD and the telephone computer, the telephone computer cannot be used to control call connections placed between public telephone devices, unless multiple complete calls are placed out, incurring multiple phone call charges. Other disadvantages of prior art telecommunications system exist as well. For instance, current public telephone signaling architectures and public telephone network infrastructures are extremely expensive to develop, deploy and maintain, are difficult to connect to, and provide a very limited number of voice related calling services, such as those discussed above. System designers have developed such systems with outdated assumptions which no longer apply in modem communications networks. For example, public telephone system designers have developed conventional public telephone networks with the assumption that administrative domains are geographically separate. With the advent of more recent long-haul and wireless networking equipment, geography is largely unimportant to the administration of such equipment.

Another flawed assumption of prior art connection-based public telephone networks is that they only need to support telephone-grade communications. As system designers try to augment these public telephone networks to support more advanced calling services and features such as those discussed above, additional signaling information requiring bandwidth beyond the requirements of voice data is often required. Designers are finding it to be extremely difficult and expensive to extend the current public switched telephony network and signaling systems beyond these assumptions which no longer apply.

Conventional public telephone network based telecommunications systems also suffer in that they are largely closed systems. That is, only the companies that own such systems are allowed to develop new services as they see fit, since the prior art model for developing such advanced calling services is based on modifications to the public switched telephone switching and signaling systems. For instance, of all of the calling services discussed above, few telephone networks offer every one of such services to every customer. Equipment owners typically only accommodate or develop new services when customer demand grows large enough to justify the cost of equipment upgrades and further signaling system development. Customers that desire customize services on a per-customer basis are largely un-accommodated. That is, if a single public telephone network customer wants to implement a special calling service, prior art public telephone systems do not provide such capability. The point is, connection-based public telephone networks offer a number of services beyond simple telephone calling capability, but those services are limited to development and deployment by the vendors and operators of the public telephone equipment and only supplied when customer demand is great enough to justify cost.

As an example, suppose a small business customer desires to have many different telephones at diverse geographical locations ring at the same time when a customer calls a single telephone number. If a public telephone service provider (e.g., a telephone company) does not offer such an advanced multiple-location ring service, the customer is out of luck and will have to do without such a service. It would be difficult if not impossible to implement such a service with a PBX system such as that in Dezonno, since a PBX lacks the required switch control. Even if a particular PBX did have the requisite software hooks, the expense and difficulty of owning and operating such sophisticated equipment would put the service beyond the means of any but the largest enterprises. Due to the complexity of offering such a service and security and privacy reasons, public telephone service providers do not offer access to telephone equipment for service creation or manipulation by the customers to implement services that they desire. The only access that telephone service providers generally allow to public switched telephone equipment is to setup and tear down individual call connections between telephone numbers, a service that is generally provided each time a regular telephone call is placed using public switched telephone equipment, or such services as can be accessed by using touch tones other than telephone numbers.

Conventional public telecommunications systems also provide a limited user interface. Generally, the operational interface to public telephone switching equipment is merely a touch tone key pad of numbers as found on most telephones. Users of prior art public telecommunications systems must adhere to the use of this interface for all services provided by the system. Though each of the specific limitations of this user interface and the system in general will not be discussed in complete detail here, an example use of a conventional telecommunications system for a simple service such as conference calling provides a vivid illustration of the significant limitations of prior art systems.

In order to establish a conference call between multiple public-use telephones using a conventional public telecommunications system, a third party person such as an operator must often be involved in the initial conference call setup if many parties are to be joined in the conference. Alternatively, the system may allow the user to depress the switch-hook to place current parties to the conference on hold while the phone number of another party is called. When the new party answers, the user again depresses the switch-hook to join the new party to the conference. In either case, this process is quite cumbersome. Moreover, the moderator (i.e., the originator) of the conference call generally has no way of seeing which members of the conference call are still involved with the call versus which members have hung-up the phone.

Prior art public telephone systems are also generally limited to providing tones called DTMF tones that are used to establish public telephone system call connections. DTMF tones are those tones that are generated when a user presses a key or number on the keypad numerical interface as explained above. Such tones provide only rudimentary control of public telephone switching equipment and are a slow mechanism of control for such equipment. That is, DTMF tone entry is often done tone by tone (i.e., numeral by numeral) when a user depresses buttons on a telephone keypad. One touch service activation is not generally found in such systems other than simple one touch services such as call redial. For example, a-user must manually (and therefore slowly) enter many key presses (or use an operator) in order to establish a multi-party call. Due to the slowness and cumbersome nature of the user interface of most prior art public telecommunication systems, the ability to develop robust services is severely limited.

In the area of connectionless network architectures that implement telecommunications services and systems such as Voice Over Internet Protocol services or VOIP, problems are also apparent in the prior art. Most notably, network system designers have invested large amounts of time and money to optimize conventional public telephone networks for the transport of toll-quality voice. On the other hand, the designers of connectionless computer-based networks such as the Internet have not optimized such networks for interactive or real-time media transport such as voice. Retrofitting the Internet for this type of real-time traffic is proving to be quite expensive and requires high speed data communications equipment. Connectionless or packet-based computer networks such as the examples discussed above in FIG. 2 can suffer latency issues when transporting voice quality data packets. Such latencies can result in lost or delayed data packets which results in diminished voice quality. Designers have proposed work around solutions involving complex connection-less protocols to reserve bandwidth in network devices to support toll-quality streams of voice data packets. However, such solutions are at the expense of bandwidth available to other data streams.

Another problem related to the implementation of telecommunications systems over computer networks is that computer network access is largely limited in its geographical scope. That is, there are far less network access points for a computer network such as the Internet than there are for conventional public telephone systems. Even when a telephone network provides the first leg of a connection to the Internet via a dial-up connection to a network access server at an Internet Service Provider or ISP, when users use such a link for telecommunications and voice data transport, bandwidth is often limited to the speed of the modem in use and/or the quality of the dial-up link to the computer to support data transfer (e.g., 56 Kbps). Moreover, in remote areas, users might only be able to connect a computer via the closest computer network access point which may require a long distance or toll-based telephone call. As compared to the extent and far reach of conventional public telephone networks, the Internet is less abound and thus conventional systems that use the Internet for transport of voice telecommunications are less available.

Also as noted above, the prior art systems and mechanisms such as the PINT protocol specification are lacking in definition of many advanced calling services. While the PINT specification does mention click to dial and click to fax features that could be implemented, specific details of such implementations are left up to designers. Generally, PINT simply provides a mechanism to allow a computer to communicate with telephone switching equipment and provides the tools to allow the computer to instruct a telephone system to create call connections. Systems that utilize these capabilities such as Dezonno are largely limited in their use to PBX networks which tight control over the PBX is required. There is no teaching or suggestion in PINT or references such as Dezonno of the advanced calling services explained herein as the invention. As will be explained, however, the PINT protocol can be used in various embodiments of the invention to support communications between a computer system implementing aspects of the invention on a computer network and a telecommunications network server and public telephone switching equipment that implements other aspects of the invention and that operates on a public telephone network.

The present invention significantly overcomes many of the aforementioned problems with conventional telecommunications systems implemented in either a circuit-switched or connection-based telephone network or in a connectionless network such as the Internet. The present invention is based in part on the observation that the different types of networks (i.e., circuit-switched telephone networks versus connectionless computer networks) can each be used to preferably support the two main aspects of (i) signaling and (ii) voice transport that are required for any telecommunications system.

For example, the Internet provides a flexible and efficient mechanism to support signaling and service support via software application control, while the telephone network is optimized to handle the transport of voice communications. The invention provides a "marriage" of these two concepts by providing a telecommunications system that uses applications on a computer network such as the Internet for call signaling and advanced calling service implementations and that uses a public telephone network and public telephone switching equipment to provide the mechanism for voice transport under control of the computer network application signaling mechanisms. The invention is thus based in part on the notion of associating, signaling or otherwise controlling related public voice switching telephone network resources and equipment from an alternative network such as the Internet.

Moreover, the design of the invention differs from systems such as Dezonno since no PBX system or telephone network is required. Instead, the call service processing logic is provided completely within a telecommunications hosting server that is isolated from the public telephone switching equipment. The telephone switching equipment in this invention, as opposed to that in a system such as Dezonno, does not require a PBX under the control of the telephone computer. Instead, the telecommunications hosting server, of this invention operates as a separate computer system that is completely located within the connectionless network such as the Internet. Since no PBX system is required for the use of the invention, the invention provides advanced calling services between telephones that are all on the public telephone network. This allows the invention to be applies between many more diversely geographic areas. Also, since call processing logic is separate from call connection control via a separate telecommunications hosting server and a separate telecommunications network server, the system is less susceptible to security violations in the form of hackers attacking and gaining control of public telephone switching equipment. The present architecture allows the owners and operators of Internet and PSTN equipment to be completely separate administrative domains.

Using this and other concepts that are embodied in the various embodiments of the invention presented below allows the system of the invention to support a wide array of new and advanced telecommunications and calling services that operate completely over the public telephone network. Each of these advanced services are themselves embodiments of the invention. Before such new and advanced calling services are discussed in detail however, the infrastructure of the various embodiments of the invention will be presented in detail.

Generally, the invention includes mechanisms and techniques to allow users of computer systems and software configured according to the invention to interact with telecommunications software that executes or otherwise performs on a processor in a telecommunications hosting server. A preferred embodiment of a telecommunications hosting server is a workstation or other computer platform within a connectionless network such as the Internet and that is configured as a server. Such a computer platform may, for example, be a Unix or Windows NT workstation that can perform multi-processing. Via an application of the invention performing on the telecommunications hosting server, users can use calling services implemented in the application to establish calls on a conventional public switched telephone network. To do so, another connection from the telecommunications hosting server to another computer platform called a telecommunications network server is also provided in embodiments of the invention. The connection between the telecommunications network server and the telecommunications hosting server may be a connectionless network connection or may be a dedicated channel, bus, circuitry or other data transport mechanism.

The telecommunications network server may also be a workstation or similar computing platform that directs the public switched telephone network equipment to connect, disconnect, monitor, detect, report and otherwise track call connections to and/or from the public switched telephone switching equipment under the control of the telecommunications network server.

Since the telecommunications hosting server is a computer system using agent software configured according to the invention, a flexible platform is provided for development and deployment of many advanced telecommunications services. Through a unique signaling and control interface to public switched telephone switching equipment from the telecommunications network server, the system of the invention offer the benefits of robust software call services implementations and signaling controls in conjunction with the far reaching and optimized public switched telephone network to provide the actual voice transport. In one embodiment which will be explained in more detail, users of client computers can interact with software on the telecommunications hosting server over a network such as the Internet to cause the telecommunications hosting server to direct the telecommunications network server to perform many types of advanced calling features and services as will be explained.

Since no PBX system is required by the system of the invention, telephone calls controlled by the telecommunications hosting server can be placed between callers anywhere in the public switched telephone network (as opposed to one caller being required to be within the PBX network in systems such as Dezonno). This is accomplished by this invention since all call processing logic is placed in user agent software that performs in the telecommunications hosting server which is totally separate from the telecommunications network server computer. The telecommunications network server is interfaced to the public telephone switching equipment and simply creates, detects and monitors call connections, but does not perform the call processing logic. By separating the call processing and service logic into the telecommunications hosting server, and placing only the most basic call connection control (setup, detection and monitoring of call connections) into the telecommunications network server that interfaces to the public switched telephone equipment, security is enhanced as the two domains of activity ("intelligent call processing" and "PSTN call setup") are separated.

More specifically, according to one embodiment of the invention, the system of the invention provides a method of managing call services in a telecommunications hosting server on a connection-less network. The method comprises the steps of receiving, at a telecommunications hosting server coupled to a connectionless network, at least one call application message including a request to create at least one call connection to a telephony device coupled to a connection-based network. A user of the system may send the call application message, for example, from a user agent interface (a client or user client interface). A typical example of a call application message is one or more packets transmitted over the connectionless network between the program operating the user client interface and the user agent. A specific example is an HTTP request use a web-browser as the user client interface and a web-server front end for the user agent. Other alternative call application messages are an email message, or another type of standard or proprietary protocol communications that specifies specific application data that the user agent can parse to determine the content of the request to create at least one call connection to a telephony device coupled to a connection-based network.

The method also includes the operations of processing the call application message according to user agent logic provided by a user agent performing within the telecommunications hosting server and generating at least one call signaling message based on the user agent logic. The call signaling message generally contains call connection information related to the telephony device coupled to a connection-based network and forwarding the at least one call signaling message from the telecommunications hosting server on a connectionless network to the connection-based network in order to create the at least one call connection to the telephony device on the connection-based network. A call signaling message is generally a specific signaling protocol message such as a message provided by the PINT or SS7 protocols that is transferred between the telecommunications hosting server and the telecommunications network server. A PINT protocol call signaling message can specify, for example, a specific telephone call to be placed on the connection-based network which may be a telephone network (e.g. PSTN). Telephony equipment is generally defined as any type of device that can couple to a connection based network such as a telephone network to inter-operate with network switching equipment such as a telephone switch controlled by the telecommunications network server. In this manner, a user on a computer, for instance, can among many other things, control the placement, reception and direction of telephone calls on a telephone network.

In another arrangement, the operation of generating generates the at least one call signaling message indicating at least two call connections that are to be completed between at least two different telephony devices on the connection-based network. Also according to this arrangement, the step of forwarding the call signaling message forwards the call signaling message indicating the at least two call connections to a telecommunications network server coupled to the connection-based network, such that the telecommunications network server can create and maintain the at least two call connections to allow the at least two different telephony devices on the connection-based network to perform telecommunications with one another.

Another arrangement of the invention includes the steps of generating at least one call signaling message containing call connection information related to a computer telephony device coupled to the connection-less network. Then, the arrangement includes the step of forwarding the at least one call signaling message containing call connection information related to the computer telephony device to the computer telephony device in order to establish at least one voice-over-computer-network session between the computer telephony device and the telecommunications hosting server. The arrangement then bridges the voice-over-computer-network session on the connection-less network to the at least one call connection on the connection-based network so that the telephony device on the connection-based network can perform telecommunications with the computer telephony device on the connection-less network. A computer telephony device is roughly defined as a device coupled to a connectionless network such as a computer equipped with a telephone handset or a microphone and speaker that can allow a user to perform telecommunications using such technologies as voice over computer network (e.g., Voice Over Internet Protocol or VOIP). This allows a user of the system to send and receive calls using PSTN based devices as well as computer (e.g. VOIP) devices.

In another arrangement, the step of generating includes the steps of initiating execution of a user agent respectively associated with a source of the at least one call application message. This allows the invention to trigger execution of a user agent upon, for example, an incoming call that is placed to the user. The arrangement also includes the operations of forwarding the at least one call application message including the request to create the at least one call connection to the user agent and processing the at least one call application message by the user agent to determine the call connection information related to the telephony device on a connection-based network. The call connection information includes a call source identifier indicating a source telephony device for the call connection and includes a call destination identifier indicating a destination telephony-device for the call connection. The caller can thus be identified by the user agent. The arrangement also includes the operations of generating at least one call signaling message indicating the call source identifier and generating at least one call signaling message indicating the call destination identifier. These may be the same call signaling message, and can be used to complete a call connection to the user on behalf of the caller.

In certain embodiments of the invention, the user agent generally provides enhanced calling services between a telephony device coupled to the connection-based network. The enhanced calling services can include, among other services, any or all of the following services: conference calling, whisper room conference calling, time-based whisper room conference calling, callback, time-based callback, call redirect, caller identification, call joining, and auto attendant.

In yet another arrangement of the invention, the step of initiating includes the steps of determining the source of the call application message and determining if a user agent associated with the source of the call application message is currently executing, and if not, causing execution of the user agent. This allows the user agent to be executed even if the user is not logged into the telecommunications hosting server.

According to another arrangement, the system can operate to include the steps of receiving a call signaling message from the connection-based network indicating a status of a connection on the connection based network and forwarding the call signaling message received from the connection-based network to an appropriate user agent. This allows a telecommunications network server that detects incoming calls to notify the telecommunications hosting server of such calls and the telecommunications hosting server can then direct such notification to appropriate user agents. The arrangement also includes the operation of updating call connection status information associated with the appropriate user agent(s) based on the call signaling message indicating the status of the connection on the connection based network. In other words, the user agent that receives such notification can track the status of call connection on the telephone network. This allows the user agent to use this information to, for example, handle other incoming call requests. If the example a user agent "knows" that a line is busy, another request for a connection to that line (e.g., another user that may be attempting to call the busy line) can be directed to an alternative destination, such as voice mail, or to another non-busy line, of the user agent can provide a call signaling message in return that contains, for example, an audio message that the telecommunications network server can play back to the original caller attempting to connect to the user. The audio message can be a custom message based, for example, on the identity (as specified in the original received call signaling message) of the caller. Other example of audio feedback can be custom dial tones, custom ringing, and so forth.

To this end, another arrangement of the invention provides that the call signaling message received from the connection-based network by the user agent specifies a status which indicates availability of telephony device on the connection-based network. In response to such a call signaling message, the user agent performs the step of updating availability information related to the user agent. This allows the user agent to track the status of telephony devices associated with the user assigned to that user agent.

In another arrangement, the call signaling message received from the connection-based network by the user agent specifies a status which indicates success of the at least one call connection between telephony device on the connection-based network and the user agent performs the step of updating accounting information related to the user agent based on the success of the at least one call connection. This allows the user agent to track phone call accounting and time information for call connections made to the user telephony devices associated with the user assigned to the user agent. Updating accounting information and processing can include charging the call to one or more calling cards, for example, or can include selecting a preferred long distance carrier to which the call connection should be billed.

In another arrangement, the call signaling message specifies a connection to be placed on the connection-based network between at least two telephony devices coupled to the connection based network. This allows a telecommunications session to take place in response to signaling that occurs on the computer network.

In yet another arrangement, the system includes performing, in the telecommunications hosting server, a user agent on behalf of a user. Performance can include execution, interpreting, running, processing or otherwise carrying out instructions specified by user agent code. The user agent performs the step of receiving as summarized above, and the call application message is received from a telecommunications network server and indicates to the telecommunications hosting server that a call connection is in progress to telephony equipment on a connection-based network coupled to the telecommunications network server. Also in this arrangement, the call application message is sent to the user agent to notify the user of the current call connection. The user can select an option in the user agent to have the call connection transferred to different telephony equipment than the telephony equipment to which the call connection is currently in progress. Also, the call signaling message generated in the operation, of generating contains an indication that the call connection in progress to the telephony equipment on the connection! based network coupled to the telecommunications network server should be transferred by the telecommunications network server to different telephony equipment on the connection-based network coupled to the telecommunications network server as specified in the call signaling message. This arrangement allows the system to support user selected call transfers.

In another arrangement, the call signaling message specifies a connection to be placed on the connection-based network between a single telephony device coupled to the connection based network and wherein the call signaling message, also specifies a connection to be placed on the connection-less network between a single computer telephony device coupled to the connection-less network via a voice-over-computer-network protocol. Multiple telephony devices may also be specified. This allows calls to VOIP equipment as well as telephony equipment.

In yet another arrangement, in response to the step of receiving at least one call application message the method of the system of the invention further performs-the steps of determining accounting information associated with the at least one call application message and determining an optimum service provider to provide the at least one call connection on the connection-based network. In this case, the generated call signaling message containing call connection information identifies the optimum service provider to provide the at least one call connection on the connection-based network. This allows the system of the invention to select a preferred carrier for telecommunications sessions immediately prior to the session, or the system can switch carriers mid-session if a more preferred (e.g., less expensive and/or higher quality) carrier is available.

In another arrangement, the call application message is embodied in an email message transmitted from a client computer to a user agent executing on the telecommunications hosting server. The email message specifies a call connection to be made on the connection-based network and the user agent processes the email message and determines the call connection to be made as specified in the email message and causes a telecommunications network server to place the call connection on the connection-based network. This allows an email message to cause a call to be made, which is another example of an advanced service offered by the system of the invention.

In another arrangement, the call application message is provided when a user of a client computer initiates( e.g. clicks on) a hyperlink in a web browser on the client computer having a URL which causes the browser to "fetch" a web page provide by a web server. The web server may be provided within the telecommunications hosting server, or may be a separate web server serving a page to the browser of the user of the client computer. In either case, the web page, or simply the URL provided to the web server (e.g., within the telecommunications hosting server) may serve as a call application message to specify one or more call connection to be made on the connection-based network. That is, the web server that receives the URL from the user clicking within his or her browser can be tightly integrated into the telecommunications hosting server so that the appropriate user agent(s) is/are activated to make call connections as specified by that URL referenced by that user. The user agent in the telecommunications hosting server in such an embodiment can interface with the web server "front-end" to processes the specified URL to determine the call connection(s) to be made which causes a telecommunications network server to place the call connection on the connection-based network.

This allows a simple click of a hyperlink in a browser to create a call application message (in the form of the browser communicating with the web server) to cause one or more calls to be made on a telephone network, which is another example of an advanced service offered by the system of the invention. In a simple example, a user agent can easily be configured to initiate a large conference call with many members (i.e., participants on the connection-based telephone network) via the user simply clicking on a conference call button in his or her browser. The agent can be pre-configured with the appropriate people to have joined in the call and the telecommunications hosting server can control the telecommunications network server to setup the required call connections. Extending this example, the user can then visually monitor the status of each participant in the conference call in real time via a visual display of information concerning the call connection state of each participant conference caller which is sent to the user's browser via periodic status updates from the telecommunications hosting server. Via the user's browser, the user can simply click on names of other people to have them joined in the conference call, and click on existing names to have them removed from the call or placed on hold.

In yet another arrangement, the call application message specifies a plurality of call connections to be placed on the connection-based network and includes instructions to allow each of the plurality of call connections to be joined in a conference. Thus conference calling can be arranged easily on the computer network, without having to pre-arrange a conference call with third party carrier assistance as in conventional systems. Other arrangements of the invention also provide a method for managing call services in a telecommunications hosting server on a connection-less network. Such arrangements include a method comprising the steps of receiving, in a telecommunications hosting server coupled to a connectionless network, at least one first call signaling message from the connection-based network indicating a request to establish at least one call connection to a telephony device associated with a user agent. Also included are the operations of generating at least one second call signaling message containing call connection information related to the telephony device associated with the user agent and forwarding the second call signaling message in order to establish the at least one call connection with the telephony device associated with the user agent.

In a related arrangement, the telephony device associated with the user agent is telephony device coupled to the connection-based network. Furthermore, the operation of forwarding the second call signaling message forwards the second call-signaling message to a telecommunications network server coupled to the connection-based network, such that the telecommunications network server can create and maintain at least one call connection on the connection-based network allowing telecommunications between a telephony device associated with a source of the at least one first call signaling message and a telephony device associated the user agent.

In another arrangement, the telephony device associated with the user agent is computer telephony device coupled to the connection-less network and the step of forwarding the at least one second call signaling message forwards the at least one second call signaling message to the computer telephony device coupled to the connection-less network to establish a voice-over-computer-network session. This may be, for example, a VOIP connection. The method further includes the step of bridging the voice-over-computer-network session on the connection-less network to a call connection on the connection-based network specified in the first call signaling message, such that telephony device associated with the source of the first call signaling message on the connection-based network can perform telecommunications with the computer telephony device on the connection-less network.

In another configuration, the steps of receiving, generating, and forwarding are performed by a user agent that is executed in response to the telecommunications hosting server detecting the first call signaling message. The user agent selected for execution is based on the identity of a call identifier specified in the at least one first call signaling message. This allows a call connection that arrives at the telecommunications network server to be passed to the telecommunications hosting server at which point a specific user agent is launched to handle processing for this incoming call. Since the user agent can be flexible and programmable as explained herein, it can process call logic to handle a variety of circumstances, each of which amounts to an advanced calling service provided by the system of the invention.

In yet another configuration, the method includes the steps of processing, in response to receiving the at least one first call signaling message, at least one invite processing and exposure rule based on a source of the at least one first call signaling message and determining if the at least one call connection should continue based on an outcome of the step of processing. If so, the method proceeds to perform the steps of generating and forwarding discussed above. This is an example of user programming via invite processing rules which can be used to instruct a user agent how to handle incoming call connections. Many examples of various ways to handle incoming calls and other message via invite processing rules are provided in the detailed description below.

According to another embodiment of the invention, the system includes a method providing enhanced telecommunications services to a user of a computer on a computer network having access to a telephony device coupled to a connection-based network. In one arrangement of this embodiment, the method comprises the steps of providing a user agent interface which allows a user to enter call connection information on the computer network. The method also includes the steps of formatting the call connection information into a call application message indicating source and destination telephony devices on the connection-based network between which telecommunications is to take place, the destination telephony device being associated with the user. The method also includes the step of forwarding the call application message over the computer network to a telecommunications hosting server. The call application message is then interpreted by the telecommunications hosting server to establish a telecommunications session between the source and destination telephony device specified in the call application message. In this manner, the user can interoperate with his or her user agent in the telecommunications hosting server to send and receive calls.

Other arrangements of the invention include the operations of allowing the user to input colleague information to the user agent interface and querying, via the user agent interface, user agents that are associated with colleague information specified by the user. In response to the step of querying, the system can receive colleague availability information, which, when presented to the user (e.g., via the user agent interface), indicates a status of other users associated with the input colleague information.

The system also includes arrangements that allow the user of the user agent interface to select colleague availability information indicating a specific colleague to which a call connection is to be placed. The system can also determine in the user agent a call connection identifier (e.g., a phone number) associated with the selected colleague availability information and can format and forward a call signaling message containing call signaling for a call connection to be placed to the call connection identifier associated with the selected colleague availability information to the telecommunications network server so that the telecommunications network server can establish a telecommunications session between the user and another user associated with the selected colleague availability information. This allows a user to view colleague information that can indicate, for example if a colleague is currently free or not to take a call. If they are free, the user can simply select the colleague information via the user agent interface and the system will cause a call to be placed between the user's user telephony equipment and the telephony equipment associated with that colleague.

In another arrangement, the colleague availability information received in response to the querying includes at least one of an identity of a location of the user agent queried, a call identifier of the telephony device associated with the user agent queried, and a telephony device status of the telephony device associated with the user agent queried. This information can be used to place an outgoing call if the user so desires by selecting colleague information as explained above. In another arrangement, the system receives a query for colleague availability information and processes the query according to at least one availability exposure rule to produce colleague availability information for a user agent providing the query. Then the system forwards, for example, via an inter-agent message, the colleague availability information to the user agent providing the query.

Other embodiments of the invention includes methods providing enhanced telecommunications services. One such method comprises the steps of receiving, at a user agent executing in a telecommunications hosting server on a connectionless network, at least one call application message including a request to create at least one call connection to telephony device on a connection-based network. The method also includes the step of determining if another user agent is associated with the telephony device associated with the at least one call connection, and if so, querying via a status request message for the status of telephony device associated with the other user agent. The arrangement also performs the step of determining if a response to the status request message indicates the telephony device associated with the other user agent is available for a call connection, and if so, creating at least one call connection to the telephony device associated with the other user agent. This allows a user to query for information concerning the availability of others to take calls, for example, before actually making the calls.

Embodiments of the invention also include a telecommunications system comprising a first telecommunications hosting server which includes a first interface including a coupling to connect to a connection-less network and a second interface including a coupling to connect to a connection-based network. A memory is provided and coupled to the first interface and the second interface and a processor is coupled to the memory, to the first interface and to the second interface. The memory maintains a first user agent that, when executed in conjunction with the processor, provides calling services on behalf of a respective first user of the user agent. The first user agent is loadable into the memory and executable by the processor to communicate via the first and second interfaces using messages that are associated with the first user agent, such execution of the first user agent provides management of call connections within the connection-based network via the first user on the connection-less network. The call connections are placed between telephony equipment (e.g., telephones) coupled to the connection-based network.

In another arrangement, the processor executes the first user agent to receive from the first interface (e.g., from the user agent interface) at least one call application message including a request to create at least one call connection to telephony device on a connection-based network. The processor, under direction from the user agent, generates at least one call signaling message containing call connection information related to the telephony device coupled to a connection-based network and then forwards, via the second interface, the at least one call signaling message to the connection-based network in order to create the at least one call connection to the telephony device on the connection-based network.

In another arrangement, the processor executes the first user agent to generate the at least one call signaling message indicating at least two call connections that are to be completed between at least two different pieces of telephony device on the connection-based network and the processor forwards, via the second interface, the at least one call signaling message indicating the at least two call connections to a telecommunications network server coupled to the connection-based network, such that the telecommunications network server can create and maintain the at least two call connections to allow the at least two different pieces of telephony device on the connection-based network to performs telecommunications with one another.

In yet another configuration, the processor executes the first user agent to generate at least one call signaling message containing call connection information related to computer telephony device coupled to the connection-less network. Also, the processor forwards, via the first interface, the call signaling message containing call connection information related to a computer telephony device to the computer telephony device located on the connection-less network in order to establish at least one voice-over-computer-network session between the computer telephony device and a voice-over-computer-network server. The processor also bridges, via the first and second interfaces, the voice-over-computer-network session on the connection-less network to the call connection on the connection-based network so that the telephony device on the connection-based network can perform telecommunications with the computer telephony device on the connection-less network.

In still another arrangement, the processor initiates execution of a user agent respectively associated with a source of the at least one call application message. The processor also forwards the call application message including the request to create the call connection to the user agent and then the processor executes the user agent to process the call application message to determine the call connection information related to the telephony device on a connection-based network. The call connection information includes a call source identifier (e.g., source phone number or caller id) indicating a source telephony device and/or user (i.e., a person or machine making the call) for the call connection and includes a call destination identifier (e.g., the phone number being called) indicating a destination telephony device (e.g., a person or machine being called) for the call connection. The user agent, when executing on the processor, generates at least one call signaling message indicating the call source identifier and generates at least one call signaling message indicating the call destination identifier. This allows the user agent to cause the telecommunications network server to establish a telecommunications session between the source and destination.

In another arrangement, the processor determines the source of the call application message and determines if a user agent associated with the source of the call application message is currently executing, and if not, causes execution of the user agent. This allows a runtime environment of the telecommunications hosting server to start user agents when needed.

In another configuration, the processor, receives a call signaling message from the connection-based network indicating a status of a connection on the connection based network and the processor forwards the call signaling message received from the connection-based network to an appropriate user agent. In this case, the user agent, while executing on the processor, updates call connection status information associated with the appropriate user agent based on the call signaling message indicating the status of the connection on the connection based network.

In another configuration, the processor executes the first user agent to receive, in the telecommunications hosting server, at least one first call signaling message from the connection-based network indicating a request to establish at least one call connection to telephony device associated with a user agent. The processor also executes the first user agent to generate at least one second call signaling message containing call connection information related to the telephony device associated with the user agent. The processor also executes the first user agent to forward the at least one second call signaling message in order to establish the at least one call connection with the telephony device associated with the user agent.

In another configuration, the telephony device associated with the user agent is telephony device coupled to the connection-based network and the processor, under direction of the user agent, forwards the at least one second call signaling message to a telecommunications network server coupled to the connection-based network, such that the telecommunications network server can create and maintain at least one call connection on the connection-based network allowing telecommunications between telephony device associated with a source of the at least one first call signaling message and telephony device associated the user agent.

In yet another configuration, the telephony device associated with the user agent is a computer telephony device (e.g., a computer system with a microphone and speaker or a telephone handset coupled to the computer) coupled to the connection-less network and the processor, under direction of the user agent, forwards the at least one second call signaling message to the computer telephony device coupled to the connection-less network to establish a voice-over-computer-network session. Also in this arrangement, the processor bridges the voice-over-computer-network session on the connection-less network to a call connection on the connection-based network specified in the first call signaling message, such that telephony device associated with the source of the first call signaling message on the connection-based network can perform telecommunications with the computer telephony device on the connection-less network. This allows both voice over computer network (e.g., VOIP) calls and PSTN based calls to be managed by the invention.

In another arrangement, the operations of receiving, generating, and forwarding are performed by a user agent that is executed on the processor in response to the telecommunications hosting server processor detecting the at least one first call signaling message. In this case, the user agent selected for execution by the processor is based on the identity of a destination and/or source call identifier specified in the at least one first call signaling message.

In another configuration, the processor executes the first user agent to process, in response to receiving the at least one first call signaling message, at least one invite processing and exposure rule based on a source of the at least one first call signaling message. Such rules allow the agent to act on the user behalf. Also in this configuration, the processor, under direction of the user agent, determines if the at least one call connection should continue based on an outcome of the step of processing, and if so, proceeds to perform the steps of generating and forwarding noted above.

In another configuration, the processor, while executing the first user agent, interprets the at least one call signaling message received from the connection-based network to generate at least one inter-agent message which the processor forwards to second user agent executing within the telecommunication hosting server. This allows one agent to communicate with another via messaging to signal the arrival of incoming calls, to check status, and so forth as will be explained herein.

In another configuration, the connection-less network is a computer network and is coupled to the first interface and the connection-based network is a telephone network and is coupled to the second interface and the end-user equipment is a telephony device. In such a configuration, the first user agent communicates with the user client on the computer network to allow telephone calls to be placed and accepted via the telephony device coupled to the connection-based network.

In still another configuration the coupling to connect to a connection-less network includes a coupling to a telecommunications network server. In this case, the telecommunications network server is a computerized device that includes a coupling to telephone switching equipment on the connection-based network and the telecommunications network server can control call connections within the telephone switching equipment that are placed and received on the connection-based network under direction from the telecommunications hosting server.

In another configuration, the first user agent provides enhanced calling services between telephony device coupled to the connection-based network under control of the user client. The enhanced calling services can include conference calling, call redirect, caller identification, and call joining, and auto attendant and auto-routing, as well as other explained herein.

In another configuration, the system performs a second user agent that is associated with a different user client than the first user agent and coupled to the connection-less network. The second user agent executes on a processor in a telecommunications hosting server and includes a means for intercommunicating (e.g., IPC mechanisms and inter-agent messages) with the first user agent. The second user agent may perform or execute in the same telecommunications hosting server as the first user agent or a second telecommunications server may be provided which is configured with similar interfaces, memory and a processor as in the first telecommunications server. In this case, the second telecommunications hosting server executes the second user agent which communicates over the connection-less network to exchange availability information concerning the status of one ore more telephony devices on the connection-based network that are associated with each of the first and second user agents.

If the first and second user agent perform within the same telecommunications hosting server, then a form of inter-process communication can be used to allow the agents to communicate. It is to be understood that there may be many more that two user agents as well. In variations of this embodiment, there may be groups of telecommunications hosting servers that are geographically dispersed, or a group may serve a single local, with many groups in different locales. The telecommunications hosting server configurations may be central of distributed. In a distributed arrangement, a load balancer may cause the user agent for a particular user to perform on (i.e., to be executed on) any one of a selected group of telecommunications hosting servers, depending upon load conditions.

In another embodiment, the telecommunications hosting server includes a voice over computer network gateway coupled to the first and second interfaces. The voice over computer network gateway in the telecommunications hosting server allows the first user agent to generate and send at least one call signaling message containing call connection information related to computer telephony device coupled to the connection-less network to the voice over computer network gateway. The voice over computer network gateway forwards, via the first interface, the at least one call signaling message containing call connection information related to computer telephony device to the computer telephony device located on the connection-less network in order to have the voice over computer network gateway establish at least one voice-over-computer-network session between the computer telephony device and a voice over computer network gateway. The voice over computer network gateway also bridges the at least one voice-over-computer-network session on the connection-less network to the call connection on the connection-based network so that the telephony device on the connection-based network can perform telecommunications with the computer telephony device on the connection-less network.

The invention also provides a system for providing enhanced telecommunications services. In one configuration, the system comprises at least one telecommunications hosting server coupled to a connectionless network and a plurality of user agents. Each user agent executes on one of the telecommunications hosting servers and each executes on behalf of a respective user. The telecommunications network server is coupled to the connection-less network and is coupled to a connection-based network. The telecommunications network server is capable of establishing call connections to at least one telephony device coupled to the connection-based network based on messaging signals received from the plurality of user agents executing on the at least one telecommunications hosting server on the connection-less network, thus allowing a respective user of a user agent to establish telecommunications on the connection-based network via instructional commands sent to the user agent on the connection-less network.

In another arrangement, the,plurality of user agents are programmable by the users of such user agents, and the instructional commands are rules provided by the user of the user agent that indicate to the user agent how to process incoming call signaling messages, call application messages and inter-agent messages. Such rules may depend upon, or may inquire when used or performed, as to the state of a single user agent or the rules may depend upon and determine the state or collective state of many user agents.

In yet another arrangement, the rules are invite processing rules and when the user agent receives a call signaling message indicating that a call connection is desired to be established with the user associated with the user agent receiving the call signaling message, in response thereto, the user agent determines a call source identifier of the call signaling message and processes the call source identifier in conjunction with the invite processing rules to determine if a call connection should be established with the user of the user agent. The rules are thus an example of the programming of a user agent.

In another embodiment, the user agent is programmed by the user via instructional commands or other user interaction to provide a call signaling message containing custom audio information back to a telecommunications network server in response to receiving an incoming call signaling message from the telecommunications network server indicating that a call connection is desired to be established with a user of the user agent. The call signaling message contains the custom audio information and is received by the telecommunications network server and the audio information is provided on a call connection associated with the call source identifier of the incoming call signaling message. In this case, a user of telephony equipment that caused the telecommunications network server to originate the incoming call signaling message can audibly hear the custom audio information. This allows a user to specify custom audio messages such a wave (.wav) files to be provided back to the telecommunications network server in response to incoming call connections. The .wav files can be played by the telecommunications network server over the phone switch to the call originator(s).

In another arrangement, the custom audio information is a custom voice message provided by the user to the user agent, while in yet another arrangement, the custom audio information is a custom dial tone provided by the user to the user agent.

Another arrangement provides that the at least one telecommunications hosting server is a plurality of telecommunications hosting servers located on and possibly spread out on the connectionless network. In this case, each user agent of the plurality of user agents executes on at least one of the plurality of telecommunications hosting servers. Each user agent, upon execution, can registers the telephony device that is associated with the user agent at that time with the one or more telecommunications hosting servers upon which that user agent performs, such that call connections made to telephony device(s) that are associated with the user agent are indicated to the user agent.

The system also provides a telecommunications network server comprising a coupling to at least one telecommunications hosting server and a coupling to a connection-based network. A processor is provided that performs the operation of executing a telecommunications service process, such as a user agent. The telecommunications service process is capable of establishing call connections to telephony devices coupled to the connection-based network upon receipt of call signaling messages received from the telecommunications hosting server. The service process is also capable of indicating, via a call signaling message sent to the connection-less network, the availability or existence of a call connection on the connection-based network that presently exists within the telecommunications network server.

In a related embodiment, the coupling to the at least one telecommunications hosting server is a coupling to a plurality of telecommunications hosting servers. As such, each telecommunications hosting server capable of providing a call signaling message to the telecommunications network server to direct the telecommunications network server to control call connections on the connection-based network.

Another embodiment of the invention provides a user agent process performing within a telecommunications hosting server. The user agent process includes a means for receiving at least one call signaling message indicating an incoming call connection. Also included is a means for processing the at least one call signaling message to provide enhanced calling services including at least one of conference calling, whisper room conference calling, time-based whisper room conference calling, callback, time-based callback, call redirect, caller identification, call joining, and auto attendant.

In another embodiment, referred to as a call-back embodiment, the user agent includes a means for detecting that the incoming call connection is from a user associated with the user agent. In this case, the user agent further includes a means for allowing the user to review at least one instance of call logging information including the call source identify of at least one former caller who attempted to access the user via the user agent. Reviewing call logging information can be done, for example, when the user listens to voice mail messages maintained by the user agent. The user agent in this embodiment also includes a means for allowing the user to enter a call-back signal to the user agent. The call back signal causes the user agent to direct a telecommunications network server to establish a call connection to a call source identity of the particular instance of call logging information to which the user directed the call-back signal. Also includes is a means for directing the telecommunications network server to bridge the call connection to the call source identity of the particular instance of call logging information to which the user directed the call-back signal with the incoming call connection associated with the user, such that the user is placed in a telecommunications session with telephony equipment associated with the call source identifier. This allows a user who is listening to voice mail, for example, to enter a call-back signal in response to which the user agent places a call to the caller who left the voice mail.

Embodiments of the invention also can be embodied as software. In this case, embodiments of the invention include a computer program product having a computer-readable medium including computer program logic encoded thereon for providing enhanced telecommunications services, such that the computer program logic, when executed on at least one processing unit with a telecommunications hosting server, causes the at least one processing unit to perform the all of the aforementioned methods, steps and operations. That is, user agents, the user agent interface, the components of the telecommunications hosting server and the telecommunications network server and related data system and agent data structures for example can be programs written in software in any language. Such program may also be compiled into object code. As such, a computer readable medium such as a CDROM, floppy or hard disk or even a data structure in memory or that is transferred as a propagated signal (e.g., as a URL or as an email message) that contains the code in source or object form for any portion of this invention, such as a user agent, the telecommunications hosting server processing or telecommunications network server processing, of the user agent interface processing, or user agent or telecommunications hosting server data structures are all considered embodiments of the invention without the requirement that this code and/or data be loaded into a computer system or telephone equipment.

The methods and arrangements of the invention are preferably implemented primarily by computer software and hardware mechanisms. Certain embodiments of this invention, as summarized above and as explained more fully below, are implemented in software products and computer systems outfitted and configured by MetaTel, Inc. of Waltham, Mass., who is the assignee of the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 12 illustrates an example interface provided by a user agent to a user of the invention.

DETAILED DESCRIPTION OF PREFERRED EMBODIMENTS

As summarized above, the invention provides a unique telecommunications system that uses software applications called user agents, that are preferably Internet-based and that operate on behalf of users in a telecommunications hosting server to control call connections under control of a telecommunications network server that interfaces with the telecommunications hosting server as well as a connection-based public telephone network. The telecommunications hosting server operates on a computer network on behalf of the user agents to provide call signaling in support of many advanced calling and telecommunications services as will be explained. The functionality and performance (e.g., execution) of the user agent(s) preferably takes place primarily within the telecommunications hosting server, though user client computers (to be explained) can provide some and possibly all of the user agent functionality, depending upon the particular implementation chosen. The telecommunications hosting server generates call signaling messages from various interactions that can occur (both user and other inter-agent interactions) with the user agent software applications and then the telecommunications hosting server forwards the call signaling via an interface to the telecommunications network server which then controls the public telephone switching equipment. The telecommunications network server can control the public telephone network switching equipment based on the call signaling messages to place, track, and otherwise manipulate basic call connections as needed. The telecommunications network server that interfaces to the public telephone switching equipment does not however provide the advanced call service logic and thus isolates the public telephone network from abuse.

In this manner, the invention allows users to control telephone call connections on a circuit switched or connection-based public telephone network via interaction with robust, feature laden user agent software applications that execute on a telecommunications hosting server on a connection-less network such as the Internet. Since the design of the system of the invention provides call signaling in an easy-to-use software implementation, development of new advanced telecommunications services is made much easier. Moreover, since the system of the invention generally uses a conventional public telephone network for voice transport and basic call connection support, the system takes advantage of the broad geographic reach and quality of voice transport provided by the public telephone network without the costs associated-in providing a private telephone network such as an ACD or PBX-based network.

Figure 1:
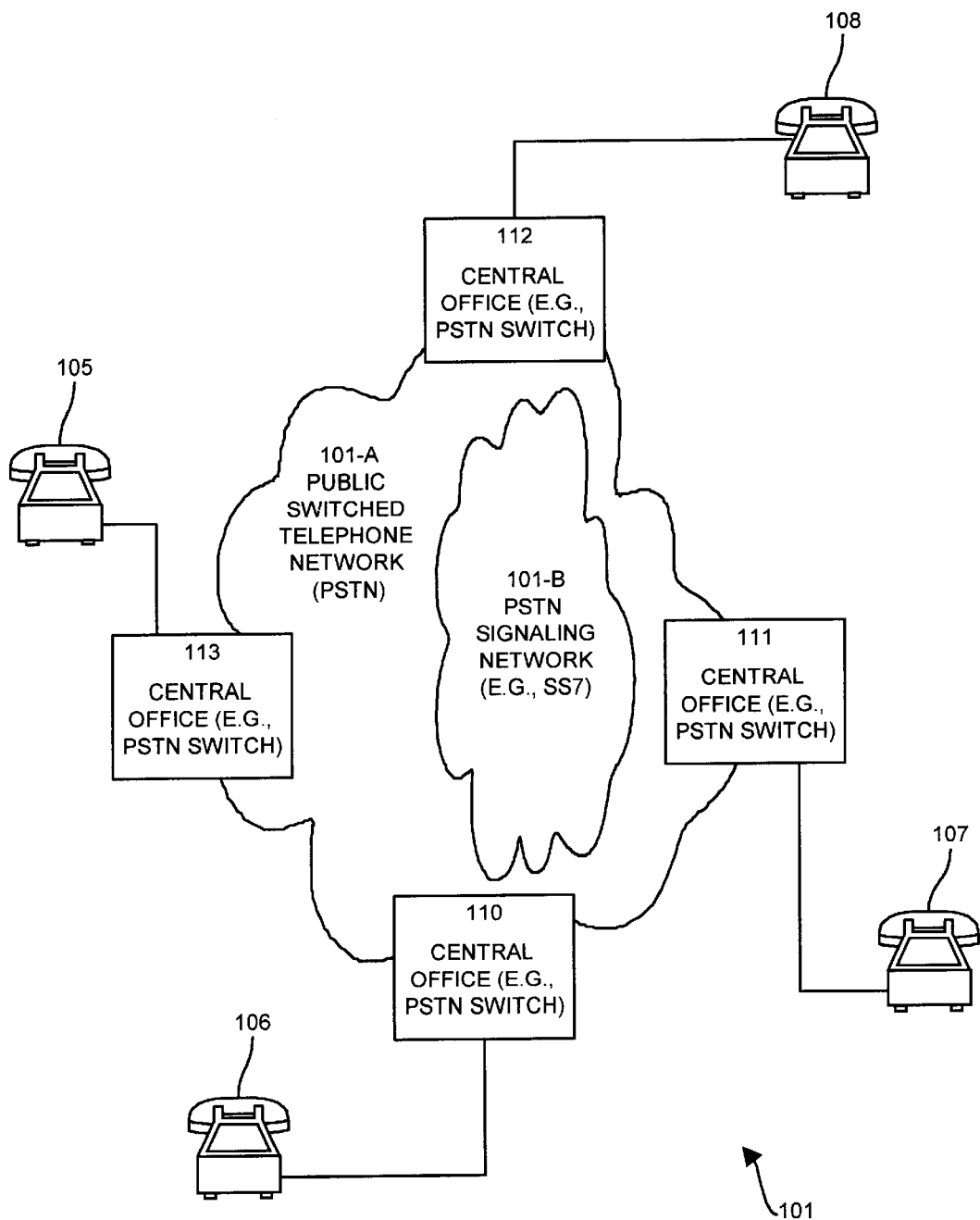
FIG. 1 illustrates an example of a prior art connection-based telephone network.
Figure 2:
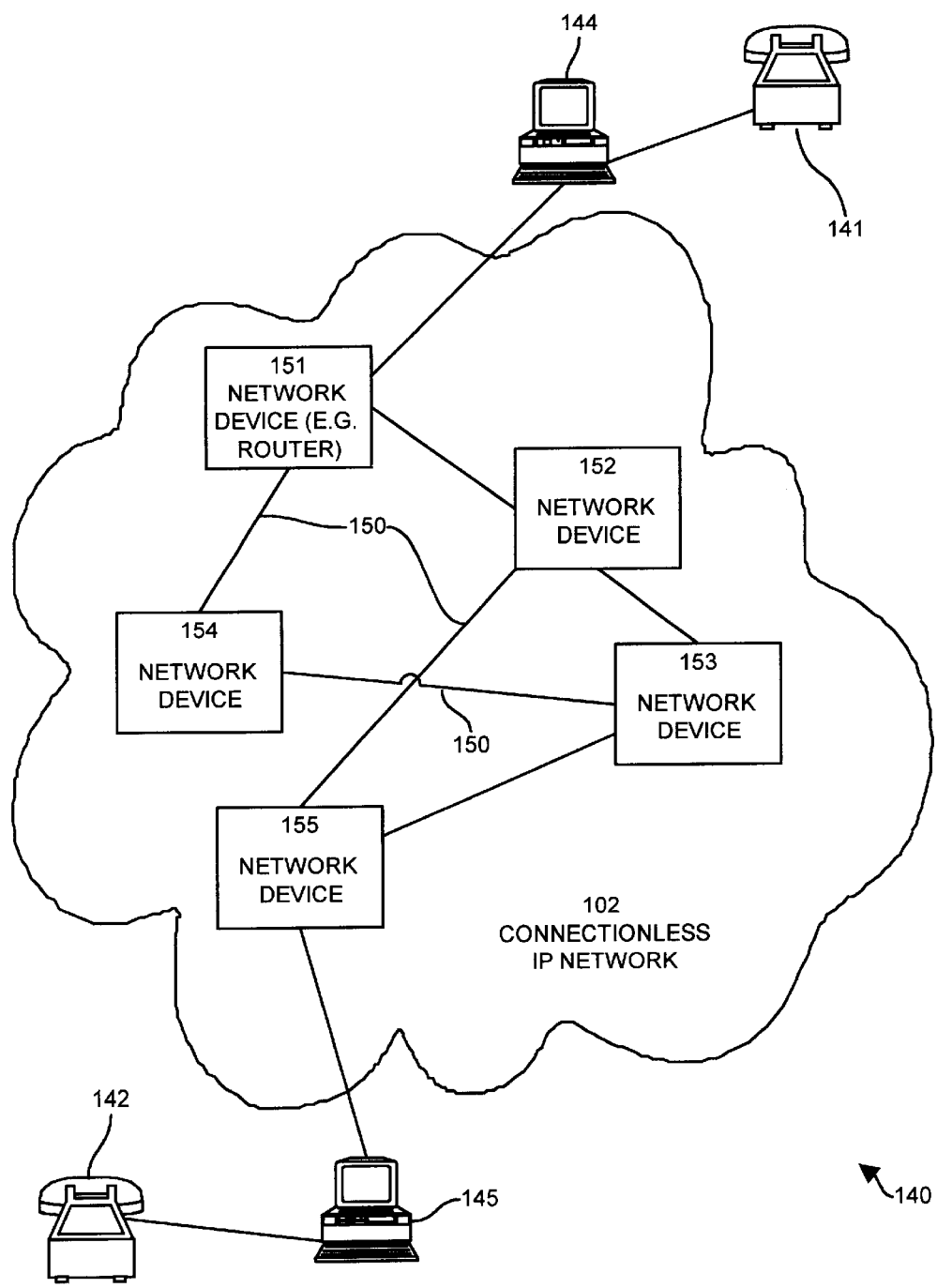
FIG. 2 illustrates an example of a prior art connectionless network such as an IP network providing telecommunications using Voice Over Internet Protocol (VOIP) technology.
Figure 3:
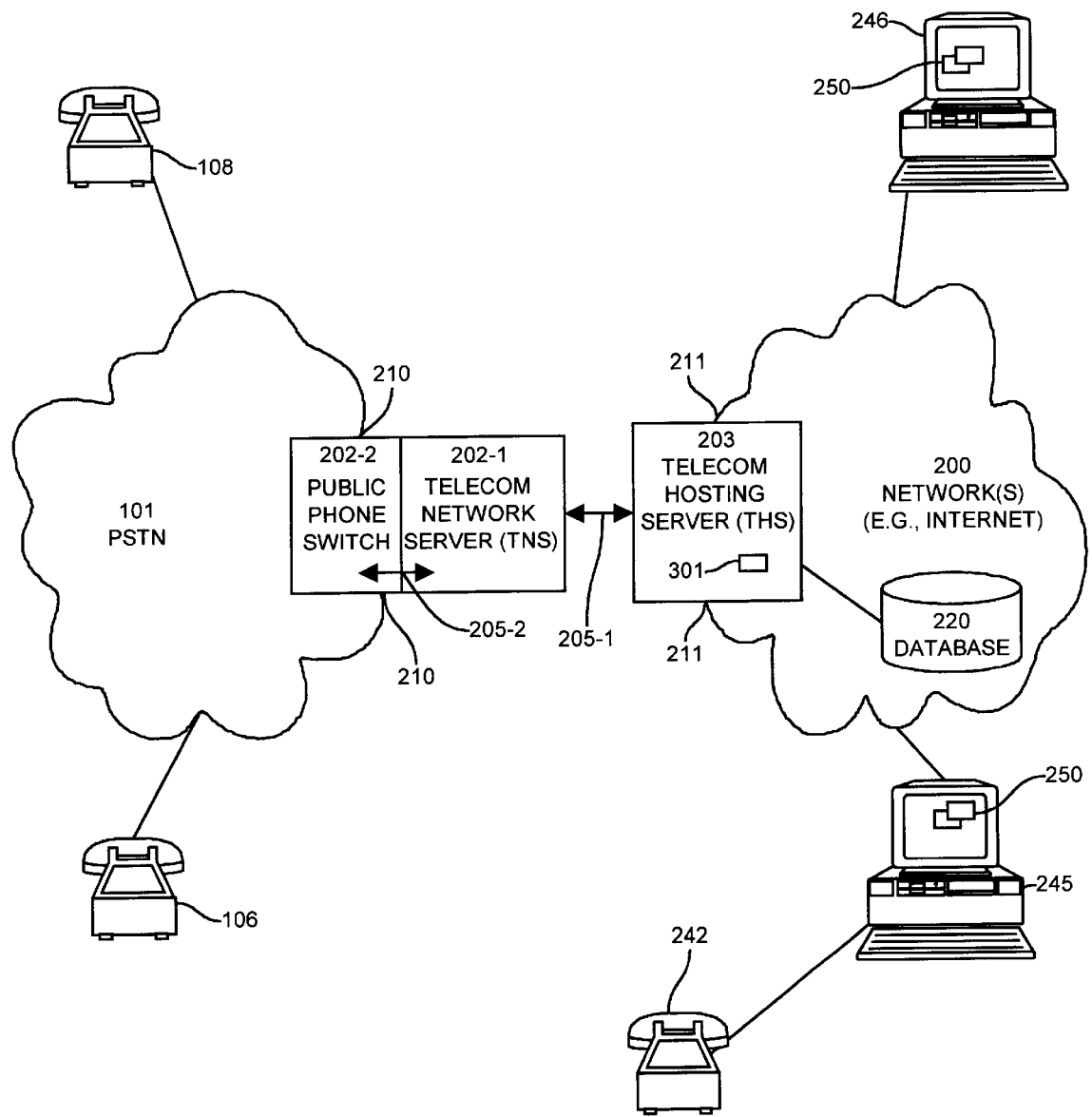
FIG. 3 illustrates how a telecommunications hosting server and a telecommunications network server provided by the invention can provide users on a connectionless network with advanced telecommunications services that allow such users to manage call processing for telecommunications sessions that transpire on a connection-based telephone network.

FIG. 3 illustrates one preferred embodiment of the system of the invention as configured to operate between a connectionless IP computer network 200 and a conventional connection-based public switched telephone network (PSTN) 101. The system of the invention includes an interconnection of a telecommunications hosting server 203 which is a computer system coupled via a telecommunications interface 205-1 to a telecommunications network server 202-1 which is in turn coupled via interface 205-2 to a public phone switch 202-2. The telecommunications hosting server 203 and the telecommunications network server 202-1 may each be, for example, a Unix or Windows based computer workstation. The public phone switch 202-2 may be a public telephone switch. The interface 205-1 may be-a connectionless network interface such as an IP-based Ethernet, or interface 205-1 may be a hardwired interface such as a serial port bus and/or may be a proprietary closed interface that operates a proprietary protocol for communicating between the telecommunications hosting server 203 and the telecommunications network server 202-1. Likewise, the interface 205-2 may be open or closed, standard or proprietary.

The telecommunications hosting server 203 further includes one or more computer network interfaces 211 which provide the telecommunications hosting server with access to the computer network 200. Within the computer network 200, the telecommunications hosting server 203 can access system data and information in a database 220, as will be explained in more detail later. The system of the invention also includes one or more user agent interfaces 250 that operate (e.g., execute, get interpreted, or otherwise perform) on computer hosts 245 and 246 to communicate over the computer network 200 with respective user agents 301 (only one shown in FIG. 3) that operate (e.g., execute or otherwise perform) on a processor (not shown) in the telecommunications hosting server 203. The system further includes one or more public telephone network interfaces 210 which allow the public phone switch 202-2, under direction and control of the telecommunications network server 202-1 and the telecommunications hosting server 203, as will be explained, to form call connections with telephony devices such as 106 and 108 on the PSTN 101. Computer host 245 also includes, in this example, a coupling to computer telephony equipment 242, though this is not required in all embodiments of the invention.

In a preferred embodiment, the telecommunications hosting server 203 is a standalone computer system coupled via a connectionless data interface 205-1 to the telecommunications network server 202-1 which is then coupled to the public phone switch 202-2 which operates to establish call connections on the PSTN 101. The PSTN 101 in this example is a conventional public telephone network and includes two user telephony devices 106 and 108, which may be telephones (wireless or direct connect), answering machines, fax machines, or any other type of telephony device that operates on a public telephone network.

The system of the invention allows, for example, a user (e.g., a person, not shown) of the computer host 246 to control the user agent interface 250 which interacts with a respective user agent 301 that performs (e.g., executes) within the telecommunications hosting server 203. The user is able to direct the telecommunications hosting server 203, via sending call application messages (not shown in this figure) to his or her respective user agent 301, to provide advanced calling services on the public telephone network on behalf of the user. In other words, by using for example an Internet-based user agent interface 250, a user can control call connections on the PSTN 101. No call needs to pass through a separate PBX or private telephone network. The system of the invention thus performs call signaling using the computer network 200 while the actual transport of voice is provided using the PSTN 101. Generally in accordance with the invention, the telecommunications network server 202-1 operates as a service control point (SCP) or Service Node to the telephone network 101 and the public phone switch 202-2 operates as a signal transfer point (STP) on the public telephone network 101. By removing the call service logic processing from the telecommunications network server 202-1 and placing this logic into the user agents 301, the invention can provide advanced software services which then can instruct the telecommunications network server 202-1 to create call connections as needed on the public phone switch 202-2. Since all advanced call service logic is provided in the user agent 301, no proprietary private phone network or PBX is required to be managed by the telecommunications network server 202-1. Instead, the telecommunications network server 202-1 can simply instruct the public phone switch 202-2 to place, detect or receive call connections. Since the advanced calling services provided by the invention merely require call connection establishment on the PSTN 101, a PBX system offering complex management features and services is not required. Instead, the user agents 301 handle the required service logic completely within the connectionless network 200 on the telecommunications hosting server 203.

By way of example, the user agent 301 in the telecommunications hosting server 203 can receive a call application message (not shown) from a respective user agent interface 250 (e.g., from a user of computer system 246) which includes a request to create a call connection (not specifically shown) to user telephony equipment (e.g., 106 and/or 108) on the connection-based PSTN network 101. In response to receiving such a call application message(s), the telecommunications hosting server 203 (i.e., the agent 301) can generate at least one call signaling message (not shown in FIG. 3) containing call connection information related to the user telephony equipment 106 and/or 108 (as specified in the call application message) and can forward the call signaling message to the telecommunications network server 202-1 via the telecommunications interface 205. The telecommunications network server 202-1 can receive the call signaling message and can create at least one call connection to user telephony equipment such as telephones 106 and/or 108 on the PSTN 101. In this manner, a user agent 301 under control of a user via user agent interface 250 can control telephone calls and services made on the telephone network 101.

The public phone switch is insulated from the particular service(s) that is/are being implemented by the invention and only is instructed to create or remove call connections. Since this is all that is required of the public phone switch 202-2 in this invention, no PBX private phone system is required thus saving the user of this invention money and providing the services offered by the invention to the consumer market. In other words, since no special network equipment such as ACDs or PBXs are required, home owners and average Internet consumers can benefit from the advanced calling services provided by the invention. The system design of this invention also allows a consumer, for example, to use the advanced calling services explained herein between other public telephone users (e.g., other average consumers who also do not have PBXS) in diverse geographic locations. Since no PBX is required, the services of the invention may be offered between any two or more users of the public telephone network anywhere in the world, and no one of those users is required to have special telephone networking equipment.

Returning to the discussion of FIG. 3, the user interface 250 may be, for example, a web browser interface such as one provided by the Netscape Navigator web browser manufactured by Netscape Corporation or Internet Explorer manufactured by Microsoft Corporation. Netscape and Internet Explorer are registered trademarks of their respective manufacturing organizations. The user agent interface 250 may include an applet (e.g., a version of a Java-based software application) that is downloaded to the web-browser interface 250 in the computer systems 245/246 and that interacts with a respective user agent 301 that operates within the telecommunications hosting server 203. Alternatively, the user interface 250 may be an interactive voice response system interface that uses speech recognition to allow a person to speak to control input to the computer system(s) 245, 246. More specific examples of the user agent interface 250 will be presented later along with a description of the services offered to users of the system of the invention.

Figure 4:
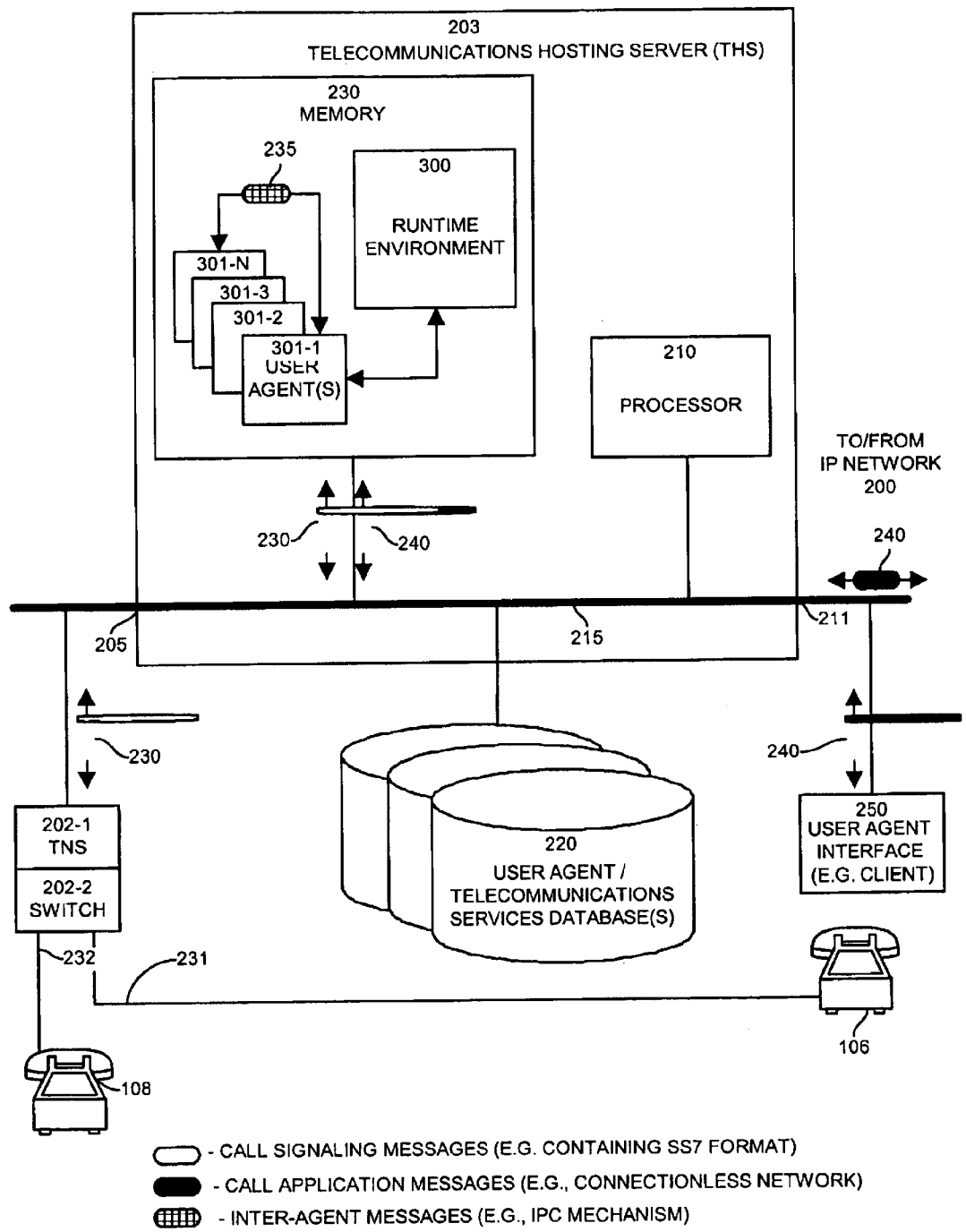
FIG. 4 illustrates a more detailed design of the telecommunications hosting server including user agents and call application and call signaling message processing according to one embodiment of the invention.

FIG. 4 illustrates a more detailed design of an example embodiment of portions of the system of the invention. As illustrated, the telecommunications hosting server 203 in this example embodiment includes a data bus 215 that interconnects a processor 210 and a memory 230 encoded with a runtime environment 300 and a plurality of user agents 301-1 through 301-N. The user agents 301 and the runtime environment 300 are programs, processes, routines, procedures, threads, tasks or the like which the processor 210 in the telecommunications hosting server 203 can execute, interpret, run or otherwise perform. The data bus 215 also interconnects one or more of the computer network interfaces 211 as well as the telecommunications interface 205 to the telecommunications hosting server 203. The telecommunications hosting server 203 also has a coupling to the database(s) 220, which in this example includes user agent and telecommunications services data. The user agent interface 250 shown in this example acts as a client to communicate with one or more of respective user agents 301, which operate in this context as one or more servers. In other words, the user agent interface 250 and user agents 301 can operate in a client/server model using, for example, web-based data exchange and messaging protocols such as the hypertext transfer protocol (HTTP), Java Beans, CORBA, SMTP, Multicasting, SSL or other Internet secure or non-secure messaging and data exchange protocols.

In operation of the system components shown in this figure, call application messages 240 are exchanged between the user agent interface 250 and generally one associated user agent (e.g., 301-1). That is, in a preferred embodiment, each human user of the system is assigned a particular user agent 301, and a user interacts with the system via a user agent interface 250 that allows the user to send and receive call application messages 240 to and/or from his or her respective user agent 301. The user agent 301 for a respective user may require that the user first log in to the telecommunications hosting server 203 via the user agent interface 250 for security and authentication purposes. The telecommunications hosting server 203 can obtain and verify user agent information such as a username/password combination against similar data maintained in the database 220 to process and authenticate the user's access to the telecommunications hosting server 203. Thereafter, a user can control his or her user agent 301 to provide relatively simple but novel, or very advanced calling services as provided by embodiments of this invention explained herein. The general concept of the system design of this embodiment of the invention is that each user agent 301 is assigned to a particular system user and each can be programmed and configured by that user in a manner that is desirable to that user. Since all call service logic is handled by the user agent within the telecommunications hosting server, security of the public telephone switch 202-2 is enforced since the telecommunications network server 202-1 acts as a firewall between the telecommunications hosting server (and agents acting on behalf of users) and the public phone switch 202-2.

In operation, the system uses call signaling messages 230 to communicate between a user agent 301 and the telecommunications network server 202-1. The call signaling messages 230 can specify, for example, at least two call connections to be placed by the public phone switch 202-2 under control of the telecommunications network server 202-1. In the illustrated example for instance, a call application message 240 sent by a user on the computer network 200 to a user agent 301 may indicate that the user desires to place a telephone call from the public telephone network user telephony device 106 (a call source identifier) to the public telephone network user telephony device 108 (a call destination identifier). The user agent 301 that receives such a call application message 240 containing call source and destination identifiers can generate a call signaling message 230 that indicates that the telecommunications network server 202-1 is to control the public phone switch 202-2 to place a call connection to each user telephony device 106 and 108. The call signaling message 230 can be verified as originating from a specific user agent 301, and not from an imposter, for example, using well known encryption and authentication techniques. The telecommunications network server 202-1 that receives such a call signaling message 230 can cause the phone switch 202-2 to create and maintain the call connections 131 and 132 to allow the different user telephony devices 106 and 108 on the connection based PSTN 101 to perform telecommunications (e.g., voice communications) with each other.

Since the telecommunications network server 202-1 is the device that actually manipulates the public phone switch 202-2 and does so at only a basic or fundamental level of simply establishing, monitoring and removing call connection, and thus contains rather limited if any actual call service processing logic as compared to the telecommunications hosting server 203 and it's associated user agents 301 (which operate out on the connectionless computer network, externally from any telephone switching equipment), public telephone companies are more accepting of the installation of a telecommunications network server 202-1 within the confines of a central office. In a sense, the design of the invention splits call service processing logic into the advanced features that are implemented in software on the user agents 301, while deploying the basic call connection logic into the telecommunications network server 202-1 to actually control the public phone switch 202-2.

The design of this invention thus greatly enhances a telephone companies acceptance of this technology and further allows call connections to be placed between any users of the public telephone network, which defines an extremely large marker of public telephone subscribers. This design differs significantly from prior art advanced calling service designs (e.g. Dezonno et al.) in which a telephone computer simply controls a PBX to invoke the calling services that the PBX already offers within the private telephone network. Such prior art designs are limited to requiring at least some users of the service to be within the PBX network and such system include the extremely expensive costs of establishing a PBX or an ACD network which a typical consumer does not own or operate. As such, the invention in this context allows a company to provide the invention as a service to consumers, since each consumer in the public at large already has a telephone connection to the public switched telephone network. Examples of the invention employed in this manner are the advanced telephone calling services and software modules provided to consumers and other entities over the Internet from MetaTel, Inc., the assignee of the present application. Thus, using the design of the invention as employed in the MetaTel systems, for example, a company that might not have the money to invest in a PBX network can still gain the competitive advantages of advanced calling services as explained herein.

For example, in one embodiment, the telecommunications network server 202-1 can control the public phone switch 202-2 to first create a call connection 231 to the user telephony device 106, which may be physically located nearby to the human user controlling the user agent interface 250 in FIG. 3. The call connection 231 may cause the user telephony device 106 to ring, at which point the user of the user agent interface 250 can pick-up and answer the ringing handset 106. When the telecommunications network server 202-1 detects, via the phone switch 202-2, that a person (the user) has picked up the handset of user telephony device 106, the phone switch 202-2 under control of the telecommunications network server 202-1 can place a second call connection 232 to the user telephony device 108, also as specified in the aforementioned call signaling message 230. The second call connection 232 will cause a handset of the user telephony device 108 to ring as well. Once the telecommunications network server 202-1 has caused the phone switch 202-2 to place the call connections 231 and 232, the telecommunications network server 202-1 can instruct the phone switch 202-2 to bridge the two connections 231 and 232 together thus creating a single telecommunications session in the form of a public switched telephone network telephone call between the user of the user telephony device 106 and the user of the user telephony device 108. The first user (of user agent interface 250) that is listening on the telephony device 108 is able to hear the ringing of the user telephony device 108, just as if that user had dialed the phone number of the user telephony device 108 directly from the handset of the user telephony device 106 using conventional calling mechanisms provided by a PSTN. If and when a user of the user telephony device 108 answers the ringing handset of the user telephony device 108, the user telephony devices 106 and 108, the call connections 131 and 132, and the phone switch 202-2 under control of the telecommunications network server 202-1 place the two users in voice communications with each other. Thus, the required call service logic provided by the telecommunications network server 202-1 is rather limited to creating, maintain, bridging, and disconnecting call connections within the PSTN 101, via the public phone switch 202-2. Since such functions are typically allowed to be controlled via regular telephone devices (e.g., consumer telephones 106, 108 can make calls by themselves) anyway, allowing the telecommunications network server 202-1 to have such direct control of the public phone switch 202-2 does not pose any unnecessary security issues with respect to public phone switch access, control or security. Since the advanced call processing and service logic which is explained herein is provided primarily by the user agents 301, which do not have direct access to the public phone switch 202-2, the design of this invention is preferred for use in public telephone networks.

It is to be understood that while the former example explained an operation of the system of the invention with respect to a telecommunications session between only two users, since each call connection to each user is treated by the system of the invention as a separately manageable call connection within the public phone switch 202-2, any number of such call connections, and thus any number of callers, can be incorporated into a single bridged call or a conference call. This ability significantly overcomes many of the problems of prior art systems that require a PBX for such features and as explained herein, provides the ability of the system of the invention to offer very advanced calling services.

The telecommunications network server 202-1 of the invention also may the basic functionality to detect the status of call connections such as 231, 232 and the status of user telephony devices such as 106 and 108 on the connection-based PSTN 101. These functions are also generally available to telephone devices in the form of busy signals, on-hook, off-hook, etc. As such, providing the telecommunications network server 202-1 with these rudimentary features does not compromise the integrity of the public phone switch 202-2. In the context of the former example, these status indicators can indicate successful completion of the call (i.e., that the call connections were bridged and then that the second call connection 232 was successfully answered). Alternatively, the status of each call connection and/or one or more user telephony devices might perhaps be ringing, answered, busy, off-hook, on-hook, call waiting (as provided by a conventional call waiting service within the PSTN 101) or another value. In any event, the telecommunications network server 202-1 can detect this status at various times (e.g., upon a request from the telecommunications hosting server 203, randomly, at scheduled or periodic intervals, or based upon signaling from the telephone network 101 and/or phone switch 202-2) as required and can report such a status back to one or more of the user agents 301 and the telecommunications hosting server 203 via another call signaling message 230. Upon receipt of such a call signaling message 230 containing the status of a user telephony device (e.g., the status of telephone 106) and/or a status of a call connection or circuit provided by the phone switch 202-2 within the PSTN 101, the appropriate user agent(s) 301 can update call connection status information (not specifically shown in this figure) for a particular user and may use this information as required for the particular advanced call service for which that user agent 301 is programmed.

The system of the invention can use status information provided in the manners described above for a number of purposes. As will be explained more fully later, user agents 301, for example can maintain availability information concerning the state of user telephony equipment associated with a user agent 301 via periodic status checking using call signaling messages 230. For example, if a user is currently using a user telephony device (e.g. 106) during a telephone call (e.g., line is busy), the telecommunications network server 202-1 can periodically detect this via a status check and can report this to the user agent 301 associated with the user of that particular user telephony device 106. A user agent 301 can thus maintain the current status (e.g., on hook, off hook, call connection in progress, call connection to one ore more specific destination telephony devices via caller id, and so forth) of telephony equipment on the connection-based PSTN 101. The feature laden user agent 301 can thus present and use this information for a number of purposes as defined herein as the advanced calling services of this invention.

If, for example, another user having an associated user agent 301-1 attempts to establish a call connection with a user telephony device that also has an associated user agent 301-2 within the telecommunications hosting server 203 (e.g., a user is calling another user who is also registered and has a user agent 301 with the telecommunications hosting server 203), the first user agent 301 can communicate using one or more inter-agent messages 235 to determine the status of the destination user telephony device before an actual call is placed. Inter-agent messages 235 are implemented, for example, using inter-process communication (IPC) mechanisms within the telecommunications hosting server 203. In other words, the user agents 301 can track status information of various users through queries to other user agents and via queries for call connection or telephony device status information from the telecommunications network server 202-1. Such capability allows one user agent 301-1 to determine the calling status of another user associated with another user agent 301-2 through 301-N. Calling status can include a current status of the user at that time (e.g., on the phone, not taking calls, available), as well as a future planned calling status which may indicate, for example, an upcoming conference call during which the user will be unable to accept other calls. In other words, if a user "programs" his or her agent 301 to set aside a time in which he or she is not to be disturbed, any incoming calls for that user will be rejected. Such call status inquiries might be from another user agent, or they may be from a true incoming call that is handled by the public phone switch 202-2 in which case the telecommunications network server 202-1 can detect the arrival of such calls, and can send such call arrival information via a call signaling message 230 to the user agent 301, which can reject the call. Inter-agent communications in this manner and as will be explained further allows the system of the invention to provide an impressive array of advanced calling services that have never before been available in conventional telecommunications systems.

These features of the system of the invention, that is, the ability to both place call connections on the PSTN 101 and to determine either before, during or after a call connection the status of these (e.g., 131, 132) call connection(s) and/or the status of user telephony device(s) (e.g., telephones 106, 108), and users associated with user agents 301 via inter-agent messaging, allows the system of the invention to provide some unique and intelligent calling services which will be explained shortly. While the aforementioned examples illustrate the invention in use for users on the computer network 200 to place calls between user telephony devices on the PSTN 101, other variations of the general operation and capabilities provided by the invention are possible according to the invention.

As an example of an advanced operation supported by the invention that is somewhat the reverse of the example of the telephone call setup operation explained above, suppose a user of the public telephone network user telephony device 108 (a first user) desires to call a user associated with the user agent 301-1 (a second user). The second user is the same person that interacted with the user agent interface 250 in the former example. To do so, the first user picks up the handset of user telephony device 108 and dials a phone number (i.e., enters call destination information) associated with the second user via the PSTN 101. This action establishes the call connection 232 with the phone switch 202-2 which receives the call to destination identifier (the phone number being called). In response to this, the telecommunications network server 202-1, via accessing the phone switch 202-2 in this invention, can provide the call destination identifier, along with a status of the active call connection 232, as well as the identity of the inactive call connection 231 (which is the call connection associated with the call destination identifier or phone number of the user telephony device 106 being called, as entered at the user telephone device 108), in a call signaling message 230 to the telecommunications hosting server 203. When the telecommunications hosting server 203 receives this call signaling message 230, the telecommunications hosting server 203 can pass the call signaling message 230 to the appropriate user agent 301 associated with the call destination identifier as specified in the call signaling message 230. Since the user agent 301 is aware of the status of the user associated with the user telephony device 106 (via periodic polling of the user agent's users telephone line, for example), the user agent 301 can perform "smart processing" of the call information in the call signaling message 230.

The invention can provide the "smart processing" noted above in a number of ways as advanced calling services. For example, perhaps the user associated with the user agent 301 that received the call signaling message 230 had previously provided future status information to his or her associated user agent 301. The future status information may have indicated, for example, that the user will not be nearby the user telephony device 106 for a prescribed period of time. Rather, the user associated with the user agent 301 might have specified another user telephony device (e.g., a cell phone) where the user can be reached for a specific time period. In other words, one embodiment of the system of the invention allows a user to program, instruct or otherwise "tell" his or her associated user agent 301 (via the user agent interface 250) that he or she will be near another phone (e.g., reachable at another phone number) on the PSTN 101 for a specific time period. When the user agent 301 thus receives the call signaling message 230 containing the indication that a call connection is to be established with the second user (from the user telephony device 108 in use by the first user), the user agent 301 for the destination user (the second user) can return to the telecommunications network server 202-1 an identification of a different user telephony device where the second user can be reached. The telecommunications network server 202-1 can thus instruct the public phone switch 202-2 to place a call connection to the newly specified call destination identifier indicated in the returned call signaling message 230.

To this end, the system of the invention allows "smart routing" of calls based upon programmable user agents 301 that can be programmed by an associated user to "know" the whereabouts of the user at all times. The calls can either originate from the PSTN 101 as in the former example, or may originate from a user of a user agent interface 250 on the computer network 200 as in the first example. In either case, the user agent 301 can operate as a first contact point for a user such that the telecommunications hosting server 203 and/or the telecommunications network server 202-1 can communicate with a user agent 301 to determine how to handle calling information concerning a user associated with the user agent 301. The calling information may be an incoming call connection request, or may be a query as to the current status, whereabouts, activity or other information concerning a user associated with that user agent 301.

As understood from the former example, the user agent 301 plays an important role in the system of the invention. Generally, the user agent 301 serves as the contact point for a user associated with the user agent 301 and handles the majority of the call processing logic. Users having a respective user agent 301 within the telecommunications hosting server 203 are said to be "registered" with the system of the invention. That is, the system of the invention can be implemented in one embodiment by having a user register with a telecommunications service provided by the system of the invention. When a user registers in this manner, the user is provided with a customizable user agent 301 within the telecommunications hosting server 203 that maybe programmed on behalf of that user as needed. The user agent 301 for a user handles all interaction with that user via the user agent interface 250 provided to the user on computer hosts (e.g., 245, 246 in FIG. 3) that operate on the connection-less computer network 200. Since the user agents 301 handle user interaction, they also, in conjunction with other aspects of the telecommunications hosting server 203 and the telecommunications network server 202, provide any required call signaling indirectly through the telecommunications network server 202-1 to the public phone switch 202-2.

As an example, in the former example discussed above, the user agent 301 provides current location information for that user agent's 301 associated user when an incoming call signaling message 230 (from the telecommunications network server 202-1 to the telecommunications hosting server 203) indicates a call connection that is to be established to perform telecommunications with that user. Upon receipt of this call signaling message 230, the runtime environment 300 activates the appropriate user agent 301 associated with the user as specified by the call destination identifier. The user agent 301 then provides in return the new location (e.g., the current phone number where the associated user can be reached). The runtime environment 300 in the telecommunications hosting server 203 then converts this new location information into appropriate signaling contained in a return call signaling message 230. This return call signaling message 230 containing the signaling for the new call connection is then returned to the telecommunications network server 202-1 which interprets the signaling to cause the public phone switch 202-2 to create a telephone call connection based on the new location information. In this manner, the system of the invention separates the signaling required for the advanced call routing service with the actual process of establishing the call connections which are the end result of the service. This separation allows the system of the invention to operate with a public telephone switch. In the former example, the resulting re-directed call connection from the call routing service is provided using the conventional PSTN 101.

To summarize the system thus far, at a high level, the system generally allows users on the computer network 200 to make and receive telephone calls between telephony equipment on a public telephone network. A user can generally indicate to the system of the invention one or more specific telephony devices with which that user is associated. The telephony devices with which a user is associated with may vary over time. For instance, during the work day, the user may indicate to the system of the invention (e.g., to his or her agent 301) that he or she is to be associated with an office telephony device, while in the evening, the user may indicate a home telephone with which they are associated. The user can login to the telecommunications hosting server 203 via his or her associated user agent 301 and can have the system of the invention (the telecommunications hosting server 203 working in conjunction with the telecommunications network server 202-1 and the public phone switch 202-2) place calls to other telephony devices. The telecommunications network server 202-1 can control the public phone switch 202-2 to place call connections to the telephony equipment associated with the calling user (the user placing the call),and to the destination telephony device of the user being called.

Variations on the general operation of the invention are also provided in various other embodiments. For example, if a user uses his or her associated user agent 301-1 to place a call on the PSTN 101, before the call connection is actually placed, the telecommunications hosting server 203 may determine that the phone number being called is that of another user having an associated user agent 301-2 within this or another telecommunications hosting server 203. In this case, the calling user (the user originating the call) can be made aware that the user being called is registered with the system of the invention. The user may then decide to check the status of the user being called by having the calling user's user agent 301-1 query the user agent 301-2 of the user being called. Such a status check may be done automatically as well, such that before the calling user even places the request for the call, the user agent 301 can make the calling user aware of the status of the party to be called. This is referred to in some embodiments herein as buddy information and will be explained in more detail later.

The infrastructure of the system of the invention as explained thus far is able to provide significantly advanced calling services as will be explained shortly. However, before a more detailed explanation of such services is provided, further explanation of the operation of user agents 301 and the handling of information such as call signaling messages 230 and call application messages 240 within the system of the invention will be provided.

Figure 5A:
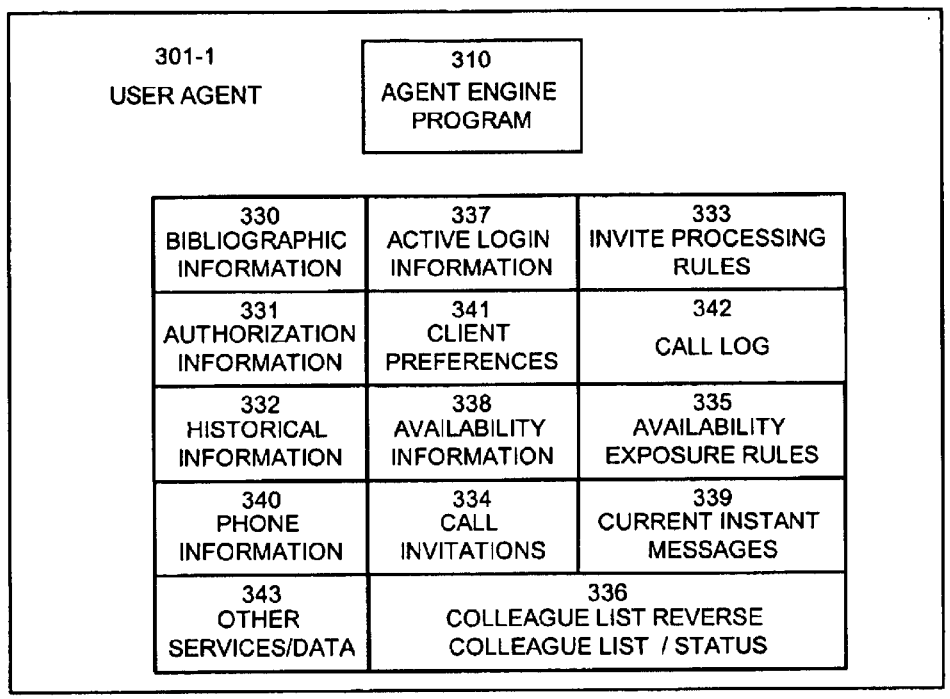
FIG. 5A illustrates a block diagram of information maintained and/or otherwise accessed by a user agent according to one example embodiment of the invention.

FIG. 5A illustrates a block diagram of a user agent 301 which includes data structures 330 through 341 provided in accordance with an example embodiment of the invention. Generally, each user communicates with the telecommunications hosting server 203 via a respective user agent 301 assigned to that user. At a high level, the telecommunications hosting server 203 is essentially a large collection of user agents 301 that operate with server support provided by the runtime environment 300 within the telecommunications hosting server 203. The user,agents 301 themselves are preferably software entities such as a program or script which contains the data, call processing and advanced service logic and code needed to process call signaling messages 230 and call application message 240 and to perform other tasks on behalf of the individual user assigned to that user agent 301. When a user becomes a registered user of the system of the invention, an administrator (not shown) of the telecommunications hosting server 203 establishes a user agent 301 and associated data structures for that user. Note that in most cases, a user is a human user or person. However, a user agent 301 can be provisioned on behalf of a non-human entity such as a remote computer host located elsewhere on the computer network 200. In this case, such a user agent 301 would be controlled, for example, by a remotely executing software application on the remote computer host to which that user agent 301 is assigned.

Within the user agent 301 in FIG. 5A, the agent engine program 310 provides the majority of the logic and processing for the user agent 301. The details of the operation of the agent engine program 310 will be discussed with respect to the flow charts of user agent processing presented later.

However, as shown in FIG. 5A, the agent engine program 310 has access to and maintains a significant amount of data in this example embodiment. Aside from the agent engine program 310 which provides the logic for user agent and advanced call service processing, the remainder of the user agent 301 is generally the set of data structures 330 through 341 which maintain the state of the user agent 301 and which govern how to process certain events such as the arrival of call application messages 240 and call signaling messages 230. Other embodiments of a user agent 301 can contain less or more data than that shown in FIG. 5A. That is, FIG. 5A attempts to illustrate much of the data that can be accessed by the user agent 301. Those skilled in the art should understand that variations of the type, content and purpose of the data and rules described more fully below are contemplated as being within the scope of this invention.

Generally, the data maintained and accessed by the agent engine program 310 within a typical user agent 301 along with the general purpose for the data is outlined in Table 1 below. Note that some of the information and data maintained by the user agent 301 is related to embodiments of the invention which have not yet been fully explained.

TABLE 1

USER AGENT DATA STRUCTURES (From FIG. 5A)

| DATA STRUCTURE (FIG. 5A) | GENERAL DESCRIPTION/PURPOSE |
|---|---|
| 330 Bibliographic Information | The Bibliographic Information data structure is used to maintain information about the user associated with the agent (e.g., name, address, corporate affiliation, occupation, security level, email address, web page (URL), and so forth). More or less may be included as needed for specific implementations. |
| 331 Authorization Information | The Authorization Information data structure specifies access control information such as encrypted username/password to allow the user to login and activate the user agent. |
| 332 Historical Information | The historical Information data structure indicates past use of the user agent by the user, missed call information, log data of all user agent transactions. |
| 333 Invite Processing Rules | The Invite Processing Rules data structure specifies user or system defined or supplied (e.g., default) rules that specify how particular calling circumstances are to be handled by the telecommunications hosting server on behalf of a user associated with this user agent. For example, an invite processing rule may specify that all calls received from a specific call source identifier be routed to voice mail, while all calls from specific named users be forwarded to the currently specified call destination location. |
| 334 Call Invitations | The Call Invitations data structure specifies past or future invitations that have or will be provided to or from the user associated with the user agent and that will involve establishing various call connections. For example, a call invitation may indicate that a user is invited to participate in a future conference call with various other named (or anonymous) users. The user associated with the user agent that is viewing the call invitation is able to determine, at the time of viewing (which may be long before the call takes place) if they want to participate in the conference call. If the user indicates a desire to do so, the user agent can automatically establish a call connection to the user at the time of the scheduled conference call (i.e., at some future time) so that that user may join in the conference. |
| 335 Availability Exposure Rules | The Availability Exposure Rules data structure can be used to define rules that the user agent uses to determine the system visibility of a user agent in response to request for status from other users of other user agents. Availability exposure rules may, for example, allow some user agents to see the identity of and place calls to a user associated with the user agent, while other users of other user agents do not know of the existence of the user agent. |
| 336 Colleague List/Reverse Colleague List/Status | The colleague list data structures are used by the system of the invention to provide an indication to the user of the current user agent of the status of various contacts of the user. For example, a user can specify a number of "buddies" in the colleague list. When the user of the current user agent logs in and activates the current user agent, the current user agent can provide the current status of each colleague in the colleague list to the user agent interface 250 for viewing by the user of the current user agent. A reverse colleague list can be maintained to allow the current user agent to proactively send status information concerning the current user to user agent(s) of associated users listed in the reverse colleague list. This allows a user agent to send status to another user agent, even though the receiving user agent may not have requested the status. Status is the current status of the user of the current user agent. |
| 337 Active Login Information | The Active Login Information data structure can be used by the system to track the current login status of the user associated with the user agent. Active login information can be used to determine if, for example, an instant message should be sent to the user agent interface 250 that is currently in use for a user of the user agent to notify that user of an incoming call request. The instant message can be viewed and responded to by the user to either accept or reject the call. |
| 338 Availability Information | The Availability Information data structure can establish a setting indicating how "visible" the user agent is to other generic user agents not specifically handled by the availability exposure rules. Availability information can be frequently or selectively updated by the agent engine program 310 to obtain and then indicate the current status of an active user using a user agent interface 250 or of user telephony equipment associated with the user on the PSTN 101. |
| 339 Current Instant Messages | The Current Instant Messages data structure can be provided by the system of the invention from other user agents to the current user agent. Such messages can be |

TABLE 1-continued

USER AGENT DATA STRUCTURES (From FIG. 5A)

| DATA STRUCTURE (FIG. 5A) | GENERAL DESCRIPTION/PURPOSE |
|---|---|
| | used to pass information to the user of the current user agent, and/or can be used to request that a call connection be established with the user. Instant messages are queued up in the current instant message data structure 339. When a user receives and reads the instant messages, they can respond or can "click-to-call" or "click-to-join" in an existing telecommunications session that may be currently underway. By clicking to call or join, the system of the invention causes the telecommunications network server 202-1 to create a call connection to the user telephony equipment associated with the current location of the user associated with the current user agent, thus allowing the user to partake in the conversation. |
| 340 Phone Information | The Phone information data structure contains information about the various phone numbers of one or more user telephony devices and equipment (e.g., home phone number, work phone number, fax phone number, future number information with times at such numbers, etc.) associated with the user who is associated with the current user agent. The phone information data structure 340 can also contain calling card information for the user associated with the user agent. This can allow, for example, the user to place calls with the user agent that will be billed to the calling card information specified in the phone information. Different calling cards may be associated with different phone numbers that correspond to different telephony devices on the PSTN 101. For example, a work assigned calling card may be associated with the user work user telephony device (his or her work phone), while a home calling card can be assigned to the user home phone. This phone information is used by the system of the invention to enable call connections to be placed to and by the user at various telephony devices reachable by the PSTN 101. Alternatively, multiple calling cards can be specified for use by a single user and the user agent can select the calling card that has the cheapest billing rate depending upon, for example, the day of the week (weekend vs. weekday) or the time of the day (day versus evening). In another alternative embodiment, if multiple calling cards are specified in the phone information data structure 340, if one calling card's time expires, the user agent can automatically begin billing another calling card to avoid the call connection from being interrupted. This also allows the user involved in the telecommunications session to not be audibly interrupted to enter new calling card information. Phone information can also specify one or more service carriers (e.g., AT&T, MCI, Bell Atlantic) which the user agent can select from based on user selection. Alternatively, the user agent may automatically select the lowest cost service providers based on time of day, day or week, etc. In this manner, the user agent can use the phone information to optimize accounting on behalf of a user. |
| 341 Client Preferences | The Client Preferences data structure contains information about the user agent interface (e.g., the client of the user agent 301). Such information can include, for example, how many instant messages are to be displayed in the instant message queue, how much history to maintain in the historical information data structure 332, and so forth. |
| 342 Call Logging | The Call Logging data structure contains information concerning calls sent and received via the user agent. Such information can include the identity of callers who have called the user of the user agent, as well as a log of all calls placed via the user agent. |
| 343 Other Services/Data | This data structure can be used to store information that may be required for various other user agent purposes. For example, if a user wants to program his or her user agent to make a specific call to a broker to initiate a trade of stock in the event of a particular stock market event, this "Other Services" data structure can be used to maintain the stock mark data that the agent must periodically monitor to determine if the call should be made to trade stock. By providing this other services data structure, future expandability is provided in the system of the invention. |

As indicated in Table 1 above, the user agents 301 can maintain in-depth information concerning advanced call service and logic processing which the user agent 301 can perform on behalf of that user. Generally, to perform such processing, one or more events activate the user agent 301 within the telecommunications hosting server 203. Events which can activate a user agent 301 are such things as user login of the user associated with a user agent 301, the arrival of a call signaling message 230 or a call application message 240 that is addressed to or otherwise associated with a user agent 301, the expiration of a timer (not shown) for such things as a scheduled conference call that is to be created, and so forth. Generally, in a preferred embodiment then, user agents 301 for each user of the system of the invention are not loaded into the memory 230 at all times. When not in the memory 230, the user agent information shown in FIG. 5A is preferably persistently maintained on disk, for example, in the user agent database 220. This conserves system resources such as memory 230 and cycles of processor 210 in the telecommunications hosting server 203. However, upon the occurrence of an event related to a user agent 301, the runtime environment 300 (FIG. 4) can load the user agent 301 into memory to process the event(s) related to that user agent 301 on behalf of its user.

A user agent 301 may be active even when the user associated with that user agent 301 is not logged in to the telecommunications hosting server 203. By way of example, a user X may "program" his or her user agent 301 to place a telephone call between user X and user Y when user Z's availability information changes to indicate that user Z is reachable at his work phone. In this instance, the user agent 301 acting on behalf of user X will establish an event (to be explained) in the telecommunications hosting server 203 to-detect the change in the availability information for user Z. After user X has programmed his or her user agent 301 in this manner, the user X may log out of the system and the user agent 301 for user X can be removed from the memory 230. However, upon the occurrence of the event, the telecommunications hosting server 203 can invoke the user agent 301 to perform the required action, which in this case is to place call connections via the telecommunications network server 202-1 and the phone switch 202-1 between a telephony device associated with user X and another telephony device associated with user Y. Note that user Z is not initially involved in the actual call placed by the invention between X and Y, but the change in user Z's availability information causes user X's user agent 301 and the system of the invention to place the call. As will be explained with respect to the actual user agent interface 250, when user X programs his or her user agent 301 in the manner explained above, the user X's user agent 301 may obtain the phone number for user Y (the call destination identifier for telephony equipment on the PSTN 101 associated with user Y) from a user agent 301 associated with user Y, or, if user Y does not have an associated user agent (e.g., user Y is not registered with the system of the invention), user X may simply specify the phone number of user Y manually via the user agent interface 250.

In a preferred embodiment of the telecommunications hosting server 230, all- messaging communications (e.g., call application messages and call signaling messages and inter-agent messages) relating to a user are processed by that user's user agent 301. This includes signaling of call requests for incoming and outgoing calls, setting of availability information to indicate the status of the user to other users (via other user agents), the retrieval of other user's availability information via queries to the other user,s user agents 301. By having the system of the invention use a user agent to handle all communications associated with a user, the system remains fully accessible by users that use dumb-terminal hosts (e.g., computer system 246) or that HTTP web-browsers that operate on computer systems (e.g., 246) that may be behind firewalls or gateways on the computer network 200. In other words, a user of a user agent 301 is able to completely control the user agent via the user agent interface 250 from anywhere that the user can access the user agent 301 on the computer network 200. There is no special computer system or host required for the user to remotely access his or her user agent and in a preferred embodiment, any computer providing a user client network interface such, for example, as a web-browser program or an email interface can be used for this purpose. Thus, a publicly available web kiosk or browser located on a computer system anywhere in the world can be used by the user to access his or her user agent within the telecommunications hosting server 203. To do so, the user can specify a Uniform Resource Locator (URL) via the user agent interface 250 that indicates a world wide web or other computer network address of the telecommunications hosting server 203 on the computer network 200. In this manner, users can access the telecommunications hosting server 203 in a universal manner and the public phone switch 202-2 is likewise insulated from attacks since direct phone switch control is instead provided by the telecommunications network server 202-1.

Figure 5B:
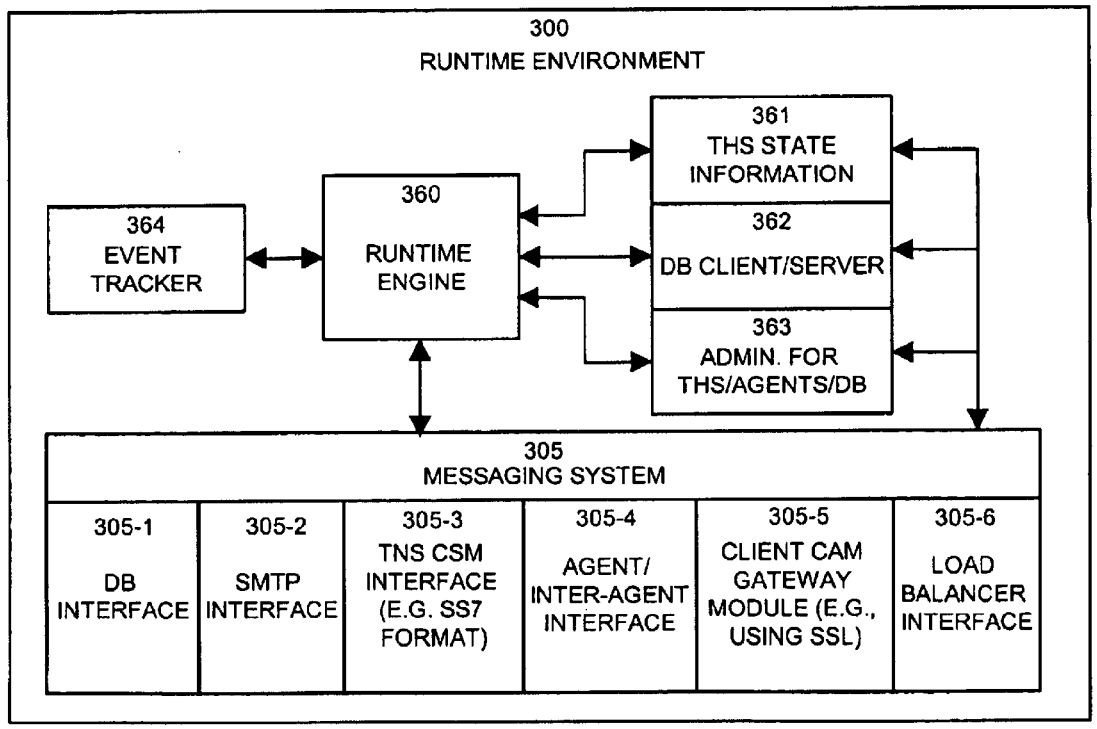
FIG. 5B illustrates a block diagram design of the runtime environment as configured in accordance with one example embodiment of the invention.

FIG. 5B illustrates an example architecture of an embodiment of the runtime environment 300 that performs on the processor 210 within the telecommunications hosting server 203 in accordance with the invention. In this example, the runtime environment 300 includes (i) a runtime engine 360, (ii) an event tracker 364, (iii) telecommunications hosting server state information 361, (iv) a database client-server access mechanism 362, (v) an administration interface for the telecommunications hosting server, user agents and the database 220, and (vi) a messaging system 305. The messaging system 305 includes a number of interfaces 305-1 through 305-6 to allow the runtime environment 300 to inter-operate with other components of the system of the invention. The runtime environment 300 is preferably implemented in software using an object-oriented programming language such as Java, C or C++ and executes, is interpreted or otherwise performs on the processor 210 in the telecommunications hosting server 203.

In operation of the runtime environment 300, the runtime engine 360 performs the various main tasks that cause the telecommunications hosting server 203 to operate as explained herein. The runtime environment 300 generally is always executing or otherwise performing within the telecommunications hosting server 203. That is, while user agents 301 may be started and stopped in various circumstances, the runtime environment 300 is always performing and maintaining the state of the telecommunications hosting server 203. From time to time, a primary task which the runtime environment 300 performs is to execute, interpret, run or otherwise perform the various user agents 301 when needed. As the runtime environment 300 operates, the messaging system 305 provides comprehensive communications capabilities to the runtime environment 300 and thus can also be used by user agents 301 that happen to be performing in the runtime environment 300 at any point in time.

For example, the database interface 305-1 allows the runtime environment 300 to use the database client/server maintainer 362 to access and maintain data in the database 220. The database interface 305-1 and the database client server module 362 may include, for example, Oracle database client code that allows the runtime environment 300 to maintain data in various Oracle databases 220. Oracle is a popular database manufactured by Oracle Corporation and is a trademark of its manufacturer. The Simple Mail Transfer Protocol (SMTP) interface 305-2 allows the user agents to send and receive email communications to and from users and other user agents 301. According to the system of the invention, certain embodiments allow email to be used, for example, to notify a user of incoming or missed telephone calls. Other communications devices, networks and access mechanisms (e.g., interfaces) are also provided in other embodiments of the invention, such as a pager interface and a portable computer interface such as that provided in a Palm-Pilot manufactured by 3Com incorporated and so forth.

The telecommunications network server (TNS) call signaling message (CSM) interface 305-3 provides the messaging interface to send and receive call signaling message 230 to and from the telecommunications network server 202-1 in order to make and receive telephone calls on a public switched telephone network as explained herein. In this example, the TNS CSM Interface 305-3 may use the standard or proprietary protocol such as an extension or variant of a protocol such as the SIP protocol documented in Request For Comment (RFC) number 2543 (RFC-2543) produced by the Internet Engineering Task Force (IETF).

Another protocol that can be used to support interface 305-3 is the SIP protocol noted above and extended by a protocol called "PINT." The PINT protocol provides a limited set of messages that can be sent from a computer on an IP network to a telephone switch device on a PSTN to provide rudimentary control of the PSTN telephone switch device. This interface can operate in a secure manner using data security techniques such as the SSL protocol or a public or private key encryption protocol to provide encryption/decryption and authentication of messages in order to avoid unauthorized control or use of the public phone switch 202-2. Security, however, for this interface is optional and is not required for the invention.

The agent/inter-agent interface 305-4 allows the runtime environment 300 to invoke a particular user agent 301, for example, and allows a user agent 301 that is actively performing within the runtime environment 300 to communicate with and/or invoke another user agent 301. User agents 301 and the runtime environment 300 use the secure client call application message CAM gateway module interface 305-5 to send and receive call application messages 240.

The client call application message (CAM) gateway module interface 305-5 provides an interface to send and receive call application messages 240 (FIG. 4) between the runtime environment 300 (e.g., between user agents 301 currently executing or invoked as needed by the runtime environment 300) and the user agent interfaces 250. The gateway module interface 305-5 essentially operates as a translator for messages sent to and from the user agents 301 and the user agent interfaces 250. This interface can operate in a secure manner using common data security techniques such as the SSL protocol or a public or private key encryption protocol to provide encryption/decryption of call application messages sent to and/or from agents. Security for this interface is optional and is not required for the invention. In one web-based embodiment, the gateway module 305-5 formats messages from the user agents 301 into proper Hyper Text Markup Language (HTML) statements and uses the Hyper Text Transfer Protocol (HTTP) to send the user agent information in a call application message 240 to the user agent interface 250. The gateway module interface 305-5 is also responsible for receiving and translating requests and commands in call application messages 240 sent from the user agent interface 250 to the telecommunications hosting server 203 and for passing these requests to the appropriate user agent 301. The gateway module interface 305-5 may operate securely on the computer network 200 using a protocol such as SSL.

The runtime environment 300 can use the load balancer interface 305-6 to operate in a web server environment that uses load balancing to operate multiple telecommunications hosting servers 203 as a single cohesive service from a web-site, for example. Embodiments of the invention can provide that more than one telecommunications hosting server 203 be active (i.e., be running or executing) in a single computer or within multiple centrally located or geographically dispersed computers throughout the computer network 200. As such, each separate instance of a telecommunications hosting server 203 may handle the performance of certain user agents 301, while other telecommunications hosting servers 203 that perform in the same or other computer systems handle the performance of other user agents 301. When a user logs in or an event occurs that otherwise requires performance of a particular user agent 301, a load balancer (not shown) that serves as a front end to a web-site offering the services of the invention can select one of the multiple telecommunications hosting servers 203 to handle performance of the specifically required user agent 301. The load balancer interface 305-6 can be used by the system of the invention to control which runtime environment 300 in which telecommunications hosting server 203 operates which user agents 301.

The event tracker 364 allows the telecommunications hosting server 203 to process user agent operations when various events occur. As briefly discussed above, a user of the system of the invention is able to program his or her user agent 301 to operate on his or her behalf upon the occurrence of certain events as defined and "programmed" into the user agent 301 by the user. When a user programs a user agent 301 to perform some action (e.g., to place a call) upon occurrence of some event, the user agent 301 queues the event in an event queue (not shown) within the event tracker 364 that operates in the runtime environment 300. The event tracker 364 also includes a timer and/or an event detector (not shown) that can determine when queued events occur. When events occur, the event tracker 364 notifies the runtime environment 300 which can then launch the appropriate user agent 301 to handle the event. As in the example provided above in which a phone call can be placed upon the occurrence of a change in availability information for a user, the event tracker 364 in the runtime environment 300 can periodically monitor the availability information of the user agent 301 of concern. When such availability information changes, the event tracker 364 can process the event and can cause the runtime engine 360 to launch the user agent 301 responsible for making the phone call upon the occurrence of the event. As also explained in another previous example, a user, for instance, can program his or her user agent 301 to detect when an external event occurs such as the change in the price of a stock in a stock market. The agent engine program 310 can set this event with the event tracker 364 and the event tracker 364 can continually monitor the other services data 343 maintained in the database 220 on behalf of the user agent 301. Upon occurrence of an event (e.g., the stock price reaching a predetermine maximum value), the event tracker 364 can trigger the performance of the appropriate user agent 301 to place a call to an automated stock trading service. The user agent 301 can be preprogrammed by the user to provide the required signaling (e.g., DTMF tones) to carry out the stock trade. Since in this embodiment user agent 301 is fully programmable (using a scripting language such as Perl or a Unix shell script, for example), the user agent can carry out buying and selling of stocks in a fully automated and unattended manner. As is now understood, the event tracker and the design of the runtime environment 300 provide can provide powerful and advanced telecommunications calling services.

It is to be understood that the examples above are not meant to be limiting and that the applicability of programming a user agent 301 to control telecommunications (i.e., to direct the telecommunications network server to make call connections) on a connection-based network on behalf of a user who may or may not be presently controlling the user agent (i.e., the user agent may be pre-programmed and left to run automatically at any time or the day or night) is a general feature of the system of the invention.

The runtime environment 300 also includes the administration module 363. The administration module 363 allows an administrator (e.g., a person or program) to administer and maintain the operation of the telecommunications hosting server 203. For example, the administration module 363 includes processing to establish a new user agent 301 on behalf of a new user of the system of the invention.

Figure 6:
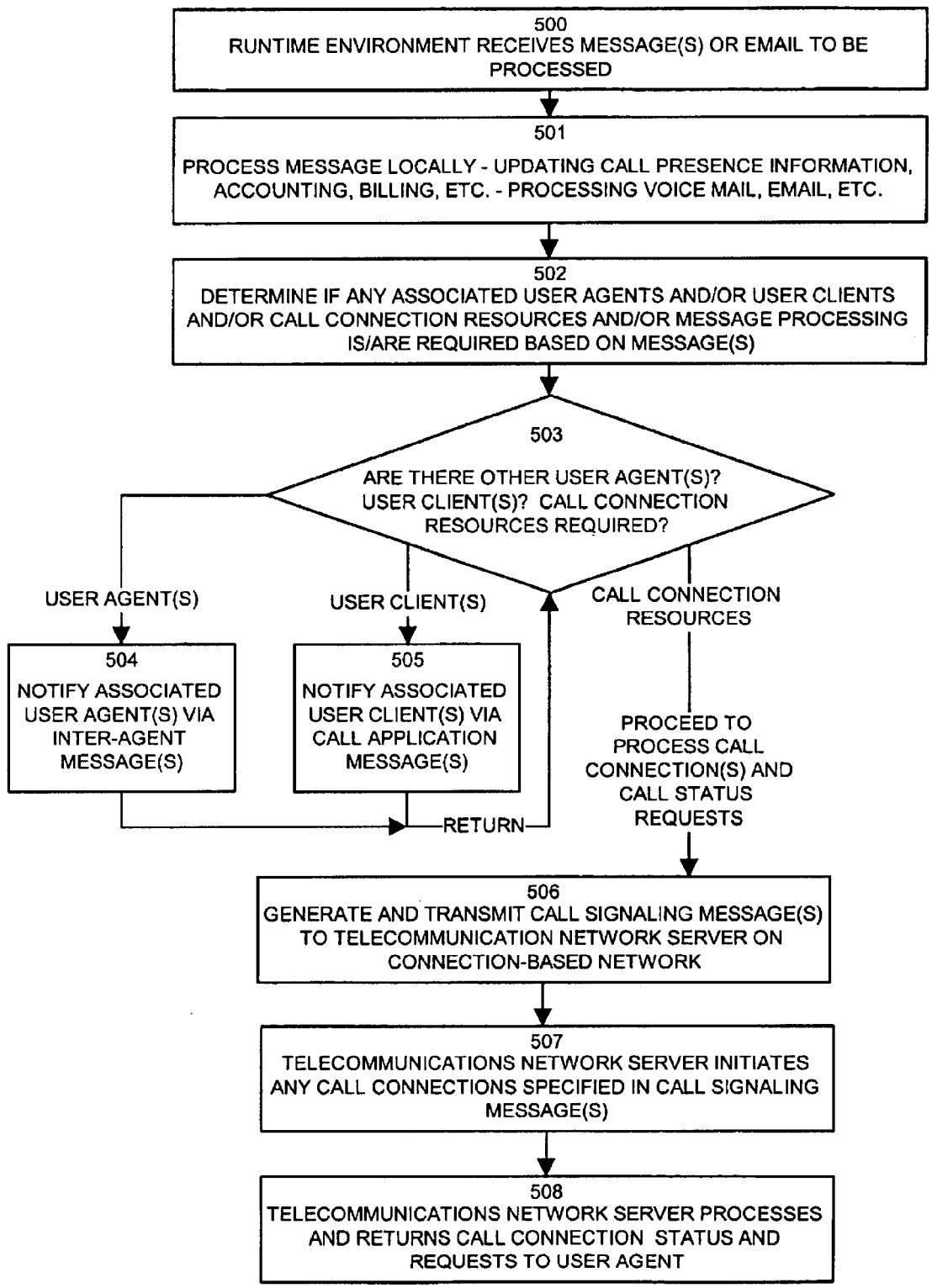
FIG. 6 is a flow chart of processing steps performed by a general configuration of one embodiment of the system of the invention.

FIG. 6 shows a flow chart of the general processing steps performed by a telecommunications hosting server 230 configured according to the invention. In certain embodiments such as those discussed above, the processing steps in FIG. 6 are performed when the processor 210 executes or performs the runtime engine 360 in the runtime environment 300. In step 500, the runtime environment 300 receives a message to be processed by the telecommunications hosting server 203. The message might be perhaps a call application 202 message 240, a call signaling message 230, an instant message from another user agent 301, or an email message destined for a user agent 301 as specified in the message. As explained with respect to FIG. 5B, the messaging system 305 allows many different types of messages to be sent and received to and from the runtime environment 300. The runtime environment 300 directs most messages to the runtime engine 360 where they are processed as explained herein.

In step 501, the runtime environment 300 processes the message locally (e.g., by the runtime engine 36.0) before passing the message to an appropriate user agent 301. Step 501 can involve the runtime environment 300 performing such processing as updating call availability information based on information in the message. For example, suppose that the runtime environment 300 receives a call signaling message 230 as the message in steps 500. The call signaling message 240 may be destined for a specific user agent 301-1 to inform that user agent 301-1 of the status of one or more call connections (e.g., that call connections 231 and 232 are engaged in a telecommunications session) on the PSTN 101. In step 501, before passing the call signaling message 230 to the specified user agent 301-1, the runtime environment 300 can update availability information for all call connections specified in the call signaling message 230 that are associated with users that have corresponding user agents 301 in the telecommunications hosting server 203. In this manner, the system of the invention can track the status or availability of various call connections on the PSTN 101 when the telecommunications network server 202-1 periodically sends call signaling messages 230 containing status information back to certain user agents 301.

In step 502, after the runtime environment 300 handles the local message processing operations (Step 501), the runtime environment 300 determines if there are any associated user agents 301 and/or user agent interfaces 250 and/or call connection resources (on the PSTN 101) and/or message processing that must be dealt with based on the message(s) received in step 500. For instance, if the runtime environment 300 receives a call signaling message 230 from the telecommunications network server 202-1 or receives an inter-agent message 235 from another active user agent 301-3 or receives a call application message 240 from the user agent interface 250 requesting access to a specific user agent 301-1, then the runtime environment 300 uses step 502 to determine that user agent 301-1 will need to be started (e.g., executed or otherwise performed) if that user agent 301-1 is not already active (i.e., is not currently loaded and running in memory 230).

Next, in step 503, the runtime environment 300 determines all system resources that must be notified of the message such as user agents 301, call connection resources (e.g., 231 and 232 in FIG. 4) under control of the telecommunications network server 202-1, and/or any user agent interfaces 250. If the message requires that one or more user agents 301 receive the message, then the runtime environment 300 processes step 504 which causes the runtime environment 300 to notify the required associated user agents 301 of the message(s) via the agent/inter-agent interface 305-4 (FIG. 5B). In step 505, if the runtime environment 300 processes a call application message 240 that a user agent 301 is sending to that user agent's interface 250, the runtime environment 300 uses the secure client call application message gateway module interface 305-5 to pass the call application message 240 to the user agent ,interface 250 for which that call application message 240 is destined.

In step 503, if the runtime environment 300 determines that the message requires call connection resources under the control of the telecommunications network server 202-1, then processing proceeds to step 506 where the runtime environment 300 generates and transmits (using the telecommunications network server call signaling message interface 305-3) one or more call signaling, messages 230 to the telecommunications network server 202-1 coupled to the public phone switch 202-2 and the PSTN 101. For example, the runtime environment 300 may receive a message (in step 500) from a user agent 301 to request that call connections 231 and 232 (FIG. 4) be established on the PSTN 101 between user telephony devices 106 and 108. The runtime engine 360 in the runtime environment 300 can accept such a message from a user agent 301 and can generate an appropriate call signaling message 230 which is then sent by the runtime environment 300 (using interface 305-5) to the telecommunications network server 202-1. In step 507, the telecommunications network server 202-1 can receive such a call signaling message 230 and can initiate any call connections specified in the call signaling message 230 on the PSTN 101 using the public phone switch 202-2. In step 508, the telecommunications network server 202-1 can detect the status of call connections within the phone switch 202-1 and can format and send an appropriate call signaling message 230 back to the runtime environment 300 (via interface 305-3) addressed to a user agent. Upon receipt of such a return call signaling message 230, the processing of the runtime environment 300 repeats again at step 500.

In this manner, the processing of FIG. 6 allows the runtime engine 360 and the runtime environment 300 to handle user agent processing and call connection establishment via messaging.

Figure 7:
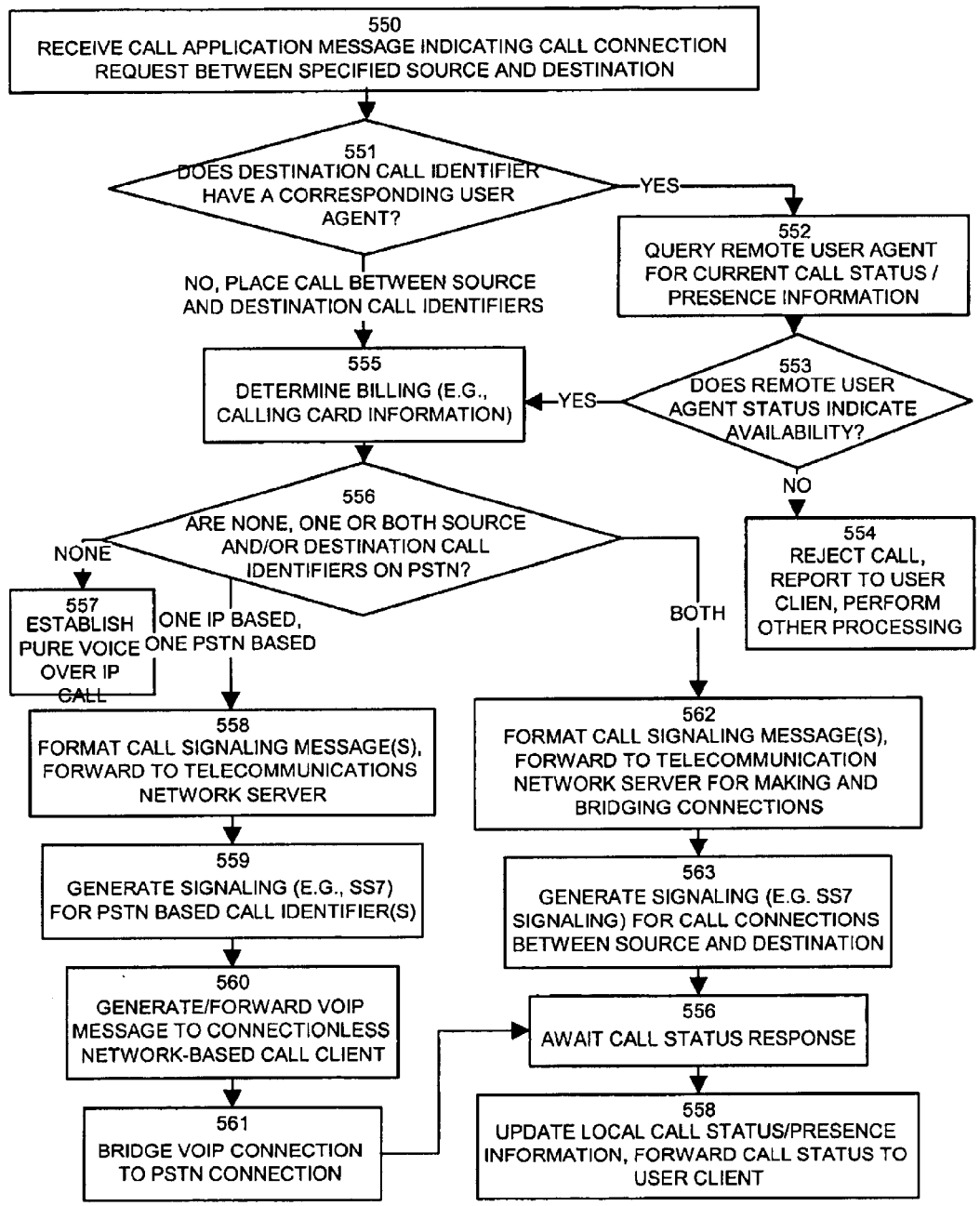
FIG. 7 is a flow chart of processing steps showing user agent call application message processing according to one embodiment of this invention.

FIG. 7 illustrates a general flow of processing steps that are performed when a user agent such as 301-1 that performs on a processor 210 in the telecommunications hosting server 203 processes a call application message 240 according to an example embodiment of the invention. FIG. 7 shows user agent call application message processing, while FIG. 8 which will be explained later shows user agent call signaling message processing.

In step 550, the user agent 301-1 receives a call application message 240 from the user of the user agent 301-1 (e.g., via user agent interface 250) that indicates, for example, a call connection request to create a telecommunications session between source and destination telephony devices specified in the call application message 240. The call application message 240 may specify the identity of the source and destination public switched telephone network telephony devices by specifying either registered user names of the system of the invention that correspond to such device, or by telephone numbers of the devices, or by another indicator that the telecommunications hosting server 203 can use to determine the identities of call connections and hence the telephony devices associated with the source and destination as specified in the call application message 240.

In step 551, the user agent 301-1 determines if the destination call identifier specified in the call application message 240 has a corresponding user agent 301 registered within the telecommunications hosting server 203. If the destination call identifier (e.g., the phone number or name of the person being called) has a corresponding user agent, such as 301-2, in the telecommunications hosting server 203, the user agent 301-1 processes step 552 to query the other user agent 301-2 (of the person being called) to determine a current call status and/or availability information from that user agent 301-2. The remote user agent 301-2 will return availability information concerning its associated user via one or more inter-agent messages 235 (FIG. 4). The availability or other state information can indicate, for example, whether or not the user associated with the remote user agent 301-2 is available to take calls, is currently on the phone, or may indicate an alternative number associated with a telephony device where the user may be reached.

In any event, in the step 553, if the user agent 301-1 determines-that the availability information returned form the remote user agent 301-2 indicates-that the user associated with that user agent 301-2 is available to take calls, processing proceeds to step 555. Alternatively, if the user agent 301-1 determines in step 553 that the user associated with the remote user agent 301-2 that corresponds to the call destination identifier is not able to take calls at the current time, the processing proceeds to step 554 where the user agent 301-1 rejects establishment of the call connections specified in the call application message 240 and prepares a call rejection call application message 240 to be returned to the user agent interface 250 that the user is using to control the user agent 301-1. In step 554, other post-call processing may be performed as well, such as updating colleague status or availability information in the user agent performing the steps in FIG. 7. Alternatively, the user agent performing these steps may be programmed to attempt to contact other user agents in the event that one user agent indicates that the user is not available (step 553). In yet another alternative processing scenario, if in step 551 the user agent 301-1 determines there is no corresponding user agent for the destination call identifier, then the user agent 301-1 bypasses steps 552 and 553 and proceeds to process step 555.

In step 555, the user agent 301-1 determines accounting information for the placement of the call connections specified in the call application message 240 that the user agent 301-1 receives in step 550. The user agent in step 555 may, for example, use the phone information data structure 340 (FIG. 5A and as explained above in Table 1) to obtain calling card information with which the user of user agent 301-1 can be billed for establishment of the call connections specified in the call application message 240. Step 555 is optional and designers can use this step in commercial implementations of the invention.

Once the user agent 301-1 has handled any accounting issues, the user agent 301-1 processes step 556 which determines if the call source and destination identifiers are PSTN-based or are computer network or IP-based. As shown in FIG. 3, certain computer systems in the computer network 200, such as computer system 245, can have attached computer telephony equipment such as handset 242. Such computer telephony equipment allows the computer system 245 to operate as a voice over computer network (e.g., VOIP) terminal. In other words, the computer system 245 has software and hardware (handset 242) to allow the computer system 245 to send and receive voice calls using the computer network 200 for transport and signaling of such call connections to and from the computer system 245. While the former examples of the system of the invention have primarily discussed situations in which both call connections legs (e.g., to PSTN telephony devices 106 and 108) are PSTN based, the system of the invention can also serve as a bridge to connect PSTN call connections such as 231 and 232 (FIG. 4) to one or more voice over computer network (e.g., VOIP) call connections. Though various voice over computer network system exist, the examples discussed herein will refer to-the commonly used Voice Over Internet Protocol (VOIP) application, though this is not meant to be limiting of the system of the invention.

As a brief example, if a user of a user agent 301 instructs the user agent 301 to have the system of the invention place a call between a PSTN based telephony device associated with the user, and another phone number of another person, it may so happen that the other phone number corresponds to a VOIP connection to handset 242 on a computer system such as 245 in FIG. 3. In this case, the system of the invention first creates a first call connection (e.g., 231 in FIG. 4) to the user telephony device such as 106, and then creates a VOIP connection to the computer system 245. When each connection is in use by a respective user, the telecommunications network server 202-1 can provide a link to the VOIP call connection and can instruct the public phone switch 202-2 to bridge the two call connections. In this case, the original calling user can perform telecommunications using a PSTN-based call connection (e.g., 231) while the called user uses a VOIP connection.

Returning now to the discussion of user agent call application message processing in FIG. 7, in step 556, the user agent 301-1 determines if none, one or both of the source and destination call identifiers are PSTN-based. If the user agent 301-1 determines that neither the source nor the destination call identifier are PSTN-based, that is, each is associated with VOIP equipment on the computer network 200, then step 557 is processed at which point the user agent 301-1 establishes a VOIP connection between the source and destination call identifiers as specified in the call application message 240.

In step 556, if one, call identifier is associated with telephony equipment on the PSTN 101 and one call identifier is associated with VOIP equipment on the computer network 200, then the user agent processes step 558 which causes the user agent 301-1 to format a call signaling message 230 for the PSTN-based call identifier specified in the call application message 240 which the user agent 301-1 received in step 550. The user agent 301-1 then forwards the call signaling message 230 to the telecommunications network server 202-1, which in step 559 generates signaling for a call connection based on the PSTN call identifier(s) specified in the call signaling message 230. When processing steps 558 and 559, the user agent 301-1 and the telecommunications network server 202-1 in conjunction with the public phone switch 202-2 generally form the required call connection(s) for the portions or "legs" of the call specified in the call application message 230 (receives in step 550) that are to take place on the PSTN 101. In the case of a conference call, for example, there may be more than one call connection that needs to be established on the PSTN 101 using steps 558 and 559.

Once the PSTN call connection(s) (e.g., one or both of 231 and 232 in FIG. 4) are established via steps 558 and 559 as discussed above, step 560 causes the user agent 301-1 to generate and forward a VOIP call application message 240 from the user agent 301-1 to the connectionless computer network 200 based computer system (e.g., 245 in FIG. 3) that is to handle the VOIP call connection. Once the computer system 245 has established a VOIP connection to the user agent 301-1 in the telecommunications hosting server 203, the user agent can provide an identifier for the VOIP call connection(s) to the telecommunications network server 202-1, which in step 561, can bridge the VOIP call connection(s) to the PSTN call connection(s) formed via steps 558 and 559. In this manner, the system of the invention can be used to establish telephone calls between users on both the PSTN 101 and VOIP users on the computer network 200.

After the system of the invention bridges the call connections together in step 561, the user agent 301-1 processes step 556 at which point the user agent 301-1 awaits and receives a call signaling message 230 from the telecommunications network server 202-1 indicating a call status for the success or failure of the call connections requested via the call application message 240 received in step 550. When the user agent 301-1 receives the call status via a return call signaling message 230 sent from the telecommunications network server 202-1, the user agent 301-1 processes step 558 to update call status and availability information for each call connection for which status was received in step 556. In step 558, the user agent 301-1 also forwards a call application message 240 back to the user agent interface 250 of the user who requested that the call connection be placed by the system of the invention. This allows the system of the invention to indicate success of failure of the call processing in FIG. 7 to the user via the user agent interface 250.

In an alternative processing scenario, if the user agent 301-1 in step 556 determines that the source and destination call identifiers are associated with telephony devices that are all located on the PSTN 101, the step 562 is processed by the user agent which causes the user agent 301 to format a call signaling message 230 containing the call identifier information required for each call connection. The user agent then forwards the call signaling message 230 to the telecommunications network server 202-1 which performs step 562 to generate the required signaling for the public phone switch 202-2 so that the public phone switch 202-2 can place the call connections on the PSTN 101. Thereafter, the user agent 303-1 processes steps 556 and 558 as explained above.

According to the processing in FIG. 7 discussed above, a user agent 301 allows users to establish telecommunications sessions between telephony devices on either the PSTN 101, the computer network 200 or between telephony device on both the PSTN 101 and the computer network 200.

Figure 8:
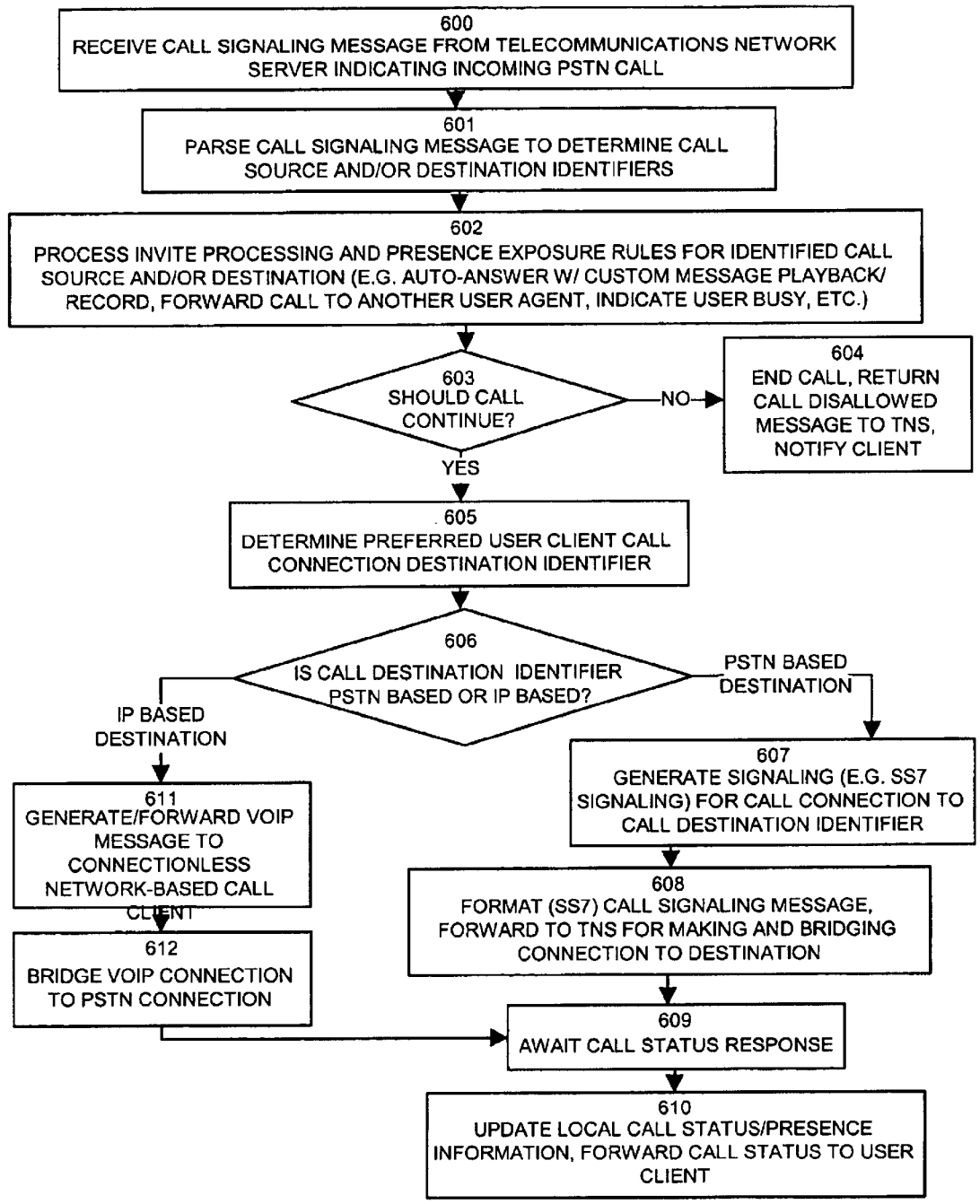
FIG. 8 is a flow chart of processing steps showing user agent call signaling message processing according to one embodiment of this invention.

As discussed in relation to various example embodiments above, user agents 301 are also able to process call signaling messages 230. FIG. 8 illustrates a general flow of processing steps that are performed when a user agent such as 301-1 that performs on a processor 210 in the telecommunications hosting server 203 processes a call signaling message 230 according to an example embodiment of the invention.

In step 600 the user agent 301-1 receives a call signaling message 230 from the telecommunications network server 202-1. The call signaling message 230 may, for instance, indicate an incoming PSTN phone call connection to a user telephony device that is associated with the user of user agent 301-1. In step 601, the user agent parses the call signaling message to determine the call source and/or destination identifiers. The call source identifier indicates which user telephony device on either the PSTN 101 or on the computer network 200 (if the call originator is a VOIP session) is making the call to the user and the call destination identifier corresponds to the user agent processing the message, but since there may be more than one phone number, for example, associated with a single user agent, the user agent 301-1 parses the incoming call signaling message to determine which phone number is identified by the call destination identifier. This call source identifier information can be used to identify the caller. Alternatively, the connection-based telephone network 110-1 may provide a basic prior art caller-id service that can be used the public phone switch 202-2 of the invention to indicate to the telecommunications network server 202-1 the call source identity of the incoming call. The telecommunications network server 202-1 can then forward this caller-id information via interface 205-1 (FIG. 3) to the telecommunications hosting server 203 to be received by the user agent 301-1. Once the user agent 301-1 has determined the call source and destination identifiers, the user agent 301-1, in step 602, processes any invite processing rules maintained in the invite processing rule data structure 333 (FIG. 5A).

Assuming the call source identifier identifies, for example, another user of the system of the invention, a user agent 301-1 can user invite processing rules 333 in step 602 to predetermined or programmed actions on behalf of the user associated with the user agent 301-1. The user of user agent 301-1 may or may not be logged in to the telecommunications hosting server 203 (and therefore may or may not be interfaced to the user agent 301-1 via the user agent interface 250). In either case, the invite processing rules 333 can perform such actions as causing the user agent 301-1 to invoke an auto-answer feature with custom message playback or to invoke an auto-route or call forward feature based on the identity of the calling user.

In one embodiment of the invention, the user agent 301-1 can provide an auto-answer or auto response to the incoming call connection by selecting an encoded audio file maintained in the database 220 based on the identity of the calling user (as specified by the call source identifier). For example, if the user agent 301-1 determines in step 600 that the caller providing the call signaling message 230 (received in step 600) is a co-worker of the user associated with the user agent 301-1, then an invite processing rule that has been established for incoming calls for that co-worker might be automatically directed to a voice mail box which the user agent 301-1 maintains for co-workers. The user agent 301-1 can perform re-direction of the incoming call connection by providing a return call signaling message 230 that contains a call destination identifier of an answering machine telephony device for the user of the user agent 301-1 on the PSTN 101. Alternatively, if the user agent in step 601 determines that the call source identifier is an incoming call from the user's wife (the wife of the user of the user agent 301-1), then the user agent might perhaps process another invite processing rule for this call source identifier that directs the incoming call to the user's secretary or perhaps to another user agent 301-2.

Also in step 602, the user agent 301 can perform certain call pre-processing based on the call destination identifier. One example of such a feature of the invention is call re-direct. Perhaps the user agent 301-1 has three phone numbers associated to the particular user associated with the user agent 301-1, a mobile phone number (e.g., cellular), a stationary desk phone at the user's office, and the users home phone. If the call destination identifier specified that an incoming call is being attempted to the user's (the user associated with the user agent 301-1 processing the steps in FIG. 8) office phone, but the time of the day is 5:10 P.M., the user agent may have been pre-programmed to direct any such calls to the user's mobile phone between 5 and 6 P.M. while the user is commuting form his or her office to his or her home. In other words, when the user agent 301-1 determines the actual call destination identifier indicating the phone number that is being called, the user agent can be configured to automatically re-direct the call to another number, for instance, based on such factors as the current time, availability information for that particular number, and so forth. Though certain conventional telephone networks have the ability to "hunt" from one busy destination telephone number to another, the user-programmable aspects of this invention go far beyond such basic call redirection by providing a fully flexible user programmable agent that can handle call processing in countless ways.

In any event, it is to be understood that invite processing rules provided by the invention allow a user to pre-program his or her user agent to perform certain call processing before any other call connection is established. After the user agent 301-1 processes any invite processing rules 333 in step 602 (it may be the case that no invite processing rules apply to the call source identifier), in step 603, the user agent determines if the call should continue. That is, the user agent in step 603 determines if an actual telephone call will be placed to the appropriate call destination identifier. If not, the user agent processes step 604. Steps 604 can perform a number of actions. In a simple embodiment, step 604 can terminate the call by returning a call signaling message 230 to the telecommunications network server 202-1 that indicates that the user is unavailable. Alternatively, step 604 can direct the incoming call specified by the call signaling message to a voice mail box or can cause other actions to occur. Such other actions can include, for example, sending an email or instant message to the user of the user agent 301-1 informing the user that a call connection was received by the user agent 301-1 but that the actual call was not forwarded to the call destination identifier (e.g., that the actual call was not put through to the user in step 605). The invite processing rules in step 602, for example, may have determined that the incoming call should not go through to the user since the user indicated by programming the user agent 301-1 that he or she did not what to be disturbed at a certain time. However, if the user agent 301-1 determines in step 603 that a call connection should be established to the user of user agent 301-1, then the user agent 301-1 proceeds to process step 605.

In step 605, the user agent 301-1 determines what the preferred call connection destination identifier is for the user of user agent 301-1. As indicated in the example embodiments discussed above, user are able to program their user agents 301 to be aware of certain telephony devices (one or more) having call destination identifiers on either the PSTN 101 or the computer network 200 to which a user is associated. The association may be programmed to change at different times of the day or night on in response to certain events that occur or that are programmed into the user agent (as can be tracked and detected by the event tracker 364 FIG. 5B), or the association(s) may remain static. It is generally up to the user to establish with his or her user agent 301 what telephone numbers and/or telephony devices can be used to reach the user at what time(s) and in response to what events. Once the user agent 301-1 has determined in step 605 the appropriate call destination identifier of a user telephony device that is associated with the user of the user agent 301-1 at the current time, the user agent processes step 606.

In step 606, the user agent determines if the call destination identifier is associated with a telephony device based on the PSTN 101 or the computer network 200. If the user telephony device currently associated with the user being called (as specified in the call signaling message 230 received in step 600) is based on the computer network 200 (the IP network), then the user agent processes step 611 which causes the user agent 301-1 to generate and forward an appropriate VOIP message in the form of a call application message 240 to the connectionless based VOIP client (e.g., handset 242 on computer system 245 in FIG. 3) on the computer network 200. Once the user agent 301-1 thereafter establishes a VOIP call connection to the VOIP client computer system 245 (FIG. 3), the user agent can pass this call connection identifier (the VOIP call identifier) to the telecommunications network server 202-1. Then, in step 612, the telecommunications network server 202-1 can cause the public phone switch 202-2 to bridge the VOIP call connection with the PSTN call connection that caused the telecommunications network server 202-1 to originally generate the call signaling message 230 for the user agent 301-1.

If however the user agent in step 606 determines that the call destination identifier is a PSTN based user telephony device such as telephone 106 in FIG. 4, then the user agent 301-1 processes step 607 after step 606 in which case the user agent 301-1 generates signaling for a call connection corresponding to the call connection identifier that the user agent 301-1 determined in step 605. Thereafter, the user agent in step 608 formats a call signaling message 230 which includes the signaling to have the telecommunications network server 202-1 and the public phone switch 202-2 establish a call connection to the call destination identifier in the call signaling message 230. The user agent 301-1 in step 608 also forwards this call signaling message to the telecommunications network server 202-1 which causes the public phone switch 202-2 to establish the call connection to the user's specified user telephony device matching the call destination identifier.

After the user agent 301-1 has processed either steps 611 and 612 or 607 and 608, the user agent 301-1 proceeds to process steps 609 and 610 to complete the processing of the call signaling message 230. In step 609, the user agent 301-1 awaits and receives a call signaling message 230 from the telecommunications network server 202-1 indicating the status of any completed call connections. Next, in step 610, the user agent 301-1 can update local call status information to indicate that the user of the user agent 301-1 is presently involved in a telecommunications session. The user agent 301-1 can also forward the current status of state of the user agent 301-1 to the user agent interface 250 for display to the user.

Figure 9:
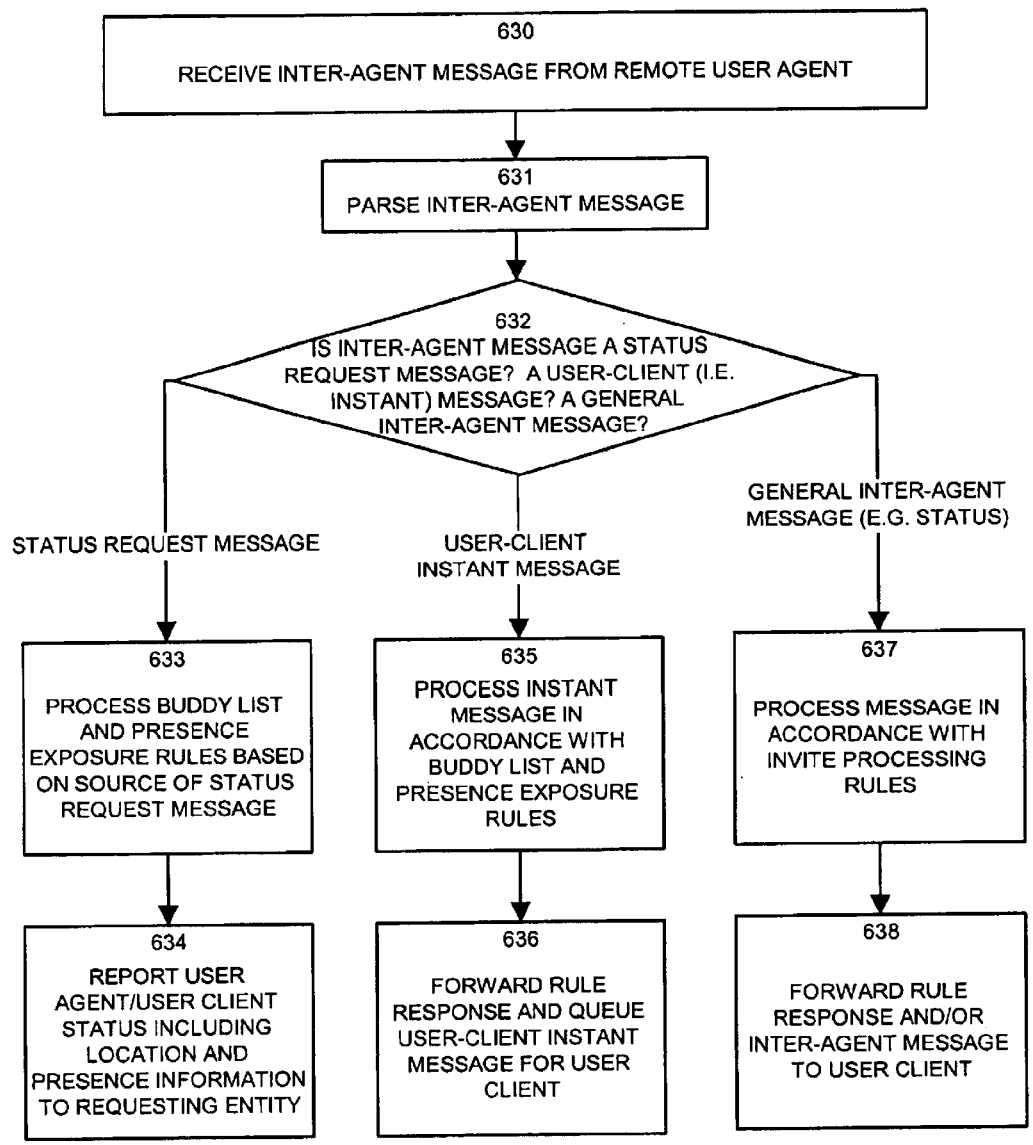
FIG. 9 is a flow chart of processing steps showing how a user agent can process inter-agent messages according to one embodiment of the invention.

In this manner, the processing of FIG. 8 allows the system of the invention to use user agents 301-1 to handle call processing on behalf of user FIG. 9 illustrates a general flow of processing steps that are performed when a user agent such as 301-1 that performs on a processor 210 in the telecommunications hosting server 203 processes an inter-agent message 235 (FIG. 4) according to an example embodiment of the invention. In step 630, the user agent 301-1 receives an inter-agent message from a remote user agent such as 301-2. In step 631, the user agent 301-1 parses the inter-agent message 235 and in step 632, the user agent 301-1 determines the purpose of the inter-agent message. The inter-agent may be, for example, a status request message, an instant message, or a general inter-agent message.

If the inter-agent message is a status request message, the user agent 301-1 processes step 633 and 634. In step 633, the user agent 301-1 processes colleague list (336 in FIG. 5A) and availability exposure rules (335 in FIG. 5A) based-on the source of the inter-agent status request message. Step 364 then causes the user agent 301-1 to report its user agent and/or user agent interface 205 status including optional location and/or availability information to the requesting entity, which is another user agent 301 in this example.

Step allows 633 the user agent 301-1 to create a custom status response message to send back to the requesting entity depending, for example, upon which user agent 301 is requesting the status of user agent 301-1. For instance, suppose the user of user agent 301-1 adds a trusted friend to his of her colleague list data 336. In response to receiving an inter-agent status request message 235 from the trusted friend's user agent (e.g., user agent 301-3), the user agent 301-1 can be configured to report back the identity of who the user of user agent 301-1 is currently in a telecommunications session to the user agent 301-3, since the user associated with the user agent 301-3 is in the colleague list data 336 for the user agent 301-1. Alternatively, the user of user agent 301-1 can program availability exposure rules into the agent 301-1 to provide limited availability information to some user agents 301, while providing more detailed information to other user agents 301. Alternatively still, the user agent 301-1 can return location information indicating where the user associated with the user agent 301-1 is currently located, based upon the location of telephony equipment currently in use by that user. For instance, location information may indicate that a user is currently at home or at work, based upon which user telephony device associated with that user is actively involved in a telecommunications session. Such detailed information may also include, for instance, who the user of a queried user agent is currently speaking with, or simply if the user is online or not (e.g., logged into the telecommunications hosting server 203), or if the user is currently in a telecommunications session or not, or when the user last was in a telecommunications session. The user of a user agent is able to configure his or her assigned user agent 301 with whatever availability exposure and location information and invite processing rules he or she sees fit.

In step 632, if the user agent determines that the inter-agent message contains an instant message, the user agent 301-1 processes steps 635 and 636. In step 635, the user agent 301-1 processes the inter-agent instant message 235 in accordance with colleague list and availability exposure rules, much the same as explained above with respect to steps 633 and 634. However, and inter-agent instant message allows a user of a user agent to send a message containing either voice, video or textual or other data that can be displayed or otherwise presented to the user of the user agent. For instance, a user can use his or her associated user agent 301-2 to send a message to the user agent 301-1 to be presented to the user that asks the user of user agent 301-1 if they are available for a conference call at a specific time. The instant message can, for example, contain the identity of the parties to take part in the conference call, and can provide a mechanism for the user that obtains and reads the instant message via his or her user agent 301-1 to reply "yes" or "no" to the instant message.

The user agent 301-1 that receives an instant message can queue the message for presentation to the user when the user logs in to the telecommunications hosting server 203. If the user is currently logged in, then the user agent 301-1 displays the instant message to the user via a call application message 240 that contains the instant message that is sent to the user's current active user agent interface 250. Depending upon how the user has configured his or her colleague list and availability exposure rules, the instant message may appear immediately with the message content on the user agent interface 250, or the user agent 301-1 may provide only an indication of the fact that an instant message has arrived for the user. In any event, the instant message data structure 339 in FIG. 5A can be used by the user agent 301-1 to maintain the instant messages until they are read and disposed of. If the instant message contains built-in logic other than simple-text, as in the example provided above, the user is able to reply to the instant message which can cause the user agent 301-1 to process the reply which might result in further user agent processing. As in the former example, if the user replies that he or she is to be involved in the conference call, then the user agent 301-1 that receives such a reply in a call application message 240 can schedule an event via the event tracker 364 that causes a call connection to be made to user telephony equipment associated with the user of the user agent 301-1 at the time of the conference call. This is but another example of a calling service provided by the system of the invention.

If the user agent 301-1 determines in step 632 that,the inter-agent message 235 (received in step 630) is a general inter-agent message, then the user agent 301-1 processes steps. 637 and 638. A general inter-agent message bay be, for example, a call setup message sent from another user agent 301-3 that requests a telecommunications session be established between the user of the user agent 301-3 who originated the inter-agent call setup message and the user of the user agent 301-1 who receives the call setup message. Like an instant message, the general inter-agent message can include a reply feature that is presented to the user via the user agent interface 250. The user is then able to select, for example, "accept" or "reject" which will cause the user agent 301-1, via a reply call application message 240, to either make the call or not between the user telephony devices associated with the users. In step 637, the general inter-agent message can be processed according to invite processing rules much as discussed above. However, in the case of general inter-agent call setup messages, the user agent can be pre-programmed via invite processing rules 333 (FIG. 5A) to automatically establish a call connection, or to prompt the user first for an accept or denial of the call connection. Step 638 causes the user agent 301-1 to forward a call application message 240 to the user agent interface 250 containing the inter-agent call setup message indication.

General inter-agent messages also allow for such features as automatic scheduling of a call back. In this case, the general inter-agent message can specify an identity of a set of call connections that should be placed, but a time later than the current time. The user agent 309 receiving such a message can, in step 637, cause the event tracker 364 to schedule an event to have the specified call connection created and bridged at the appropriate time. Using this capability, one user agent can instruct one or more other user agents to have their associated users participate in a telephone call at some future point in time.

As a specific example that demonstrates the powerful capability of this invention, this feature of the invention allows for instance, a manager of a number of employees to schedule a conference call with all or some of his or her employees at a specified time. The manager can instruct his or her user agent 301-1 to send general inter-agent messages to each employee user agent 301-2 through 301-N to schedule each employee for the call as a certain time. The manager simply needs to select the employee names from that manager's user client interface 250 and then select the conference call feature (as explained with respect to FIG. 12).

The conference call can be specified to take place at a future time and the system of the invention can be even more specific by allowing the manager to specify some employees that will take part in the call at certain times, while other employees can be added into or removed from the conference call at other times. The manager can specify this customized conference call in advance. Once this is done, the managers user agent 301-1 performs the inter-agent messaging communication explained above to schedule each employee user agent 301-2 through 301-N for the conference. Each employee user agent 301-2 through 301-N thus enters an event for the event tracker 364 to track and perform at the specified time. The event for each user agent will cause that user agent to join in the conference call with the managers telephone. Upon occurrence of the time for the conference call, the event tracker 364 can invoke performance of each user agent 301 that is to be involved in the conference call, and each user agent 301 can then cause the appropriate call destination identifier to ring to contact each user and join that user to the conference. The managers user agent 301-1 can automatically call the manager as well.

This may be done first, before any employee user agent is activated. Once the manger is "online" in the conference call (i.e., the manager has picked up his or her ringing telephone handset), the managers user client interface 250 can indicate the current real-time status of each employee via periodic status querying of the employees user agents by the managers user agents.

Thus, the manager can be presented with a graphical display on his or her computer (e.g., 246 in FIG. 3) that is continually updated via his or her user agent 301-1 that indicates when each employee joins in the conference call. This avoids the manager having to interrupt the conference call conversation that might be already in progress with his or her employees to ask if a certain employee has joined in the conference yet. By simply viewing the availability status screen of the managers user client interface, the manager can be made aware or who is and is not involved in the call. Using this same interface,-the manager can add and remove employees from the call at any time during the call without interrupting the call (i.e., without having to tell the employee to hang up). In this manner, the manager via his or her user client interface 250 can simply and elegantly schedule conference calls with employees, and no person needs to pickup a telephone handset and enter complex conference calling codes or involve a telephone operator to make such calls as is done in prior art systems.

In a related embodiment, the flexibility of the invention as explained herein can allow the manager via their user client browser interface 250 to further select, for example, a subset of participants that are taking part in a multi-party conference call via a simple click of the mouse on each participant/employee name that appears to the user on the users' client browser display. Then, the manager can select a "whisper room" feature which sends a call application message to the telecommunications hosting server (to the managers user agent 301-1) that instructs the user agent 301-1 in the telecommunications hosting server to direct the telecommunications network server to place the call connection associated with each selected participant into a sub-conference call. The telephone switch or PBX 202-2 under control of the telecommunications network server 202-1 is able to independently and individually control the state of each call connection, and can bridge and de-bridge (i.e., disconnect) call connections from the conference call under direction from the telecommunications network server which is controlled in turn by the user agent 301-1 in the telecommunications hosting server. Essentially, using the "whisper room" feature of the invention, the participant employee call connections selected for the sub-conference are either permanently or temporarily removed from the main employee conference call (i.e., the original main group of bridged call connections in which each call connection is associated with a particular conference participant) and are placed in a separate mini-conference call or "whisper room" just among themselves. The system of the invention thus allows virtually unlimited control of advanced conference calling features.

In another embodiment, the period of time during which conference callers are selected to be engaged or placed into a "whisper room" conference can be timed via a user selectable timer. In other words, the manager can instruct the user agent 301-1 to inform each employee user agent 301-2 through 301-N that is to be involved in the whisper room sub-conference call that the whisper room conference call is only to last, for example, for ten minutes. The telecommunications hosting server can automatically track the required timers via the event tracker 364 and upon expiration of the timers, the employee user agents 301-2 in the telecommunications hosting server 203 that were joined in the sub-conference whisper room call (i.e., that were temporarily removed form the main call and placed in a private conference just between themselves) can automatically be reinstated back into the main conference call. Since such advanced telecommunications service logic is implemented in software within the programmable user agents 301 in the telecommunications hosting server and is controlled via the user client interface 250, the user (e.g., the manager in this example) is able to provide and tightly control calling features provided by the system of the invention. The software implementation of these services is easily modifiable, as will be explained with reference to specific implementations, such as the Microsoft Outlook plug-in embodiment explained later—in many cases by the user himself, which is in large contrast to service logic that runs within either public switching systems or the ACD/PBX systems as described in Dezonno.

Using this tight control, for example, the telecommunications network server 202-1 can treat each call connection as a separate leg of a telecommunications session. For example, in a conference call scenario, the telecommunications hosting server 203 can direct the telecommunications network server 202-1 to drop a single caller's call connection or "leg" within the main telecommunication session conference call. This may done under direction from the user/manager who initially established the conference call, for example. This "privacy" feature in the conference calling embodiments allows the telecommunications network server to direct the telephone switch to "drop" or disconnect a single "leg" or call connection of the telecommunications session. Since the user/manager via viewing the user client interface 250 is able to see exactly which users are participating in the call, the user can add and drop users via selecting their names from a name list, for example, at any time during a conference call. In another embodiment, the user/manager is able to mute specific individual callers from participating (i.e. speaking) in the call, but allows the call connection to that user to listen only. In another embodiment, the system allows a user to remain connected to the telecommunications session, but can mute all audio to and from the call connection associated with one or more users. This allows, for example, the manager in the above scenario to mute out certain people at certain times from the discussion, perhaps due to sensitive material that is being discussed between upper level managers that should not be heard by lower level employees.

Moreover, in another embodiment related to the conference calling embodiments briefly discussed above, the user of the user interface who is controlling or otherwise monitoring the conference call (e.g., the manager) can determine the availability of people that are to be joined in the conference call (via their public switched telephony devices) before they are actually joined in the call. Using the availability information maintained by each user agent 301, the user agent 301-1 of the conference call controller can query other user agents 301-2 through 301-N of various people that might be joined in the call (callees). The callee user agent(s) can report availability information to the requesting user agent and this can be directed to the requesting user client interface. Thus, a user who is about to initiate a conference call, for example, can determine who might be available to take the call before the call is even made. While availability indications in a PBX network system such as those of the prior art may be present, for example, from lights on telephone handsets that indicate who is and who is not on the telephone, due to their proprietary nature and complex integration with the specific PBX in use for such prior art systems, these systems lack the ability to interface to a public telephone switch and provide the functionality explained herein under control of user agents. In addition, such indicators only tell if a phone is busy or not, they cannot convey the rich information that can be passed over a connectionless network, such as "be back shortly" or "in a meeting until 1:00." Thus, the present invention increases functionality of a regular public switched telephone network without requiring a PBX or ACD system, and increases security due to the isolation of the public switch manipulation from the user agent advanced calling service logic processing.

This feature is made possible using a public telephone system by using the system of the invention, for example, by having the telecommunications network server 201-1 periodically determine and monitor the status of the connection state of the connection-based network circuit (e.g., the public telephone call connection circuit) associated with selected potential callees. In other words, if a potential callee is currently on the phone on the PSTN 101, a user who desires to have this person joined in a call (conference or a simple user to user call) can be made aware of this situation via instructing their user agent to obtain the status or availability information of this person. The user agent 301-1 for the requesting person can either query the user agent (e.g. 301-2) for the potential callee, or if that potential callee does not have a user agent (i.e., is not registered with the system of the invention), the user agent 301-1 of the requesting person in the telecommunications hosting server 203 can instruct the telecommunications network server 201-1 to determine the status of the telephone circuit (e.g., circuit 232 in FIG. 4, or the phone number) associated with the telephone of that callee (i.e., busy or not busy). If the requesting user agent 301-1 is informed that a potential callee is not available (e.g., his or her line is busy), the system of the invention can go even further by informing the requesting user (the user of user agent 301-1) of the identity of the person with whom the potential callee is engaged in a call with. In other words, availability information can inform a user of the invention (via his or her user agent and user client interface) who is and is not available, and for those not available, can indicate who they are speaking with at that moment. In a public telecommunications system such as used within a corporation or other such organization that otherwise does not have a PBX system, such tight control over the status of the telecommunication state of employees, for example, can be quite useful. Note that when a user replies, for instance, to either an instant message or a general inter-agent message, the reply can cause a call application message 240 to be sent from the user agent interface 250 back to the user agent 301-1. At that point, the call application message is processed much the same way as indicated in FIG. 7. In this manner, the system of the invention can provide the user agents 301 to service all call processing logic on behalf of users.

Figure 10:
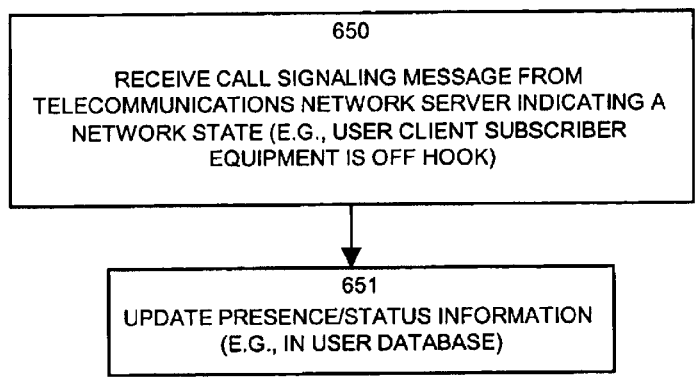
FIG. 10 is a flow chart of processing steps showing how a telecommunications hosting server of the invention can provide availability information concerning the status of telephone equipment associated with users of the system of the invention.

FIG. 10 shows the processing steps performed by a user agent to process a call signaling message 230 that contains a specific status. In step 650, the user agent 301 receives the call signaling message indicating a network state of the call leg to telephony equipment within the PSTN. The network state may indicate, for example, that a telephone is off the hook, is busy, is in the process of placing a call, or is un-functional, or is engaged in a call with a particular other telephony device. In this particular example, which is not meant to be limiting but rather demonstrates certain capabilities of the system of the invention, the call signaling message 230 indicates that user telephony equipment (e.g., telephone 106 on PSTN 101) associated with the user of the user agent 301 to which the call signaling message 230 is sent is "off hook." In other words, the call signaling message 230 received in step 650 in this example indicates that someone, and most probably the user him- or herself is using the user telephony device. With this knowledge, the user agent 301 configured according to the invention can process this call signaling message 230 in step 651 to update availability and status information concerning the user associated with the user agent 301. Since the user agent 301 now "knows" that the user is involved in a telecommunications session, the user agent 301 can perform such tasks as tracking the length of the telecommunications session for accounting purposes, for example. The user agent 301 can also determine, based on which user telephony device is in use, the location of the user (e.g., via PSTN 101 area codes and telephone number prefixes). Also, the call signaling message 230 can indicate which other parties are involved in the telecommunications session. As such, the user agent 301 can log this information into the historical information data structure 332 so that a user can have a history log of who that user has spoken with.

As should now be apparent to those skilled in the art, the system of the invention can support a variety of robust and advanced calling services with support for the voice communications taking place on a PSTN. To support the aforementioned and other services provided by the system of the invention, the telecommunications hosting server 203 can maintain vast amounts of information and data in the database 220.

Figure 11:
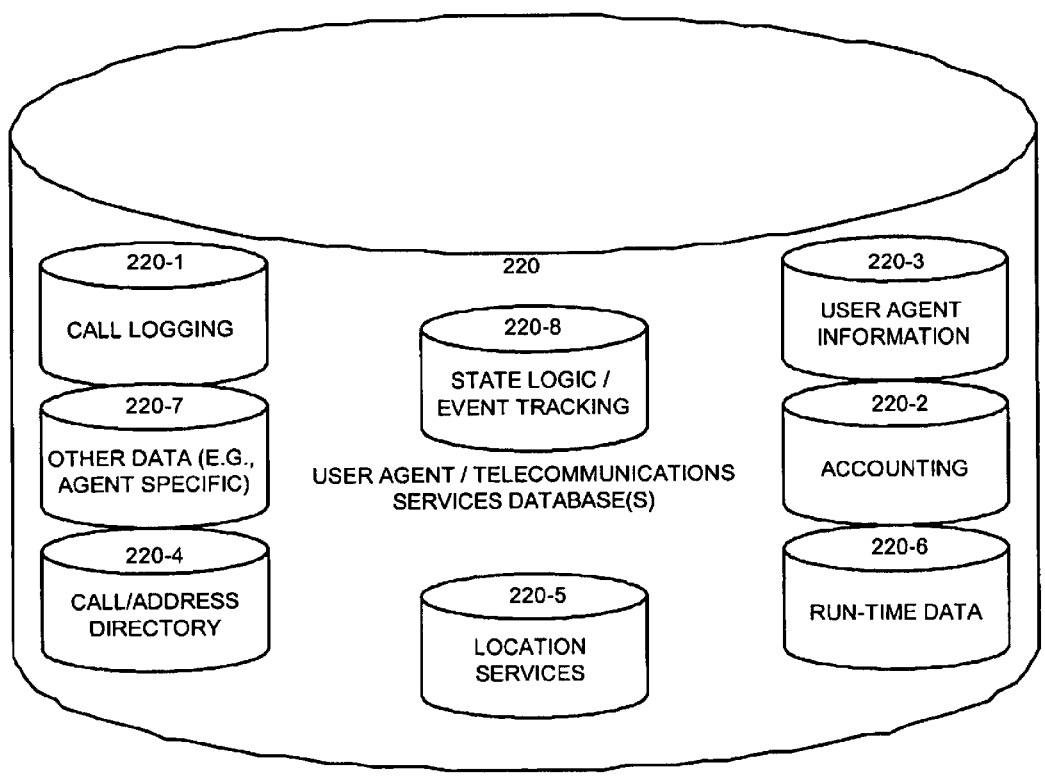
FIG. 11 illustrates an example of the contents of the user agent and telecommunications services database according to one embodiment of the invention.
Figure 11:
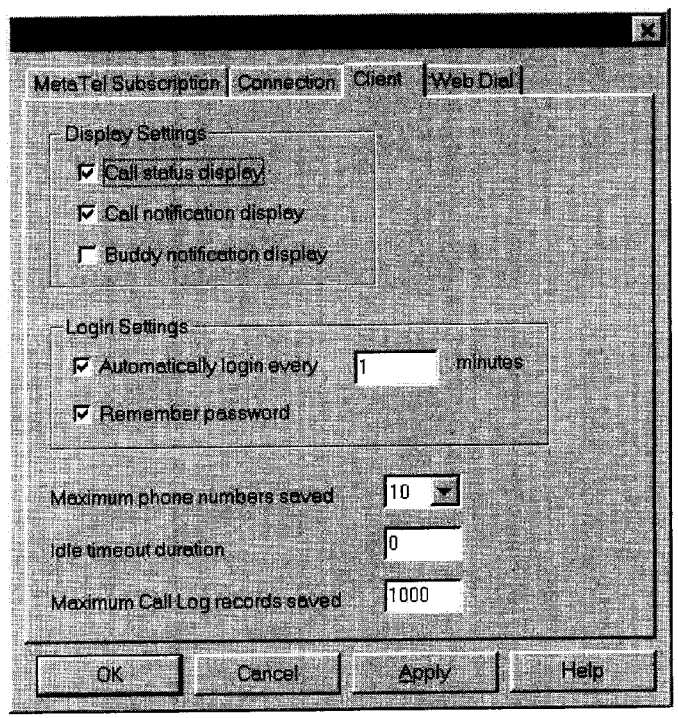
Figure 17:
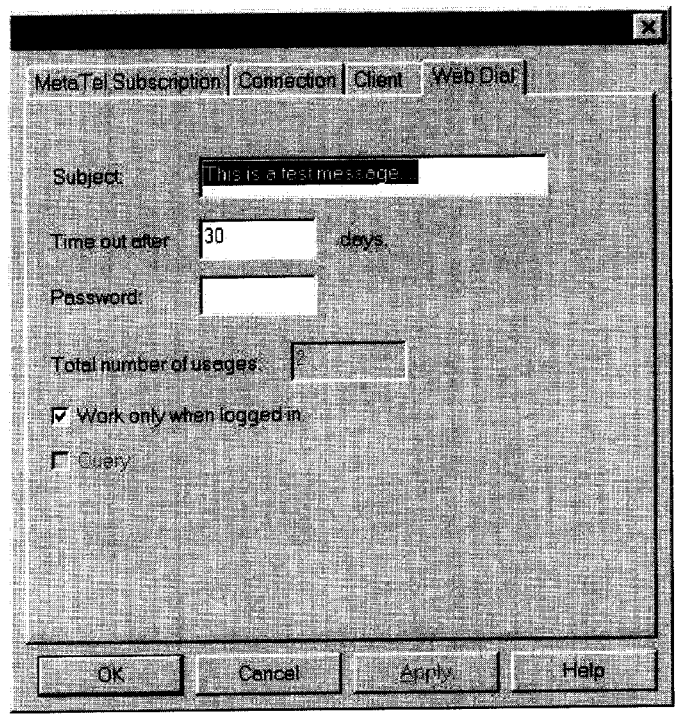
Figure 19:
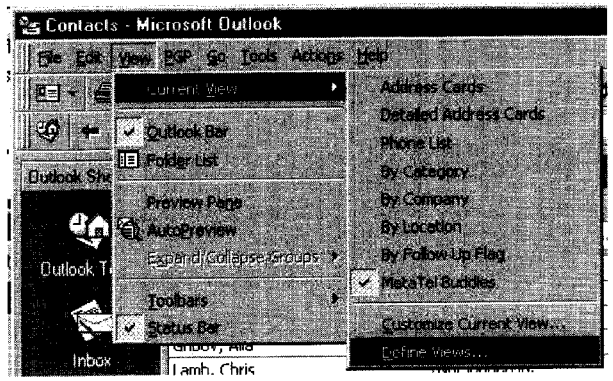
Figure 20:
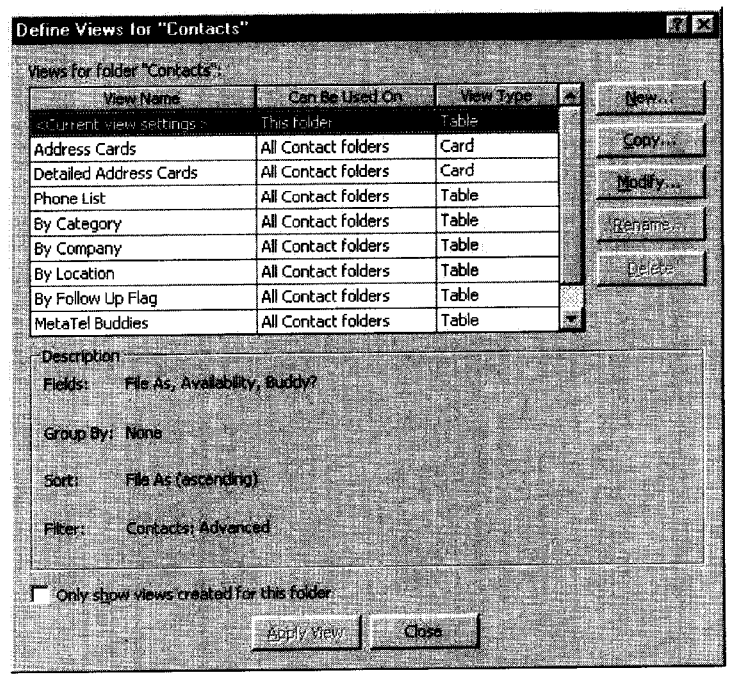
Figure 22:
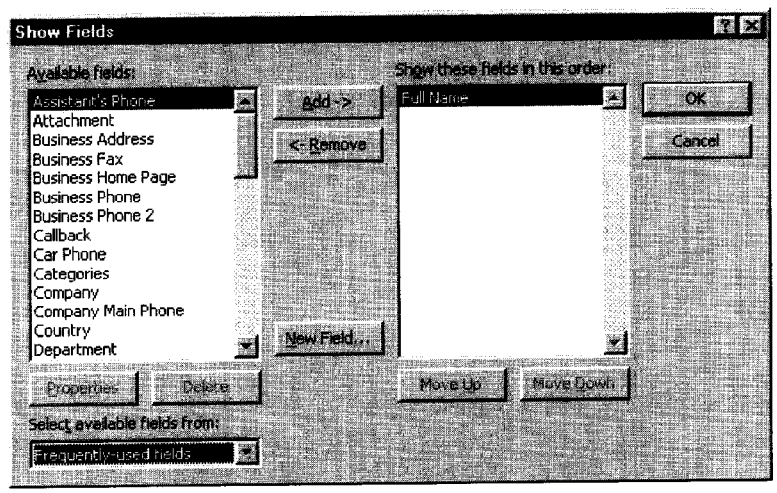
Figure 23:
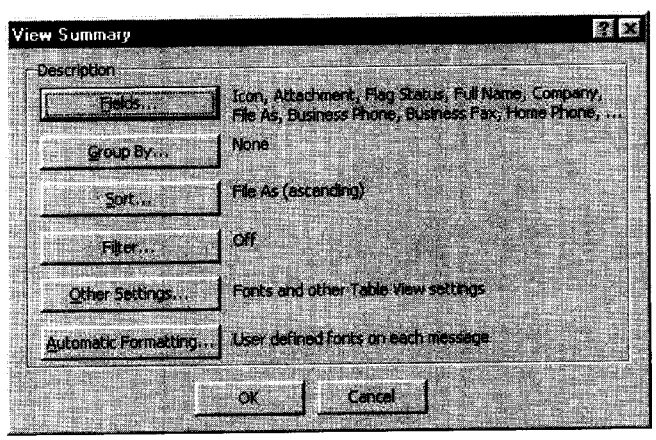

FIG. 11 illustrates an example of certain specific databases 220-1 through .220-6 that the telecommunications hosting server 203 can maintain. The telecommunications hosting server 203 can use the call logging database 220-1 to store all call and user agent transaction that result in call connections being placed. The accounting database 220-2 can maintain accounting information for various user of the system. The telecommunications hosting server 203 can maintain specific user agent information including the data structures 330 through 341 from FIG. 5A in the user agent information database 220-3. The telecommunications hosting server 203 can maintain calling phone numbers, email, URL, server and other computer network addressing information in the call/address directory database 2204. A location services database 220-5 can provide the telecommunications hosting server 203 with information on the specific locations of PSTN user telephony devices and VOIP computer systems. Finally, in this example, the telecommunications hosting server 203 can maintain a run-time database 220-6 to store various information and data concerning user agents. Such run-time data can include how long a user agent has been active in the runtime environment 300, as well as a disk cache area to store transient data such as instant message information.

FIG. 12 illustrates an example of a web-based user agent interface 250 that a user agent 301 can present to a user via that user's web browser or other client application (e.g., email interface, Personal Digital Assistant interface, custom software application interface, etc.). The example user agent interface 250 operates as explained above to allow a user to communicate with the telecommunications hosting server 203 via the user agent 301 associated with that user. The example user interface 250 includes: a login status indication 671 for the user (indicating that the user is currently logged in to his or her user agent 301 with a telecommunications hosting server 203); an active call indication 672 for the user (zero active calls in this example); a current user call identifier 673 that indicates the phone number at which the current user can be reached; current location information 674 for the user indicating where the user is currently located; a recent instant message list 675 that in this example shows the most recent three instant message received by the user along with reply or response buttons 690 that can be selected by the user to cause the user agent to take a prescribed course of action; a colleague list status information field 676 that list each colleague of the user along with that buddies location, call identifier (e.g., phone number of email address or web page URL), and status information for each colleague indicating an activity of the colleague; a call identifier entry field 677 that allows the user to specify a name, URL, phone number, email address or other identifier that the user agent 301 can interpret to determine one or more persons of entities with which to establish call connections; an instant message entry field 678 that allows the user to enter an instant message to be sent via the system of the invention; and a conference selection area 679-1 through 679-4 that allows the user to schedule, view and control conference calls and sub-conference calls (e.g., whisper rooms discussed above). The operation of each of these fields 671 through 679 will not be described in detail here, as their description has been generally provided in relation to the above explained embodiments of the invention.

Certain features of the invention are apparent from the user agent interface 250 illustrated in FIG. 12. For example, the system of the invention via the user agent interface 250 provides great flexibility to the user. For example, a user is able to enter other information besides a person's phone number into the call identifier field 677. The user agent 301 can interpret this information entered to enable a user, for example, to enter a persons name or email address. The user agent 301 can parse this information and determine a telephony device associated with this information. The user agent 301 can then cause a telecommunications session to be established with this telephony device which may exist on the PSTN 101, and the user's telephony device as specified by the call identifier in field 673.

Another feature of the provided by embodiments of the invention as further illustrated in the user agent interface 250 in FIG. 10 relates to instant message processing. Instant message reply buttons labeled "YES" and "NO" exist in this embodiment along side each instant message (three instant message shown in this example) in instant message field 675. When the user reads an instant message such as instant message two "CALL OFFICE RE: CLOSING DEAL," the user can select one of the "yes" or "no" buttons next to that message. Such a button selection causes the user agent interface 250 to send a call application message 240 back to the user agent indicating the response to the particular instant message. The user agent 301 can then further process this data as explained above, in order to set an event for example, or to immediately initiate commencement of a telecommunications session between the user and the originator or other person specified in the instant message, with both parties communicating over the PSTN 101. As another example, instant message number three reads "DON'T FORGET CONFERENCE CALL, MONDAY AT 3 P.M." If the user selects the "YES" button 690 to the left of this instant message (message number 3), a call application message will be returned to the user agent 301 indicating that the user is to be joined in a conference call at the specified date and time (Monday at 3 P.M. in this example). As such, the user agent 301 can schedule an event with the event tracker 364 to join the PSTN-based user telephony equipment associated with that user in the conference call at the specified time. The user need not further take action. Instead, the system of the invention will automatically handle the placement of the call to the user and that user's appropriate user telephony device (e.g., telephone 106 on PSTN 101) using the techniques and mechanism explained in the above embodiments.

Yet another feature of the invention as illustrated in FIG. 12 is the conferencing call aspects of the system as explained above. As illustrated in FIG. 12, the conference window 679-1 provides the user client interface 250 with the ability to create and monitor the status of conference calls, with at least one of the actual calls legs taking place on the connection-based network 101 (FIG. 3). In this particular example, the user of user client interface 250 is engaged in a conference call with JOE, SUE, SETH and BILL. Note that SUE and JOE are listed as colleagues in the colleague status area 676 of the interface 250, and their status indicates that they are involved in the conference as well. Also as indicated in the conference are 679-1, MARY, BOB, JIM, MIKE and FRANK have been "programmed" into the user agent 301 via the user of interface 250 to be selectable participants in this conference, but these people are not yet engaged in the conference call. MARY, BOB, JIM, MIKE and FRANK might be employees of the user of the example interface 250, as explained above in the manager/employee conferencing example.

Further note the "CONF. NOW" feature 679-2 of the interface 250. This feature allows the user of interface 250 to create a conference at the current moment (though in this example, there is already a conference underway). This feature was used to create the current conference between the user of the user client interface 250 and the other participants JOE, SUE, SETH and BILL.

The feature 679-3 "FUTURE CONF." allows the user of the user client interface 250 to identify people that are to be engaged in a conference call that will take place in the future, also as previously explained in more detail above. When this feature 679-3 is selected, the user is prompted for the names and a time when the future call is to be set up. The user agent (e.g. 301-1) associated with this example user client interface 250 then sets an event to create the call at the specified future time. Any other agents 301 related to this future call can be contacted by the agent 301-1 to establish similar events.

Finally, in this example interface 250, the "WHISPER ROOM" feature 679-4 allows the user of interface 250 to select various name of people involved in the current (or a future) conference call and when these names are selected, the user agent 301-1 places (using appropriate inter-agent and/or call signaling messages) the selected people into a sub-conference call that is removed from the main conference call. Thus, the user of interface 250 might select SETH and SUE, two participants in the current conference call that is now underway, to be entered into a private conversation just between those two people. After selecting their names (as underlined in a hyper-link like manner), the user of interface 250 can then select the whisper room feature 679-4 and the user agent 301-1 will automatically place SUE and SETH in a private conversation. Via a timer interface option (not specifically shown) associated with the whisper room feature 679-4, that user can specify how long the whisper room call should last. Thus SUE and SETH might be placed in such a private whisper room call for a predetermined amount of time, after the expiration of which they are returned automatically to the main conference call that might still be taking place between the user of interface 250 and JOE and BILL (the two people not selected to enter the whisper room conference).

According to another embodiment of the invention, the user can program his or her user agent 301 with a user telephony number on the PSTN that has a limited number of associated uses and/or users and/or a limited duration. As an example, a user of the user agent 301 can provide a fictitious or temporary phone number to the user agent 301 along with an association of this temporary phone number to an actual user telephony device (e.g., 106) that exists, for example, on the PSTN 101 and that is coupled to the phone switch 202-1. The user can instruct (i.e., can program) the user agent 301 that this temporary phone number can only be called, for example, a certain number of times or for a certain total duration of time before it expires and/or that the temporary PSTN telephone number can only be called by certain other users and not by users for which access to the temporary number is not listed or provided. Alternatively, the user can program the user agent 301 to instruct that telecommunications network server 202-1 and public phone switch 202-2 that the temporary phone number is only to remain programmed into the public phone switch 202-2 to accept call connection for a certain period of time (e.g., a few days or weeks). In a sense, this embodiment provides a disposable phone number.

Once the user agent 301 is programmed in this manner, the user agent can use one or more call signaling messages 230 to instruct the telecommunications network server 202-1 and the public phone switch 202-2 that this temporary phone number now exists. This can be done in the same manner that the telephone company programs the public phone switch 202-2 with regular telephone numbers. Thereafter, the user agent 301 can accept call signaling messages 203 to establish call connections to a call destination identifier that specifies this temporary phone number. The call signaling message 203 identifying an incoming call to this phone number can be processed according to the access control programming provided by the user as indicated in the above example. That is, the user agent 301 can determine who the originator of the telecommunications session is by examining the call source identifier of the call signaling message 230. If the calling source is associated with one of the allowed people that are able to use the temporary number, then the user agent 301 can let the call processing proceed to establish a telecommunications session as explained in the aforementioned embodiments. However, if the call source is not recognized, or the source is recognized but has already called the number a previous maximum number of times, or the temporary number has been used in excess of a total call time duration as specified by the user programming, of if the number has simply expired, the user agent 301 can deny the call. Once the privileges of a user who is able to access the temporary phone number have expired, the user agent 301 can instruct the telecommunications network server 202-1 via a call signaling message 230 to remove the temporary phone number from the list of numbers that can be called.

This embodiment can also be simplified further by simply programming a user agent to accept calls to a specific phone number for a certain duration or period of time. A telephone company that supports this invention can thus re-sell temporary phone numbers. A person traveling from out-of-town might "buy" a temporary phone number for a weekend in a remote location and be provided with a user agent 301 which they can program to have all calls to the temporary phone number diverted to voice mail. This would allow the user to have a local number whose operation is defined by how the user programs his or her user agent, instead of having to manually configure such advanced services via telephone company requests. The transaction to buy such a number can be entirely web-based such that the user need not call the telephone company.

In another variation of the-invention, since the system of the invention treats each call connection as a single leg of a PSTN telecommunications session, the system enables individual accounting for each call connection placed to each PSTN-based user telephony device. In a multi-party conference call, for example, the system of the invention can track accounting charges based on each specific location of each PSTN telephony device and on the duration of the telecommunications session that takes place to a each specific telephony device at the different locations. This allows a user agent 301 to obtain status, via periodic call signaling messages 230, for each call connection in order to provide separate accounting of each party in the conference call. Such features have never been available before in a PSTN based phone network.

In other alternative embodiments of the invention, the design of the system provides enhanced calling services for users of a conventional telephone network that is equipped with a coupling to a public phone switch 202-2 and telecommunications network server 202-1 that are configured according to this invention. That is, while the aforementioned embodiments relate primarily to use via the user client interface 250 to one of the user agents 301, embodiments are also provided that can be used via the conventional PSTN telephone handset keypad. For example, since a user agent 301 in the system of the invention can be programmed to record and store information about incoming call requests, this information can be used at a later point in time. An example scenario illustrates the operation of such a embodiment.

Suppose a user agent 301 of the invention is configured as explained above to record information including the source call identifier of all incoming calls. Thus, if three people attempt to call a user associated with a particular user agent 301, whether or not those PSTN calls made it through to the user (i.e., the user was or was not available), the user agent 301 can still produce call logging information concerning the identity (caller-id, source call identifier) of the call connections that attempted to reach the user associated with the user agent. This information is also Internet or web-accessible, whereas conventional caller-id information had to be obtained when the user returned to his or her home or other location where the caller-id information was stored. As explained in a previous embodiment, perhaps the user agent is configured to operate as an answering machine and allows the callers to leave a message for the user of the user agent.

In any event, the call logging information can be quite useful if, for example, the user associated with the user agent 301 places a call to the user agent 301 to check his or her messages. That is, if the user agent 301 is configured to take messages on behalf of the user, the user can call his or her telephone number (from his or her PSTN telephone or from a remote phone) to check the messages left by others. When the user calls his or her telephone number, the user agent 301 can use an authentication mechanism to determine that it is the user who is the person making the incoming call connection. Perhaps the user agent 301 is configured to allow the user to enter a numeric password via the telephone, or the user agent "sees" that the incoming call is from the user's own telephone (via caller id, for example). To this end, the user is securely logged in to his or her user agent 301 via a numeric password for example (entered via the telephone keypad) and is able to retrieve his or her messages much like a typical answering machine or service. However, since the user agent 301 of this invention is configured to maintain an identity of the caller who left a particular message, this embodiment of the system of the invention provides such features as automatic callback.

In such an automatic call-back embodiment, the user agent 301 allows the user to listen to his or her messages, and during message playback, if the user so desires, the user can enter a call-back signal such as certain numeric key press from his or her telephone handset. The call-back signal causes the user agent 301 to determine the identify of the call source identifier associated with the voice message caller that the user is currently listening to, and further causes the telecommunications network server 202-1 to place a call connection to the former caller who left that message. When the call begins to ring, the user agent can detect this and can direct the telecommunications network server 202-1 to bridge the public phone switch 202-2 call connection to the former caller (the ringing phone) with the call connection that currently exists to the user who is checking his or her messages. In this manner, a user can immediately call back a former caller who left a voice mail message, for instance, without having to determine the phone number of that caller. This is because the user agent 301 of this invention maintained the phone number as the call source identifier along with the message in the call logging database 220-1. This embodiment is also particularly useful if the person who left the message (the caller) called in from a telephone that is not know to the user checking his or her messages. That is, if the caller calls from a friends house, the user is not likely to know the PSTN telephone number of that persons house. However, the system of the invention avoids this problem since the user agent 301 records the number from which the original caller called. Thus, when the user hears the voice message, they can simply enter the immediate call-back signal and the user agent 301 will go ahead and place to call to the appropriate PSTN number.

In an alternative configuration, the user agent 301 can indicate to the user to check his or her messages and can indicate what the telephone number is of the caller who left the message. This can be done even if a call-back is not performed. This is useful for a user who might not have time, for instance, to call the former caller back at that moment in time, or if the caller did not leave a number where they can be reached.

Those skilled in the art will readily understand that the system of the invention can include more or less data and more or less complexity than that shown and described in the above embodiments. Many variations of operations of the system of the invention are contemplated as being within the scope of this invention. Preferred embodiments of the invention are currently manufactured by MetaTel, Inc. of Waltham, Mass. Such embodiments are called "The MetaTel system" and provide many of the aforementioned features of the invention. Though implementations of embodiments produced by MetaTel, Inc. may not contain all of the features as explained herein in all commercial implementations, those features not implemented are nonetheless intended to be within the scope of this invention.

While certain embodiments of the invention have been explained with the user agents 301 using an Internet-based user agent interface 250, embodiments of the invention also provide other application level interfaces. For instance, personal digital assistant (PDS) interfaces provided by such computing devices as a Palm-Pilot (manufactured and trademarked to 3Com Corporation) can be used to provide the user client interface 250 and associated operations of the invention. Other interfaces such as Internet Chat Request (ICQ) or another instant messaging system such as the Microsoft Network (MSN) or AOL or Yahoo Instant Messaging interfaces or a similar "plug-in" can embody user client interface portions of embodiments of this invention as well. Alternatively, a special console specifically designed for the system of the invention can be provided in the form of a dedicated computing system to carry out the aspects of the invention related to the user client interface 250.

As another example, in one of the preferred embodiments manufactured by MetaTel, Inc. the user agent interface 250 that provides access over a computer network such as IP network 200 (e.g., the Internet) is implemented as a plug-in program to Microsoft Corporation's Outlook personal organizer and email client program. Microsoft and Outlook are trademarks of Microsoft Corporation. In this embodiment, the invention provides for a user agent interface 250 in the form of a client called the "MetaTel Client" which a user can install onto his or her computer that operates the Microsoft Outlook personal organizer program. When properly installed, the MetaTel client appears to the user as an additional menu of options within the Outlook mail interface.

It is also important to understand that the embodiments and system design above are not meant to be limiting. After reading the aforementioned description of embodiments of the system of the invention, variations of the design of the system should now be readily contemplated by those skilled in the art. For instance, while large portions of the aforementioned processing have been explained as residing within the user agent(s) 301, portions of such logic and call handling processing can be implemented within the user client interface 250. As a specific example, one previously described embodiment indicates that the user agent 301 can be responsible for call re-direction in the event that an incoming call signaling message 230 attempts to create a call connection with a user who has set his or her availability to "NOT AVAILABLE." Such call redirection processing can be handled by the user client interface 250 instead of the user agent 301. In such a case, the user agent 301 can simply serve as a proxy and can translate call requests specified within call signaling messages 230 into call requests embodied in a call application message 240 sent from the user agent 301 to the user client interface 250 (i.e., to the program or software application performing on a computer system (e.g., 245, 246) that provides the user client interface 250). The user client interface 250 program can then perform the call processing logic (e.g., invite processing rules, and/or other processing such as that shown in FIGS. 7, 8 and 9) and can transmit the results of such processing back to the user agent 301 via call application message(s) 240. The user agent 301 in such an embodiment would be "less intelligent" while the user client interface programs would be "more intelligent."

The point is that while specific implementations of the placement and operation of logic processing are explained with respect to specific embodiments above, developers of software that are skilled in the art can adapt and change various operations as performed by the system of the invention and can place such changes and/or adaptations in various alternative locations (e.g., moving a function or general operation as explained above from the within the telecommunications network server to the telecommunications hosting server, or from the user agent to the user client interfaces and vice versa) other than the locations explained above without significantly changing the fundamental and novel operations explained herein as the invention. Such changes are understood to be contemplated as part of the system of the invention.

Appendix A: MetaTel Outlook Client Documentation

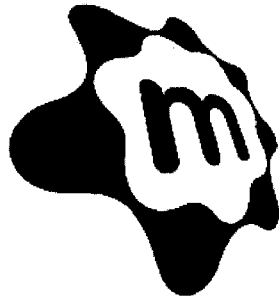

Client 1.0.53

Copyright © 2000 MetaTel, Inc.

- Introduction
-
    o New Features in Release
    o Installation
- Using the client
- MetaTel Support
- License Agreement This software is supplied under the terms of a license agreement with MetaTel, Inc. and may not be used, copied, nor disclosed except in accordance with the terms of that agreement. See the associated License Agreement for full details. "Microsoft", "Windows", "Windows NT" and "Outlook" are either registered trademarks or trademarks of Microsoft Corporation in the U.S.A. and/or other countries.

Introduction

The purpose of this document is to present the new MetaTel console. Much of the new console is self-explanatory and will be familiar to users of earlier versions of the MetaTel console. Important: To configure the "MetaTel View" for users of Microsoft Outlook it is absolutely necessary that you refer to Creating a MetaTel view in Outlook section of this documentation.

Back to top

New Features in Release

- Release Features in 1.0.53.0
- Release Features in 1.0.49.0
- Release Features in 1.0.41.0

Release 1.0.53.0

This release incorporates two key elements of our new graphical user interface--the main console and the call status window. The call status window appears when the console initiates a call. Before a call the

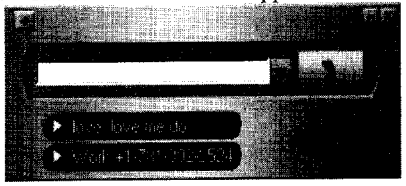

console appears as

Figure A After entering a phone number or MetaTel ID in the Main Console the call status window opens., as in Figure B

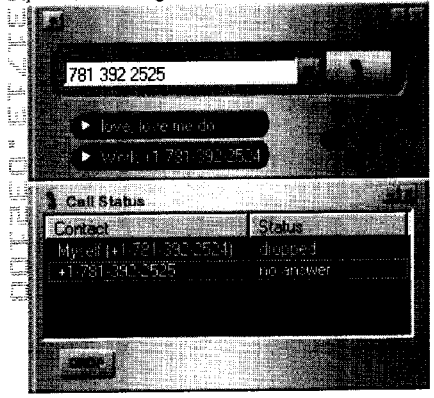

Figure B The call can then be managed from the call status window. The drop button selectively removes legs. Dropping the pimary leg--the first one--ends the entire conversation. The two windows are 'docked' and may be individually minimized *or* dragged to another place on the screen.

The call log and call status windows do not have the newer graphics integrated; they remain in the old format in a separate window. This window may be brought up by clicking on the drop down menu which appears as shown in figure C.

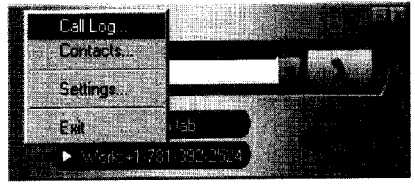

Figure C

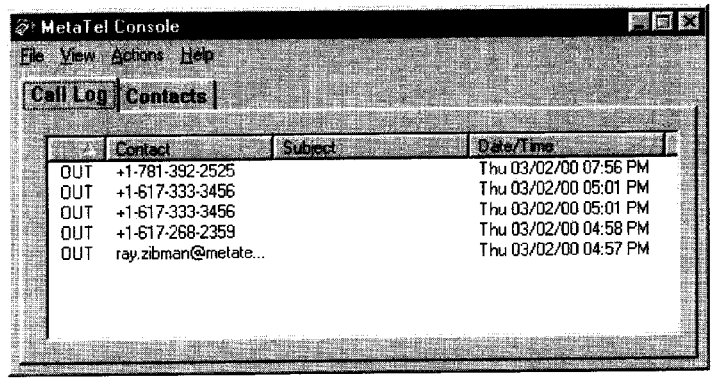

Figure D

The menus have been changed:

The *edit* menu in Release 1.0.49 has been removed from the old console - to change your MetaTel parameters, access the *settings* screen from console as seen in Figure C.

Release 1.0.49.0

This release implements the Web-Dial Internet calling feature from within Microsoft Outlook '98 and Outlook 2000. Web-Dial allows MetaTel users to send an email to a friend with an embedded call invitation. This lets any recipient of the email return a phone call to the MetaTel user via the MetaTel service.

- How to use Web-Dial

Release 1.0.41.0

This release of the MetaTel console represents a major change in the client implementation. Version 1.0.23 was dependent on Microsoft Outlook '98 or Microsoft Outlook 2000—it could not run as a standalone application. The current release has a new "look and feel."

Metatel Service Features

MTL99-01 94

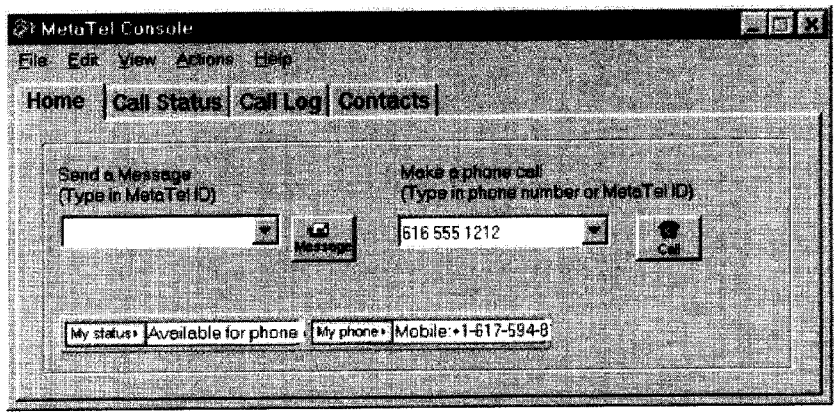

Figure 1

Aside from the standalone implementation, there are a number of important new features in release 1.0.41. The features can be summarized as follows:

1. Telephone Calls

- The user can now enter a 10 digit telephone number.
    - "Call by Name" suppresses telephone number.
    - "Quick Call" functionality is improved.
    - Phone number cache is configurable.

2. Call Messaging

- Call message stays open until session is complete.
    - Call message can be sent to multiple users.
    - "Enter" can be configured to mean "send message now" or <CR>.
    - Phone calls may be made from call messaging window.

- 3. Privacy and Security

- 1024-bit SSL encryption for all communications between the user's computer and the MetaTel servers.
- Phone presence, keyboard activity, and logged in status is configurable.

4. Enhanced Features

- Automatic recall of password from previous sessions.
    - Settings menu has more than 20 new options for configuration.
    - Direct dial from the call log.

Installation

Warning: Before installing the MetaTel client remove any previous versions from your computer. This is done via the Add/Remove Program utility in the Windows Control Panel. This utility can be found by clicking "Start", "Settings" and "Control Panel". At the very top of the control panel is the "Add/Remove" program. Double click on it and find the "MetaTel Demo Client". Remove the "MetaTel Demo Client."

Begin installation by running the setup binary "MetaTelConsole.exe". If the following window appears, click on the "Remove" button before proceeding to remove previous MetaTel console installations.

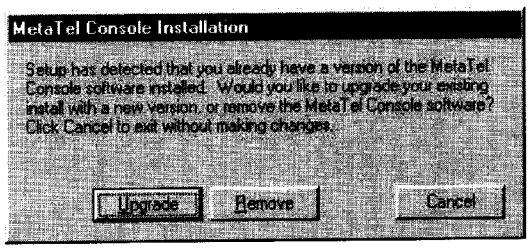

Figure 2

To begin setup run "MetaTelConsole.exe." Click "Next" and accept the MetaTel Pilot License Agreement. Continue the installation by accepting the defaults for the MetaTel server address and port. On the MetaTel Settings page you should enter values for your MetaTel user ID, the default phone numbers, and the availability

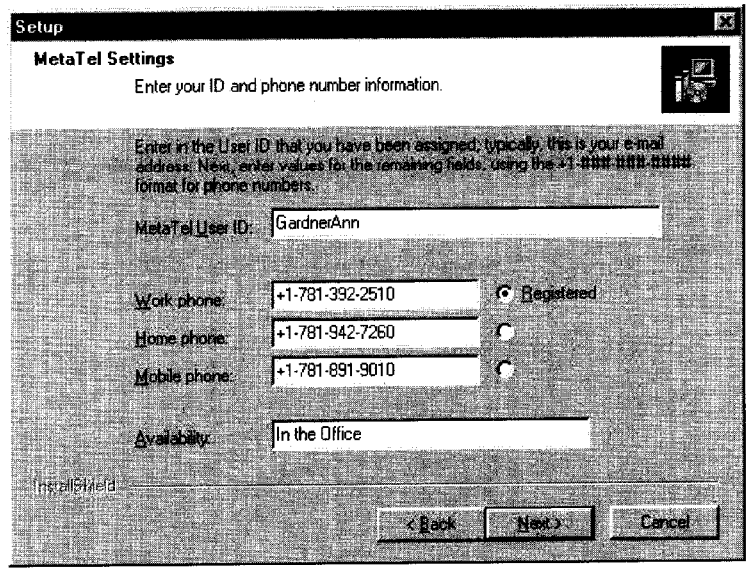

Figure 3

Note: The "Registered" radio button indicates which phone number will be your active number with the MetaTel service.

Back to top

Using the MetaTel Software

MetaTel Console Features

- Internet speed dialing
- Display Name/MetaTel ID initiated dialing.
- Group calling
- MetaTel Call Log record and Call Log reference dialing.
- Call Messaging between MetaTel members.
- MetaTel member availability and status sharing, user configurable for convenience and privacy.
- MetaTel Group Call, with up to 7 simultaneous connections, dynamically added and terminated.
- User defined telephone presence for MetaTel call routing.

The integrated Microsoft Outlook module

- 
  - Direct dial from Microsoft Outlook contacts entry.

- Sending a MetaTel Web-Dial Call
- Create custom MetaTel View containing availability data for other MetaTel users.
- Standalone console functionality incorporated into Microsoft Outlook contacts menus and buttons.

Logging into MetaTel

After installing the MetaTel software, you will see the following login dialog whenever you start the Microsoft Outlook or the standalone console program. Type in your password and select OK to log into and use the MetaTel services. If you are not logged in and you try to use the MetaTel services, you will be prompted to enter your password. If you check the "Remember my ID and Password" option, the next time you start Outlook or stand alone console you won't need to enter your password.

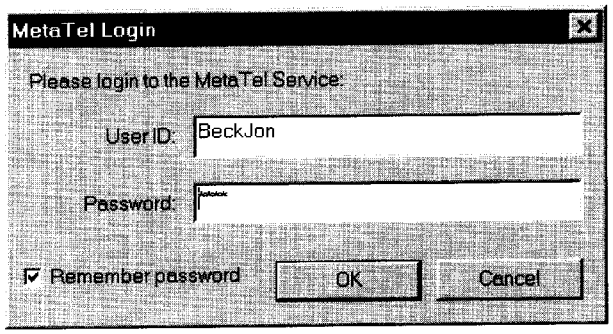

Figure 4

After logging into the MetaTel service, the console window will be displayed (minimized) in the bottom toolbar.

Using the MetaTel Console

Making Calls

Place a call by typing a phone number or by typing a MetaTel ID. The Console will save all previously made phone calls and allow you to redial by pulling down a list of the most recently made phone calls. If a Contact is highlighted while selecting the "Make a phone call" the "Call..." field will be filled in with the Contact's name or the phone number to be called. You can store up to 10 phone numbers or MetaTel ID users.

You can also place a call using the Action pull down menu. Action->Place a Call

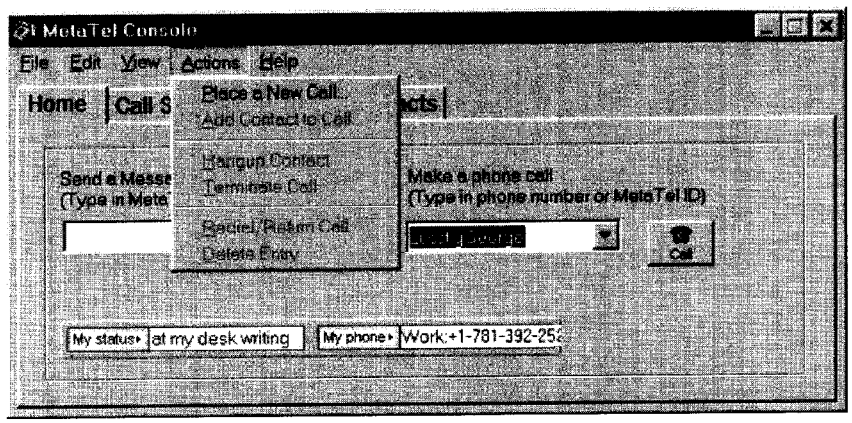

Figure 5

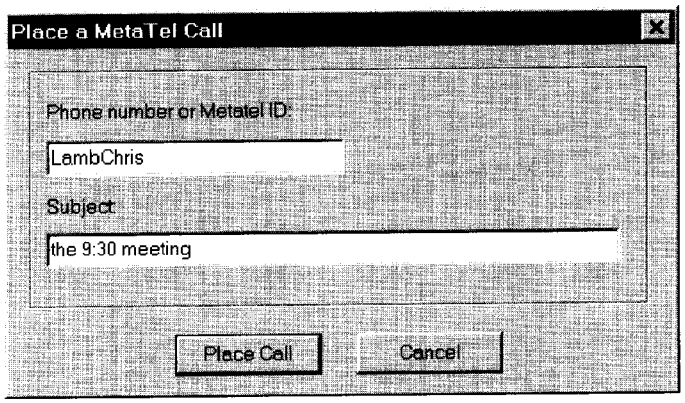

Figure 6

Adding Parties to an Ongoing Call

While in a MetaTel Call, one or more parties can be added to the call, up to a maximum of seven. Each leg is added by typing a phone number or MetaTel ID in the "Make a phone call" box. The number of active legs is displayed in the call status box.

Call Status during a call

Once a MetaTel call has been initiated, you may select the Call Status Index Tab to see the call status as shown below. You may drop any party from the call by highlighting the phone number to hang up and selecting the "Hang up" button.

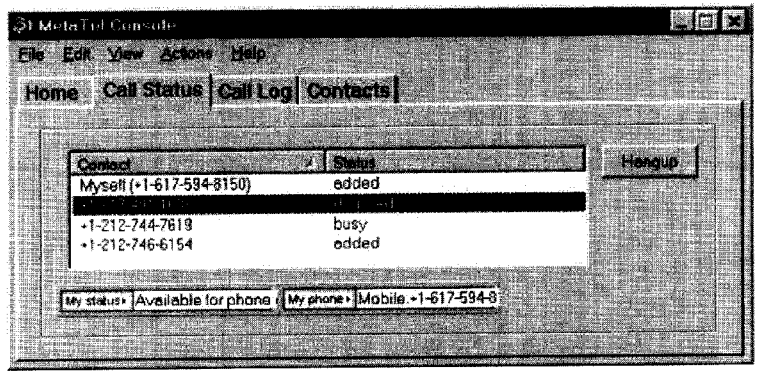

Figure 7

Call Logging

The Call log saves a record of all incoming and outgoing MetaTel calls. Any of these entries can be selected to initiate a call. Highlight the contact, right click, and then select "call".

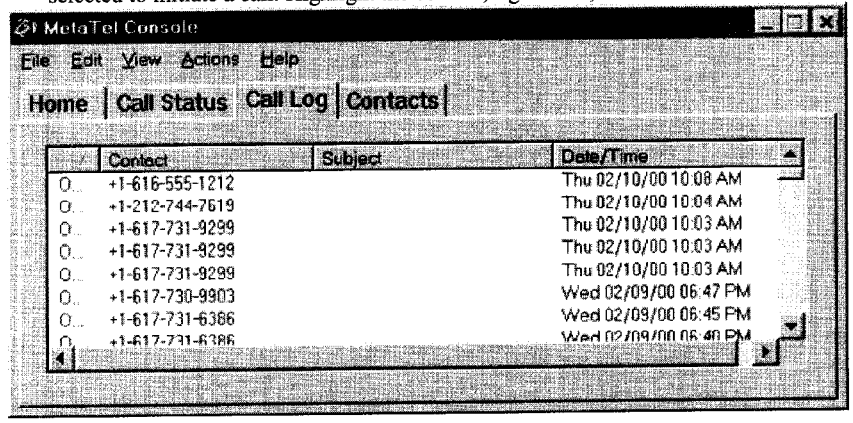

Figure 8

Call Messaging between MetaTel subscribers.

Send a Call Message to another MetaTel user by typing a MetaTel Id in the "Send a Message" box. The Call Message window is shown in the next figure. This dialog is also used to respond to an incoming call message. The "Call..." button may be used to initiate a phone call to the recipient of the call messages.

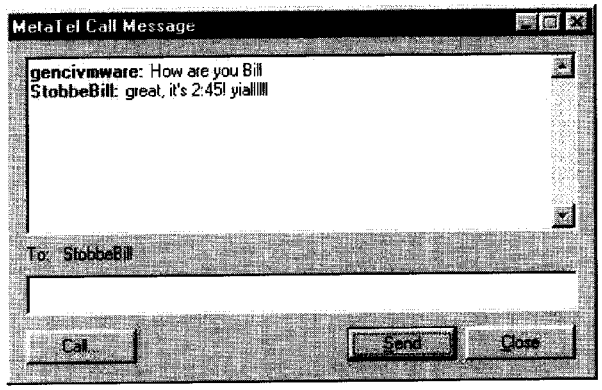

Figure 9

MetaTel availability fields

There are two ways to modify user availability and phone number strings; using the pull down values or by using the Edit->Settings control.

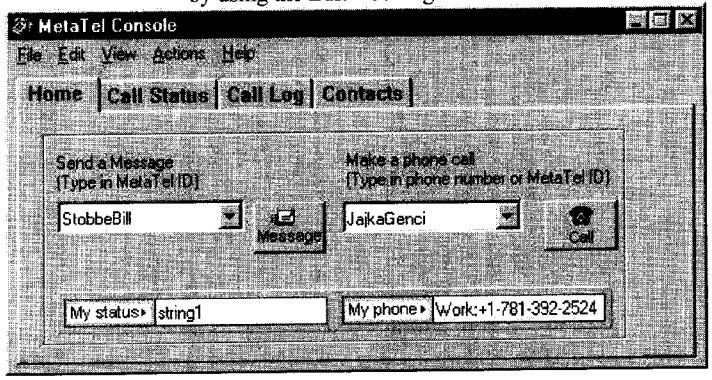

Figure 10

My Status Changes
Selecting default strings from the "My Status" pull down menu can make status changes. Custom strings can be typed into the box and they will be saved for future use.

My Phone Changes
This pull down menu lists the user phone numbers. Selecting a field sets the user phone number for incoming MetaTel calls.

The Edit Settings Pull Down Menu

Shown below is the dialog that is presented when the 'Settings' option is chosen from the Edit pull down menu. The MetaTel Subscription tab allows you to change your "Availability String" (e.g. what other MetaTel users will see when they 'monitor' you) and/or any of your registered phone numbers.

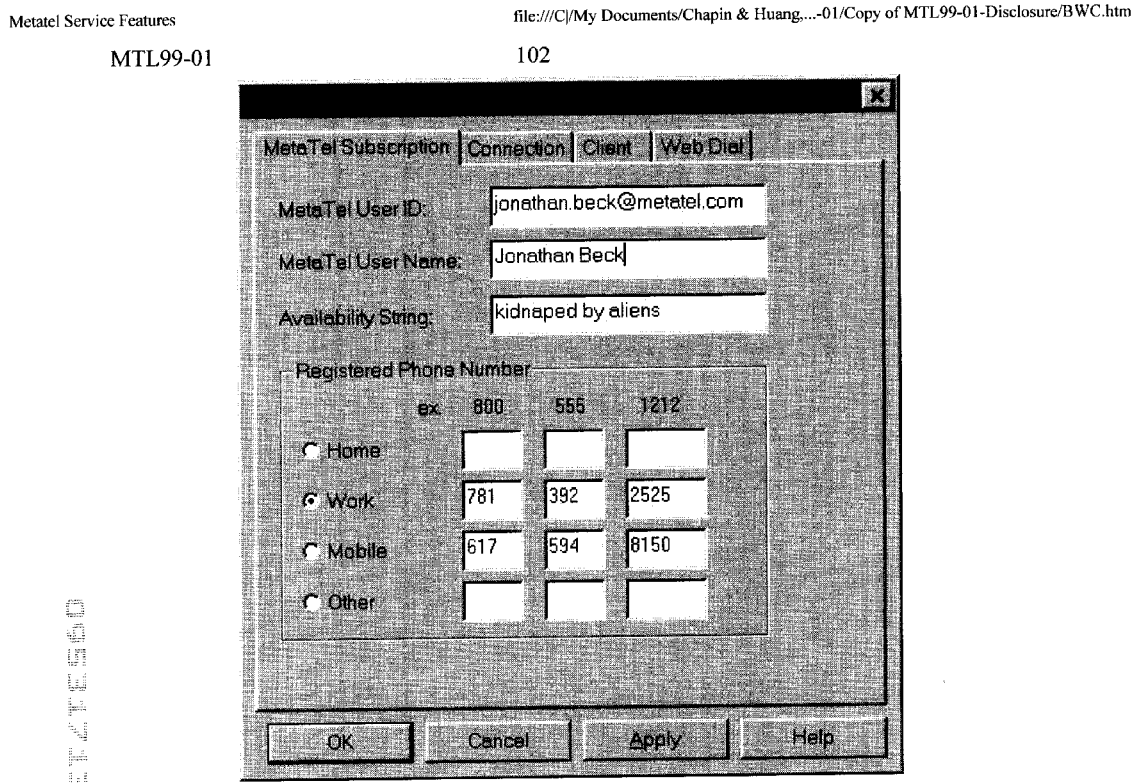

Figure 12

The File Pull Down Menu

This pull down allows you to login or logout to MetaTel. It is also used to close the console window.

Back to top

The Outlook Client Interface

The MetaTel Service uses Microsoft Outlook™ in conjunction with the console to allow a user to make calls and maintain awareness of other MetaTel users and their status.

Outlook Client Features

When the MetaTel software is active, the Outlook "Actions" menu includes three new actions as shown in the figure 14 below. These actions also correspond to the short-cut icons placed on the control bar as shown in the figure 15. These actions are described in more detail in the following sections.

- Create a custom view displaying only MetaTel users
- Dial an Outlook Contact with "Make a MetaTel Call" icon
- Message between MetaTel users "MetaTel Call Message" icon
- Define a MetaTel user with the "MetaTelize" icon
- Ability to create "buddies" within the MetaTel View
- View the "presence" availability of a "buddy"
- View the MetaTel ID of a "buddy"

Placing a call In addition to placing a call using the features available with the MetaTel Console, you can also place a call by selecting the "Place a MetaTel Call" icon. The figure below demonstrates the popup that is generated by selecting this icon. If a Contact is highlighted while selecting the "Place a MetaTel Call" icon, the "Call..." field will be filled in with the Contact's name and phone number to be called. The contact's phone number will follow the Contact's name. An alternate phone number for the contact can be selected through the drop down box.

To send a brief message with a phone call. Enter a message in the "Subject" field. This message will appear on the screen of the person receiving the call before the phone rings. If the person receiving the call is not currently logged in the message will be saved in the "Off-line Call Log".

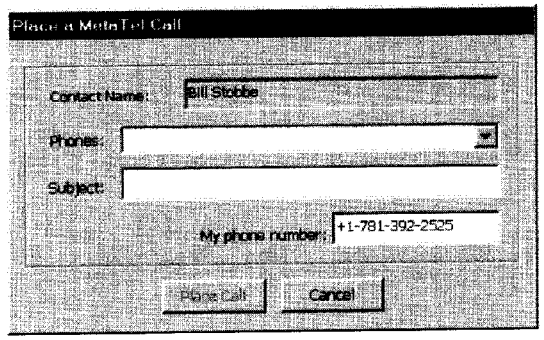

Figure 13

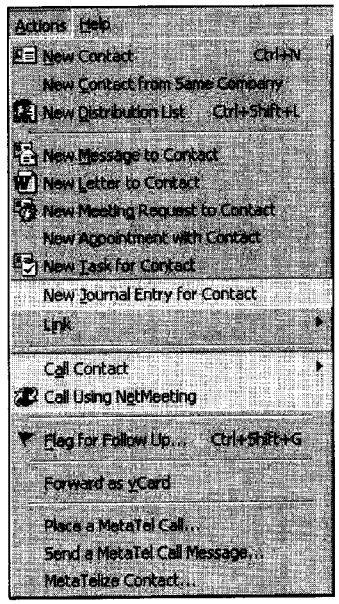

Figure 14

Creating a MetaTel Web-Dial Call

Web-Dial is a feature which allows MetaTel users to invite others to call them via the MetaTel system. The Web-Dial button creates a unique URL and automatically places this URL into an email message. This email message, when sent, may be utilized by the recipient to initiate a call back to the MetaTel user. To create the URL (and create the email) a user clicks on the "Send Web-Dial invitation" button as shown in Figure 15.

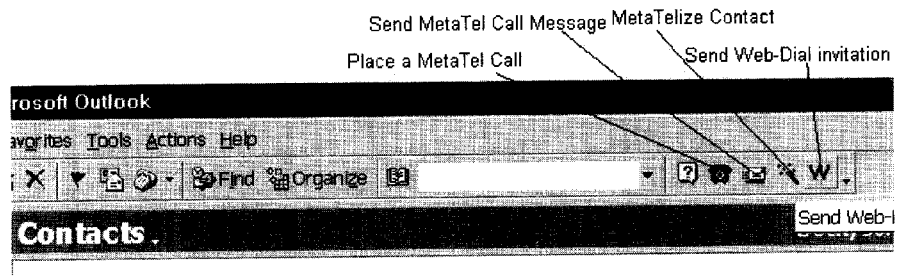

Figure 15

The email generated includes the email addresses of all highlighted users in the contact list. If no users are highlighted, the To: field is left blank. When the recipient of the email clicks on the URL they will be prompted to enter a phone number and generate a MetaTel return call to the sender of the MetaTel Web-Dial message.

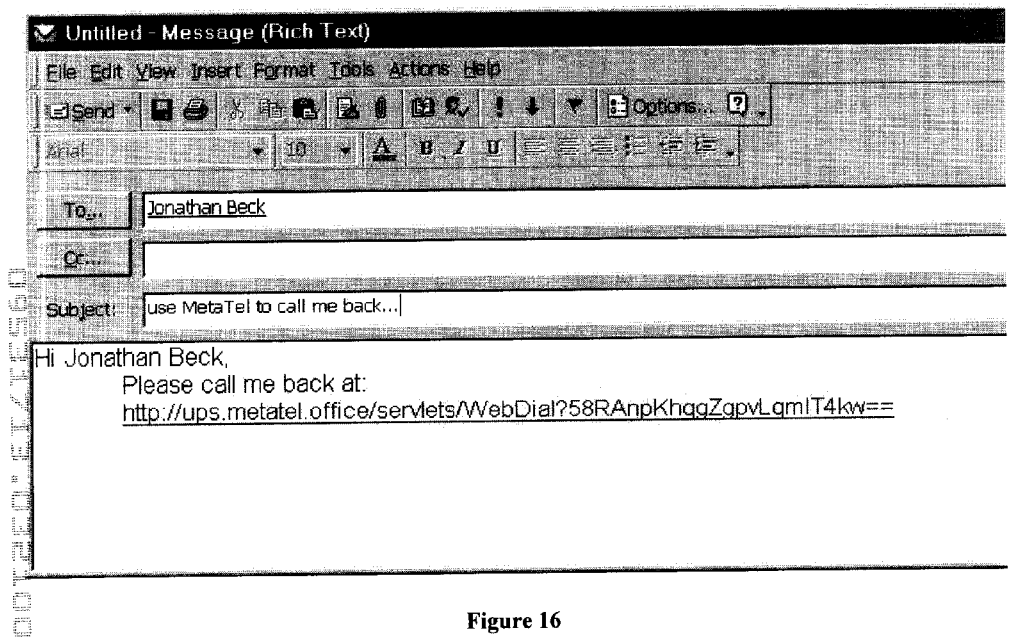

Figure 16

A number of options concerning the actions of this URL may be chosen by the Metatel user. The Web-Dial configuration is on the settings panel of the console.

- The "Heading" field string will be placed on each Web-Dial page the the MetaTel user creates. This string may be left blank.
- The "Time out after" sets the lifetime of the URL for any recipient(s); after this period the URL will no longer initiate a phone call.
- The "Password" field can be used so that a password is required when the URL is activated. Normally this password would be passed to the recipient independent of the email.
- The "Total number of usages" allows the URL to be enabled for more than one call.
- The "Work only when logged in" check box makes the URL usable only when the MetaTel user is logged in.
- The "Query" check box is a feature which will be implemented Back to top

Viewing the Call Log

A record of all incoming and outgoing MetaTel calls are saved in the Outlook Journal. Use the Journal to return or redial calls by highlighting an entry in the Journal and selecting the "Place a MetaTel Call" icon.

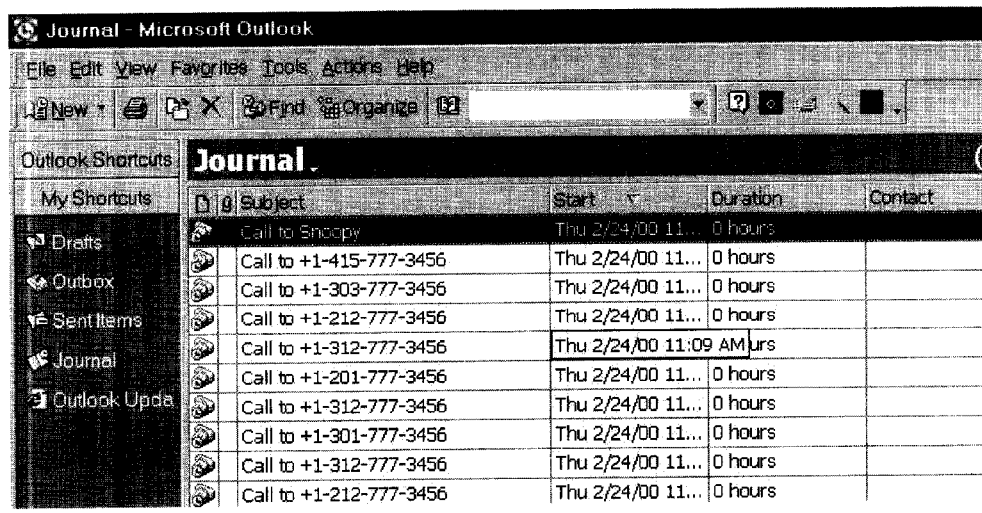

Figure 18

Creating a MetaTel view in Outlook
In order to easily view the availability of other MetaTel subscribers while using Microsoft Outlook, you must create a custom "MetaTel View". Within Outlook, a view is a particular way to display the information for each contact. Some contact information is kept out of sight, while other information is highlighted in a useful manner. All the information for every contact is still available simply by double-clicking on the contact name. The MetaTel View emphasizes the essential information and hides the information you need more rarely. This section describes the steps needed to create the MetaTel View. The other default Views that come with Outlook are not replaced - you can switch between the MetaTel View and any other View at any time.

To begin, activate the Outlook "Contacts" view by clicking the Contacts icon in the Outlook shortcuts window, or by selecting "Contacts" from the Go menu. If you don't have a contact entry for yourself, create one by choosing File->New->Contact. You don't need to enter your own phone information (although of course you may do so if you wish).

Once you have a contact entry for yourself, highlight it and MetaTelize it (press the MetaTelize tool button or invoke the Actions->MetaTelize Contact command).

Now create a new View by choosing View->Current View->Define Views as shown below:

The "Define Views" dialog will appear, as shown below. Click "New" to create a new View.

This activates the "Create a New View" dialog (below). Enter a name for the view, for example "MetaTel View". Make sure "Type of view" is "Table", as shown below.

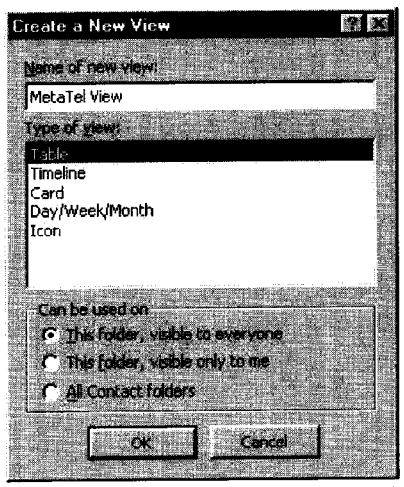

Figure 21

After pressing 'OK' you will be presented with the "View Summary" dialog. Click the "Fields" button to customize the fields that will be included in the new view.

The "Show Fields" dialog displays the fields that will be included in the view; the list on the right of the dialog window shows the current selected fields, the list on the left shows fields that are available for use. You can add or subtract any fields that you wish. From the right-hand column marked "Show these fields in this order", remove all the fields except for the "Full Name" field.

In the 'Select available fields from' drop down box, choose 'User defined fields in folder' to display the MetaTel fields in the "Available fields" list; these fields are "Availability", "Buddy?" and "MetaTel ID". Use the "Add->" button to add the "Availability" and "Buddy?" from the left-hand list to the right. Do not add the "MetaTel ID" field.

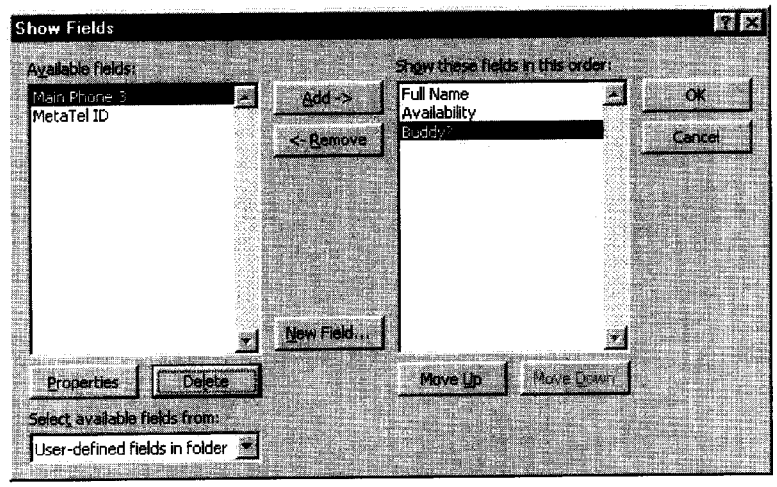

Figure 24

Click OK to close the "Show Fields" dialog box and return to the "View Summary" dialog box.

Next, select the "Filter..." button from the "View Summary" dialog box. Select the "Advanced" tab from the "Filter" dialog box (see figure below). From the "Field" pull down, select "MetaTel ID" from "User defined fields in folder". Select "is not empty" from the "Condition" drop down. Select "Add to list" then "OK".

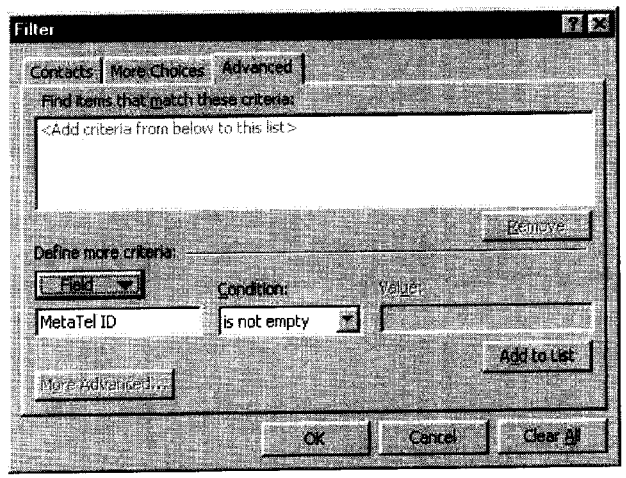

Figure 25

Click "OK" to save the new view definition, then use "OK" or "Close" to exit the remaining dialogs. You can then select the new "MetaTel View" from the View->Current View menu. After activating the view, adjust the column widths as needed. To change the "Buddy?" field from "Yes/No" to a check box, right click on the word Buddy?, select "Format Columns..." and change the Format to Icon.

An example of a completed view is shown below:

Figure 25

The MetaTel View essentially turns your Outlook address book into a way to see your colleagues' availability, send call messages, and place phone calls instantly. There is no simpler way to make a group call: you can immediately check on the availability of a group of colleagues, send them a quick message to check their willingness to talk, and press the Call button to set up an instant conference call!

Remember, you can always see the full contact information for any contact just by double-clicking on the contact name. You won't normally need to see the phone numbers of your contacts, however - you just click on their names to telephone them. Via the MetaTel call-by-name feature, the correct phone will ring automatically. The Availability field in the MetaTel View is designed to increase the chances that the call will complete. Even if the call or call message doesn't get through (either because the called contact is not available or just doesn't answer), all the participants will have a journal entry telling them who called, when, and what the subject of the call is. A simple click on the journal entry returns the call immediately.

The MetaTel View in Outlook makes telephoning as efficient and simple as sending email.

Note that the MetaTel View shows only people in your contact database that you have MetaTelized. If you wish to see all of your contacts via the MetaTel view, you can remove the Filter from the View.

Back to top

MetaTel Client Support and Problem Resolution

In the event that you have problems with the MetaTel client and/or any interactions with other installed software there are two contact points that you may utilize. For immediate or service down issues please send a message to "alert@metatel.com"

For install or client runtime issues please do the following: send email to "support@metatel.com" describing the problem. Indicate the following information if available.

- The problem was with a new install, or problem occurred after running the service for a while
- Problem occurs during Outlook startup, login to MetaTel, accessing a MetaTel function, using other software
- Problem is intermittent or complete reproducible
- Describe your computing environment (OS, email, connectivity to Internet)
- Indicate any status messages or other information which may seem relevant
- Return contact information, such that MetaTel support personnel might reach you if needed In the event that the problem causes a complete failure of Outlook, simply uninstall the MetaTel plug-in by choosing "Add/Remove" software in the Windows control panel.

For system enhancement or modification requests, please provide feedback via the "support@metatel.com" address.

Back to top

MetaTel Pilot Test Agreement

IMPORTANT - READ CAREFULLY: This Pilot License Agreement ("Agreement") is a legal contract between You (either an individual or single business entity, called the "Licensee" or "You") and MetaTel, Inc. ("MetaTel") for the limited use of the Pilot site version of the client version of the MetaTel software product and its associated services, which includes computer software, and, as applicable, associated media, printed materials, and online electronic documentation (the "Product")

BY USING THE PRODUCT, YOU ARE CONSENTING TO BE BOUND BY AND ARE BECOMING A PARTY TO THIS AGREEMENT. IF YOU DO NOT AGREE TO ALL OF THE TERMS OF THIS AGREEMENT, YOU MUST NOT INSTALL OR USE THE PRODUCT.

1. General. The "Pilot Test," as further described herein, will commence upon your installation of the Product.

During the Pilot Test, the Licensee shall be entitled to use the Product for solely Licensee's personal or internal business needs and for test and evaluation purposes only.

2. MetaTel Responsibilities. MetaTel shall: (a) furnish one copy of the Product and one copy of any modifications or additions produced in the Pilot Test to the Licensee for trial use and testing in connection with the Pilot Test; (b) provide customer support at support@metatel.com. Support representatives at this number will log all requests for support and provide "level one" problem resolution services; (c) promptly investigate and attempt to resolve, through reasonable commercial efforts, any problem or error reports concerning the Product; and (d) provide all corrections and/or enhancements to the Product at no charge.

3. Licensee Responsibilities. Licensee shall: (a) provide troubleshooting, debugging, and maintenance assistance (such as system backup and program module replacement) during the Pilot Test according to MetaTel's request and detailed instructions; (b) record in writing all problems (including errors, failures, non conforming results, and unexpected performances) and any comments regarding the Product, and forward the same to MetaTel, Inc. as often as reasonably requested; (c) install all fixes, releases and updates to the Product made available to Licensee; (d) provide to MetaTel such further documentation and assistance as may reasonably be required by MetaTel to perform the Pilot Test; (e) use the Product only as authorized herein, and instruct its employees having access to the Product to act in conformity with Licensee. s obligations under this Agreement; (f) refrain from making any modifications or additions to the Product except with MetaTel written approval; and (g) refrain from further disclosure of Confidential Information (defined in Section 12 below).

4. Certain Reservations. (a) Because the Product may contain defects, Licensee is responsible for establishing back-up, log, batch, review, and other procedures and controls appropriate to maintain the integrity and continuity of Licensee's operations. (b) MetaTel is under no obligation to make any changes or modifications to the Products suggested by Licensee. MetaTel reserves the right, with or without prior notice, to discontinue work on the Product or to revise the Product so it provides different features, features in different combinations, and/or different environment configurations.

5. Restrictions. Except as otherwise expressly permitted in this Agreement, Licensee may not: (a) modify or create any derivative works of the Product or documentation, including translation or localization; (b) decompile, disassemble, reverse engineer, or otherwise attempt to derive the source code for the Product (except to the extent applicable laws specifically prohibit such restriction); (c) redistribute, encumber, sell, rent, lease, sub license, or otherwise transfer rights to the Product; (d) remove or alter any trademark, logo, copyright or other proprietary notices, legends, symbols or labels in the Product; or (e) disclose any results of benchmark tests run on the Product to a third party without MetaTel, Inc.'s prior written consent.

6. Fees. There is no license fee for the Product.

7. Termination. Without prejudice to any other rights, either party may terminate this Agreement at any time. Upon termination, Licensee shall destroy all copies of the Product.

8. Proprietary Rights. Title, ownership rights, and intellectual property rights in the Product shall remain in MetaTel and/or its suppliers. Licensee acknowledges such ownership and intellectual property rights and will not take any action to jeopardize, limit or interfere in any manner with MetaTel, Inc.'s or its suppliers' ownership of or rights with respect to the Product. The Product is protected by copyright and other intellectual property laws and by international treaties. Title and related rights in the content accessed through the Product is the property of the applicable content owner and is protected by applicable law. The license granted under this Agreement gives Licensee no rights to such content.

9. DISCLAIMER OF WARRANTY. THE PRODUCT IS PROVIDED FREE OF CHARGE, AND, THEREFORE, ON AN "AS IS" BASIS, WITHOUT WARRANTY OF ANY KIND, INCLUDING WITHOUT LIMITATION THE WARRANTIES THAT IT IS FREE OF DEFECTS, MERCHANTABLE, FIT FOR A PARTICULAR PURPOSE OR NON-INFRINGING. THE ENTIRE RISK AS TO THE QUALITY AND PERFORMANCE OF THE PRODUCT IS BORNE BY LICENSEE. SHOULD THE PRODUCT PROVE DEFECTIVE IN ANY RESPECT, LICENSEE AND NOT METATEL OR ITS SUPPLIERS OR RESELLERS ASSUMES THE ENTIRE COST OF ANY SERVICE AND REPAIR. IN ADDITION, THE SECURITY MECHANISMS IMPLEMENTED BY THE PRODUCT HAVE INHERENT LIMITATIONS, AND LICENSEE MUST DETERMINE THAT THE PRODUCT SUFFICIENTLY MEETS ITS REQUIREMENTS. THIS DISCLAIMER OF WARRANTY CONSTITUTES AN ESSENTIAL PART OF THIS AGREEMENT. NO USE OF THE PRODUCT IS AUTHORIZED HEREUNDER EXCEPT UNDER THIS DISCLAIMER.

10. LIMITATION OF LIABILITY. TO THE MAXIMUM EXTENT PERMITTED BY APPLICABLE LAW, IN NO EVENT WILL METATEL OR ITS SUPPLIERS OR RESELLERS BE LIABLE FOR ANY INDIRECT, SPECIAL, INCIDENTAL OR CONSEQUENTIAL DAMAGES ARISING OUT OF THE USE OF OR INABILITY TO USE THE PRODUCT, INCLUDING, WITHOUT LIMITATION, DAMAGES FOR LOSS OF GOODWILL, WORK STOPPAGE, COMPUTER FAILURE OR MALFUNCTION, OR ANY AND ALL

OTHER COMMERCIAL DAMAGES OR LOSSES, EVEN IF ADVISED OF THE POSSIBILITY THEREOF, AND REGARDLESS OF THE LEGAL OR EQUITABLE THEORY (CONTRACT, TORT OR OTHERWISE) UPON WHICH THE CLAIM IS BASED. IN ANY CASE, METATEL. S ENTIRE LIABILITY UNDER ANY PROVISION OF THIS AGREEMENT SHALL NOT EXCEED IN THE AGGREGATE THE SUM OF $1,000, WITH THE EXCEPTION OF DEATH OR PERSONAL INJURY CAUSED BY THE NEGLIGENCE OF METATEL TO THE EXTENT APPLICABLE LAW PROHIBITS THE LIMITATION OF DAMAGES IN SUCH CASES. METATEL IS NOT RESPONSIBLE FOR ANY LIABILITY ARISING OUT OF CONTENT PROVIDED BY LICENSEE OR A THIRD PARTY THAT IS ACCESSED THROUGH THE PRODUCT AND/OR ANY MATERIAL LINKED THROUGH SUCH CONTENT.

11. High Risk Activities. The Product is not fault tolerant and is not designed, manufactured or intended for use or resale as on-line control equipment in hazardous environments requiring fail-safe performance, such as in the operation of nuclear facilities, aircraft navigation or communication systems, air traffic control, direct life support machines, or weapons systems, in which the failure of the Product could lead directly to death, personal injury, or severe physical or environmental damage ("High Risk Activities"). Accordingly, MetaTel and its suppliers specifically disclaim any express or implied warranty of fitness for High Risk Activities. Licensee agrees that MetaTel and its suppliers will not be liable for any claims or damages arising from the use of the Product in such applications.

12. The existence of this Pilot test and any and all aspects of the Product, the Pilot Test, and any and all information (from either party) related thereto shall be considered confidential ("Confidential Information") All Confidential Information shall be the property of the MetaTel. A party disclosing Confidential Information is the Disclosure, and the other Party is the Recipient. Each Disclosure warrants that it has the right to make the disclosures under this Agreement. Other than those stated explicitly in this Agreement, no other rights or license or other warranties are granted. All information pursuant under this Agreement is provided "AS IS".

13. Recipient agrees to hold Confidential Information confidential. Recipient shall use the same degree of care and means for Confidential Information that it utilizes to protect its own information of a similar nature, but no less than reasonable care and means, to prevent unauthorized use or disclosure of such Confidential Information to third parties. The Confidential Information may be disclosed only to Recipient's employees or contractors with a "need to know" who are subject to written confidentiality agreements sufficient to carry out the intent of this Agreement. A Recipient may not alter, decompile, disassemble, reverse engineer, or otherwise modify any Confidential Information received thereunder and the mingling of the Confidential Information with information of the Recipient shall not affect the confidential nature or ownership of the same as stated thereunder.

14. This Agreement imposes no obligation of confidentiality upon a Recipient with respect to any portion of the Confidential Information received thereunder which is: (i) now or hereafter, through no fault of Recipient, in the public domain; (ii) known to Recipient, as evidenced by written records, without an obligation of confidentiality at the time Recipient receives the same from the Disclosure; (iii) hereafter furnished to the Recipient by a third party as a matter of right and without restriction on disclosure; (iv) furnished to others by the Disclosure without restriction on disclosure; (v) independently developed by the Recipient without use of the Discloser's Confidential Information; or (vi) required to be disclosed pursuant to a requirement of a governmental agency or law, so long as the Recipient provides reasonable notice to the Disclosure of such requirement prior to any such disclosure. With respect to Confidential Information disclosed pursuant to (vi) in the immediately preceding sentence, Recipient will disclose only the minimum information required by such governmental agency or law and will not further disclose such information.

15. Miscellaneous. (a) This Agreement constitutes the entire agreement between the parties concerning the subject matter hereof. (b) This Agreement may be amended only by a writing signed by both parties. (c) Except to the extent applicable law, if any, provides otherwise, this Agreement shall be governed by the laws of the Commonwealth of Massachusetts, U.S.A., excluding its conflict of law provisions. (d) Unless otherwise agreed in writing, all disputes relating to this Agreement (excepting any dispute relating to intellectual property rights) shall be subject to final and binding arbitration in Middlesex County, Massachusetts U.S.A., with the losing party paying all costs of arbitration. (e) This Agreement shall not be governed by the United Nations Convention on Contracts for the International Sale of Goods. (f) If any provision in this Agreement should be held illegal or unenforceable by a court having jurisdiction, such provision shall be modified to the extent necessary to render it enforceable without losing its intent, or severed from this Agreement if no such modification is possible, and other provisions of this Agreement shall remain in full force and effect. (g) The controlling language of this Agreement is English. If Licensee has received a translation into another language, it has been provided for Licensee's convenience only. (h) A waiver by either party of any term or condition of this Agreement or any breach thereof, in any one instance, shall not waive such term or condition or any subsequent breach thereof. (i) Licensee may not assign or otherwise transfer by operation of law or otherwise this Agreement or any rights or obligations Metatel Service Features        file:///C|/My Documents/Chapin & Huang,...-01/Copy of MTL99-01-Disclosure/BWC.htm

MTL99-01        116 herein except in the case of a merger or the sale of all or substantially all of Licensee's assets to another entity. (j) This Agreement shall be binding upon and shall inure to the benefit of the parties, their successors and permitted assigns. (k) If any dispute arises under this Agreement, the prevailing party shall be reimbursed by the other party for any and all legal fees and costs associated therewith.

Back to top

A fully detailed explanation of the installation and use of the embodiment providing an Outlook plug-in is provided in Appendix A at the end of this specification. Appendix A includes actual representative example screen shots from a computer system operating the embodiment. This appendix also shows the operation of various features provided by this embodiment of the invention. Such features are in and of themselves considered embodiments of this invention and Appendix A is meant to be a part of this specification. That is, the disclosure provided in the design documentation in Appendix A discloses specific embodiments of the invention.

What is claimed is:

1. A method for managing call services in a telecommunications hosting server on a connection-less network, the method comprising the steps of:

configuring the telecommunications hosting server to be responsive to multiple users by providing multiple user agents that operate on behalf of the multiple users, each user agent provided by the telecommunications hosting server operating on behalf of a respective user of the multiple users;

receiving, at the telecommunications hosting server, at least one call application message including a request to create at least one call connection to a telephony device coupled to a public connection-based telephone network;

processing the call application message according to user agent logic provided by a particular user agent performing within the telecommunications hosting server;

generating at least one call signaling message based on the particular user agent logic, the call signaling message containing call connection information related to the telephony device coupled to a public connection-based telephone network;

forwarding the at least one call signaling message from the telecommunications hosting server on a connectionless network to a telecommunications network server that interfaces to a public phone switch on the public connection-based telephone network in order to create the at least one call connection to the telephony device on the public connection-based telephone network; and generating, at the telecommunications hosting server, an inter-agent message from a first user agent operating on behalf of a first user to a second user agent operating on behalf of a second user to notify the second user that first user currently has a call connection in progress, wherein the first user agent is a first process running on the telecommunications hosting server, wherein the second user agent is a second process running on the telecommunications hosting server, and wherein the inter-agent message is an inter-process communication between the first and second processes.

2. The method of claim 1 wherein:

the step of generating generates the at least one call signaling message indicating at least two call connections that are to be completed between at least two different telephony devices on the public connection-based telephone network; and wherein the step of forwarding the at least one call signaling message forwards the at least one call signaling message indicating the at least two call connections to a telecommunications network server coupled to the public connection-based telephone network, such that the telecommunications network server can create and maintain the at least two call connections to allow the at least two different telephony devices on the public connection-based telephone network to perform telecommunications with one another.

3. The method of claim 1 further including the steps of:

generating at least one call signaling message containing call connection information related to a computer telephony device coupled to the connection-less network;

forwarding the at least one call signaling message containing call connection information related to the computer telephony device to the computer telephony device in order to establish at least one voice-over-computer-network session between the computer telephony device and the telecommunications hosting server; and bridging the voice-over-computer-network session on the connection-less network to the at least one call connection on the public connection-based telephone network so that the telephony device on the public connection-based telephone network can perform telecommunications with the computer telephony device on the connection-less network.

4. The method of claim 1 wherein the step of generating includes the steps of:

initiating execution of a user agent respectively associated with a source of the at least one call application message;

forwarding the at least one call application message including the request to create the at least one call connection to the particular user agent;

processing the at least one call application message by the particular user agent to determine the call connection information related to the telephony device on a public connection-based telephone network, wherein the call connection information includes a call source identifier indicating a source telephony device for the call connection and includes a call destination identifier indicating a destination telephony device for the call connection;

generating at least one call signaling message indicating the call source identifier; and generating at least one call signaling message indicating the call destination identifier.

5. The method of claim 4 wherein the step of initiating includes the steps of:

determining the source of the call application message; and determining if a user agent associated with the source of the call application message is currently executing, and if not, causing execution of the particular user agent.

6. The method of claim 1 further including the steps of:

receiving a call signaling message from the public connection-based telephone network indicating a status of a connection on the connection based network;

forwarding the call signaling message received from the public connection-based telephone network to an appropriate user agent; and updating call connection status information associated with the appropriate user agent based on the call signaling message indicating the status of the connection on the connection based network.

7. The method of claim 6 wherein:

the call signaling message received from the public connection-based telephone network by the particular user agent specifies a status which indicates availability of telephony device on the public connection-based telephone network; and wherein the particular user agent performs the step of updating availability information related to the particular user agent.

8. The method of claim 6 wherein:

the call signaling message received from the public connection-based telephone network by the particular user agent specifies a status which indicates success of the at least one call connection between telephony device on the public connection-based telephone network; and wherein the particular user agent performs the step of updating accounting information related to the particular user agent based on the success of the at least one call connection.

9. The method of claim 1 wherein the call signaling message specifies a connection to be placed on the public connection-based telephone network between at least two telephony devices coupled to the connection based network.

10. A method for managing call services in a telecommunications hosting server on a connection-less network, the method comprising the steps of:

receiving, at a telecommunications hosting server coupled to a connectionless network, at least one call application message including a request to create at least one call connection to a telephony device coupled to a public connection-based telephone network;

processing the call application message according to user agent logic provided by a user agent performing within the telecommunications hosting server;

generating at least one call signaling message based on the user agent logic, the call signaling message containing call connection information related to the telephony device coupled to a public connection-based telephone network;

forwarding the at least one call signaling message from the telecommunications hosting server on a connectionless network to a telecommunications network server that interfaces to a public phone switch on the public connection-based telephone network in order to create the at least one call connection to the telephony device on the public connection-based telephone network; and in the telecommunications hosting server, performing a user agent on behalf of a user, the user agent performing the step of receiving; and wherein the call signaling message is received from a telecommunications network server and indicates to the telecommunications hosting server that a call connection is in progress to telephony equipment on a public connection-based telephone network coupled to the telecommunications network server and wherein the call signaling message is sent to the user agent to notify to user of the current call connection;

wherein the user can select an option in the user agent to have the call connection transferred to different telephony equipment than the telephony equipment to which the call connection is currently in progress; and wherein the at least one call signaling message generated in the step of generating contains an indication that the call connection in progress to the telephony equipment on the public connection-based telephone network coupled to the telecommunications network server should be transferred by the telecommunications network server to different telephony equipment on the public connection-based telephone network coupled to the telecommunications network server as specified in the call signaling message.

11. The method of claim 1 wherein the call signaling message specifies a connection to be placed on the public connection-based telephone network between a single telephony device coupled to the connection based network and wherein the call signaling message also specifies a connection to be placed on the connection-less network between a single computer telephony device coupled to the connection-less network via a voice-over-computer-network protocol.

12. The method of claim 1 wherein in response to the step of receiving at least one call application message the method further performs the steps of:

determining accounting information associated with the at least one call application message;

determining an optimum service provider to provide the at least one call connection on the public connection-based telephone network; and wherein the generated at least one call signaling message containing call connection information identifies the optimum service provider to provide the at least one call connection on the public connection-based telephone network.

13. The method of claim 1 wherein the at least one call application message is embodied in an email message transmitted from a client computer to a user agent executing on the telecommunications hosting server, the email message specifying a call connection to be made on the public connection-based telephone network, the particular user agent processing the email message and determining the call connection to be made as specified in the email message and causing a telecommunications network server to place the call connection on the public connection-based telephone network.

14. The method of claim 1 wherein the at least one call application message specifies a plurality of call connections to be placed on the public connection-based telephone network and includes instructions to allow each of the plurality of call connections to be joined in at least one conference.

15. The method of claim 1 wherein:

the particular user agent performs a step of providing enhanced calling services between a telephony device coupled to the public connection-based telephone network, the enhanced calling services including at least one of conference calling, whisper room conference calling, time-based whisper room conference calling, callback, time-based callback, call redirect, caller identification, call joining, and auto attendant.

16. A telecommunications system comprising:

a first telecommunications hosting server including:

a first interface including a coupling to connect to a connection-less network;

a second interface including a coupling to connect to a telecommunications network server;

a memory coupled to the first interface and the second interface;

a processor coupled to the memory, the first interface and the second interface, the processor being configured to be responsive to multiple users by providing multiple user agents that operate on behalf of the multiple users, each user agent operating on behalf of a respective user of the multiple users;

the memory maintaining a first user agent that, when executed in conjunction with the processor, provides calling services on behalf of a respective first user associated with the first user agent, the first user agent being loadable into the memory and executable by the processor to communicate via the first and second interfaces using messages that are associated with the first user agent, such execution of the first user agent provides management of call connections within a public connection-based telephone network via the first user on the connection-less network; and wherein the call connections are placed between subscriber telephony equipment coupled to the public connection-based telephone network, wherein the processor is further configured to generate an inter-agent message from the first user agent to a second user agent operating on behalf of a second user to notify the second user that first user currently has a call connection in progress, and wherein the first user agent is a first process running on the processor wherein the second user agent is a second process running on the processor, and wherein the inter-agent message is an inter-process communication between the first and second processes.

17. The telecommunications system of claim 16 wherein the second interface is coupled to a telecommunications network server, and wherein the telecommunications network server is a computerized device that includes a coupling to public telephone switching equipment on the public connection-based telephone network and the telecommunications network server can control call connections within the public telephone switching equipment that are placed and received on the public connection-based telephone network under direction from the telecommunications hosting server.

18. The telecommunications system of claim 16 wherein:

the processor, executes the first user agent, to receive form the first interface at least one call application message including a request to create at least one call connection to telephony device on a public connection-based telephone network;

and wherein the processor, under direction from the first user agent, generates at least one call signaling message containing call connection information related to the telephony device coupled to a public connection-based telephone network; and wherein the processor forwards, via the second interface, the at least one call signaling message to the public connection-based telephone network in order to create the at least one call connection to the telephony device on the public connection-based telephone network.

19. The telecommunications system of claim 16, wherein:

the processor, executes the first user agent, to generate the at least one call signaling message indicating at least two call connections that are to be completed between at least two different pieces of telephony device on the public connection-based telephone network; and wherein the processor forwards, via the second interface, the at least one call signaling message indicating the at least two call connections to a telecommunications network server coupled to the public connection-based telephone network, such that the telecommunications network server can create and maintain the at least two call connections to allow the at least two different pieces of telephony device on the public connection-based telephone network to performs telecommunications with one another.

20. The telecommunications system of claim 16 wherein:

the telecommunications hosting server includes a voice over computer network gateway coupled to the first and second interfaces; and wherein voice over computer network gateway in the telecommunications hosting server allows the first user agent to generate and send at least one call signaling message containing call connection information related to computer telephony device coupled to the connection-less network to the voice over computer network gateway;

wherein the voice over computer network gateway forwards, via the first interface, the at least one call signaling message containing call connection information related to computer telephony device to the computer telephony device located on the connection-less network in order to have the voice over computer network gateway establish at least one voice-over-computer-network session between the computer telephony device and a voice over computer network gateway; and wherein the voice over computer network gateway bridges the at least one voice-over-computer-network session on the connection-less network to the call connection on the public connection-based telephone network so that the telephony device on the public connection-based telephone network can perform telecommunications with the computer telephony device on the connection-less network.

21. The telecommunications system of claim 16 wherein:

the processor, receives a call signaling message from the public connection-based telephone network indicating a status of a connection on the connection based network;

the processor forwards the call signaling message received from the public connection-based telephone network to an appropriate user agent; and the user agent, while executing on the processor, updates call connection status information associated with the appropriate user agent based on the call signaling message indicating the status of the connection on the connection based network.

22. The telecommunications system of claim 16, wherein:

the processor, executes the first user agent, to receive, in the telecommunications hosting server, at least one first call signaling message from the public connection-based telephone network indicating a request to establish at least one call connection to telephony device associated with a user agent;

the processor, executes the first user agent, to generate at least one second call signaling message containing call connection information related to the telephony device associated with the user agent; and wherein the processor, executes the first user agent, to forward the at least one second call signaling message in order to establish the at least one call connection with the telephony device associated with the user agent.

23. The telecommunications system of claim 22 wherein:

the telephony device associated with the user agent is telephony device coupled to the public connection-based telephone network; and wherein the processor, under direction of the user agent, forwards the at least one second call signaling message to a telecommunications network server coupled to the public connection-based telephone network, such that the telecommunications network server can create and maintain at least one call connection on the public connection-based telephone network allowing telecommunications between telephony device associated with a source of the at least one first call signaling message and telephony device associated the user agent.

24. The telecommunications system of claim 22 wherein:

the telephony device associated with the user agent is computer telephony device coupled to the connection-less network; and wherein the processor, under direction of the user agent, forwards the at least one second call signaling message to the computer telephony device coupled to the connection-less network to establish a voice-over-computer-network session; and wherein the processor bridges the voice-over-computer-network session on the connection-less network to a call connection on the public connection-based telephone network specified in the first call signaling message, such that telephony device associated with the source of the first call signaling message on the public connection-based telephone network can perform telecommunications with the computer telephony device on the connection-less network.

25. The telecommunications system of claim 16 wherein:

the operations of receiving, generating, and forwarding are performed by a user agent that is executed on the processor in response to the telecommunications hosting server processor detecting the at least one first call signaling message, and wherein the user agent selected for execution by the processor is based on the identity of a destination call identifier specified in the at least one first call signaling message.

26. The telecommunications system of claim 16 wherein:

the processor, executes the first user agent, to process, in response to receiving the at least one first call signaling message, at least one invite processing and exposure rule based on at least one of a source call identifier, a destination call identifier and another criteria of the at least one first call signaling message; and wherein the processor, under direction of the user agent, determines if the at least one call connection should continue based on an outcome of the step of processing, and if so, proceeding to perform the steps of generating and forwarding, and if not, performing post call processing.

27. A telecommunications system comprising:

a first telecommunications hosting server including:

a first interface including a coupling to connect to a connection-less network;

a second interface including a coupling to connect to a telecommunications network server;

a memory coupled to the first interface and the second interface;

a processor coupled to the memory, the first interface and the second interface;

the memory maintaining a first user agent that, when executed in conjunction with the processor, provides calling services on behalf of a respective first user associated with the user agent, the first user agent being loadable into the memory and executable by the processor to communicate via the first and second interfaces using messages that are associated with the first user agent, such execution of the first user agent provides management of call connections within a public connection-based telephone network via the first user on the connection-less network;

wherein the call connections are placed between subscriber telephony equipment coupled to the public connection-based telephone network; and wherein the processor, while executing the first user agent, interprets the at least one call signaling message received from the public connection-based telephone network to generate at least one inter-agent message which the processor forwards to second user agent executing within the telecommunication hosting server.

28. The telecommunication system of claim 16 wherein:

the connection-less network is a computer network and is coupled to the first interface;

the public connection-based telephone network is a telephone network and is coupled to the second interface and the end-user equipment is telephony device; and wherein the first user agent communicates with the user client interface on the computer network to allow telephone calls to be placed and accepted via the telephony device coupled to the public connection-based telephone network.

29. The telecommunications system of claim 16 wherein:

the first user agent provides enhanced calling services between telephony device coupled to the public connection-based telephone network under control of the user client, the enhanced calling services including at least one of conference calling, whisper room conference calling, time-based whisper room conference calling, callback, time-based callback, call redirect, caller identification, call joining, and auto attendant.

30. The telecommunications system of claim 16 further including a second telecommunications server configured with similar interfaces, memory and a processor as in the first telecommunications server, and executing a second user agent that is associated with a different user client than the first user agent and coupled to the connection-less network; and the second user agent executing on the processor in the second telecommunications server and including a means for intercommunicating with the first user agent over the connection-less network to exchange availability information concerning the status of telephony device on the public connection-based telephone network that is associated with each of the first and second user agents.

* * * * *